United States Patent
Suzuki et al.

(10) Patent No.: US 6,999,208 B2
(45) Date of Patent: Feb. 14, 2006

(54) OPTICAL SCANNER, OPTICAL SCANNING METHOD, SCANNING IMAGE FORMING OPTICAL SYSTEM, OPTICAL SCANNING LENS AND IMAGE FORMING APPARATUS

(75) Inventors: Seizo Suzuki, Yokohama (JP); Hiromichi Atsuumi, Yokohama (JP); Kohji Sakai, Tokyo (JP); Magane Aoki, Yokosuka (JP); Hiroyuki Suhara, Yokohama (JP)

(73) Assignee: Ricoh Company, Ltd., Tokyo (JP)

(*) Notice: Subject to any disclaimer, the term of this patent is extended or adjusted under 35 U.S.C. 154(b) by 969 days.

(21) Appl. No.: 09/955,181

(22) Filed: Sep. 19, 2001

(65) Prior Publication Data

US 2002/0080428 A1 Jun. 27, 2002

(30) Foreign Application Priority Data

Sep. 22, 2000 (JP) .......................... 2000-288629
Mar. 5, 2001 (JP) .......................... 2001-060641

(51) Int. Cl.
*H04N 1/04* (2006.01)

(52) U.S. Cl. .................. 358/474; 358/505; 358/1.2; 359/205; 359/196; 359/226

(58) Field of Classification Search ................ 358/474, 358/1.2, 505, 509, 520, 447, 448, 475, 486; 359/205, 196–226
See application file for complete search history.

(56) References Cited

FOREIGN PATENT DOCUMENTS

JP       09-080333       3/1997

*Primary Examiner*—Kimberly Williams
*Assistant Examiner*—Negussie Worku
(74) *Attorney, Agent, or Firm*—Dickstein Shapiro Morin & Oshinsky LLP

(57) ABSTRACT

An optical scanner which performs optical scanning of a surface to be scanned by deflecting a luminous flux having a wavelength λ from a light source by means of an optical deflector, and condensing the deflected flux toward the surface to be scanned through a scanning image forming optical system, thereby forming an optical spot on the surface to be scanned. The scanning image forming optical system has at least one lens, and when the focal length fσ in the main scanning direction at a surface accuracy σi is defined as follows: fσ={2.6846 λ×√(k)×fm²/ω²}−fm where, fm represents the focal length in the main scanning direction of the scanning image forming optical system; k represents the number of lens surfaces; ω represents the aimed spot diameter of the optical spot in the main scanning direction at an image height of 0; σI represents the surface accuracy of the i-th lens surface as counted from the optical deflector side; n represents the refractive index of material of the lens having the i-th lens surface; and 1/l represents the spatial frequency in the main scanning direction on the lens surface; then, the surface accuracy σi, the focal length fσ, the refractive index n, and the spatial frequency 1/L satisfy, for each lens surface, the following condition:

0<log σi<−2 log (1/L)+log [1/{32 fσ(n−1)}].    (1)

120 Claims, 21 Drawing Sheets

IMAGE SURFACE CURVATURE

LINEARITY fθ CHARACTERISTIC

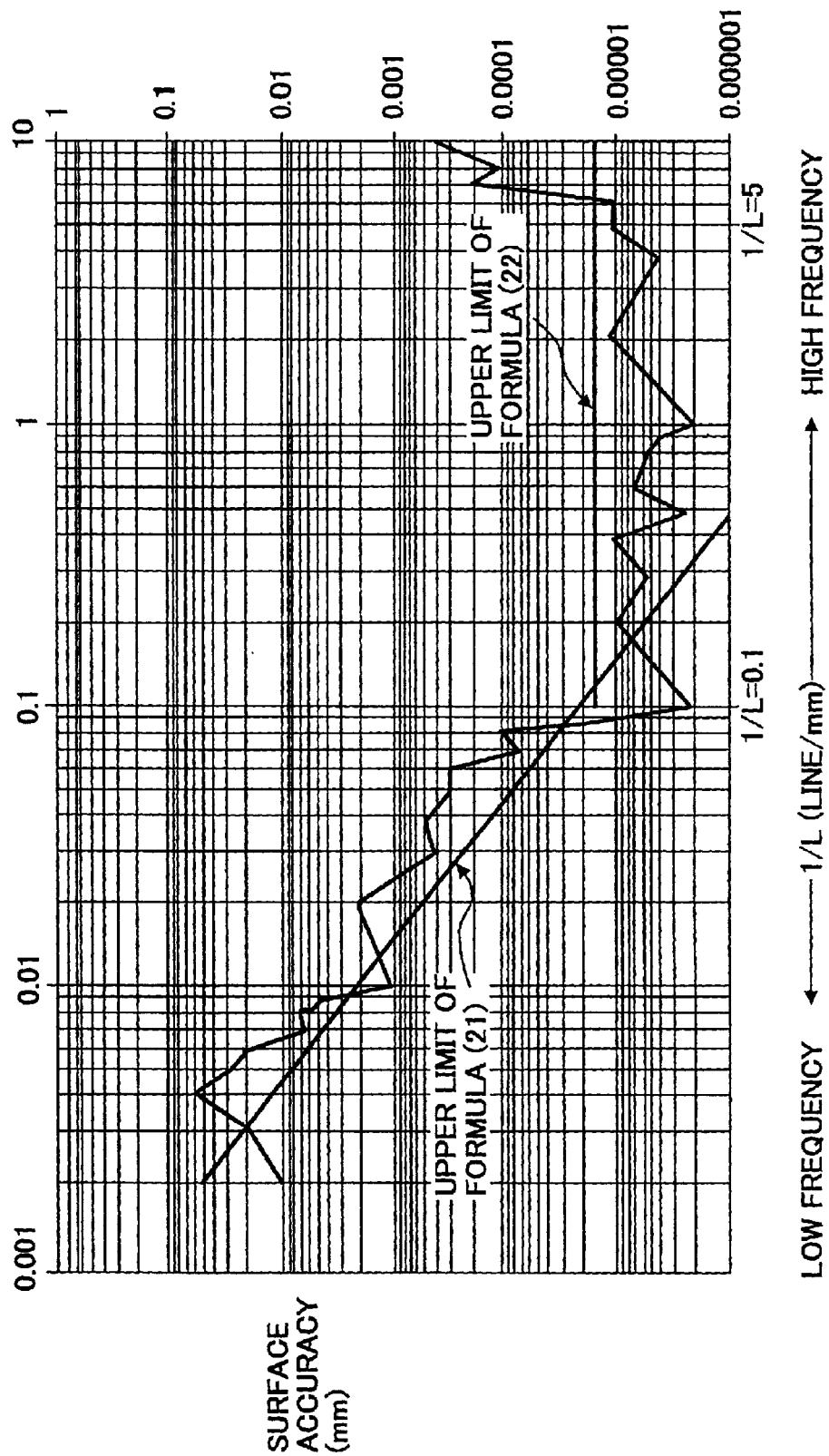

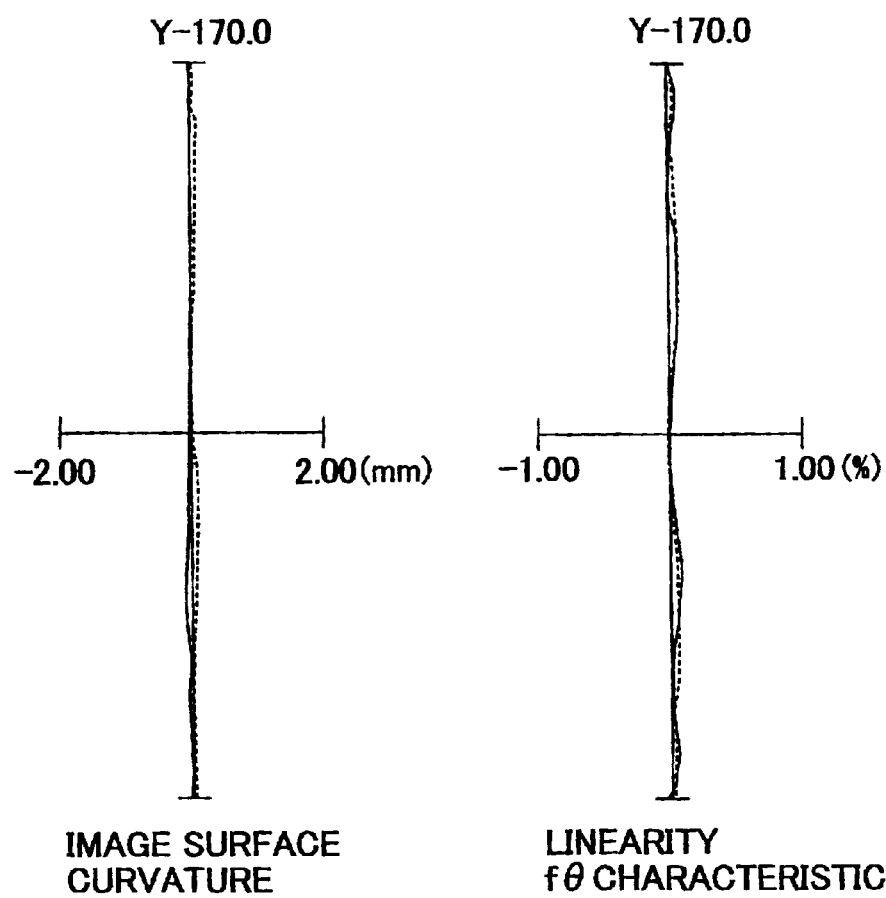

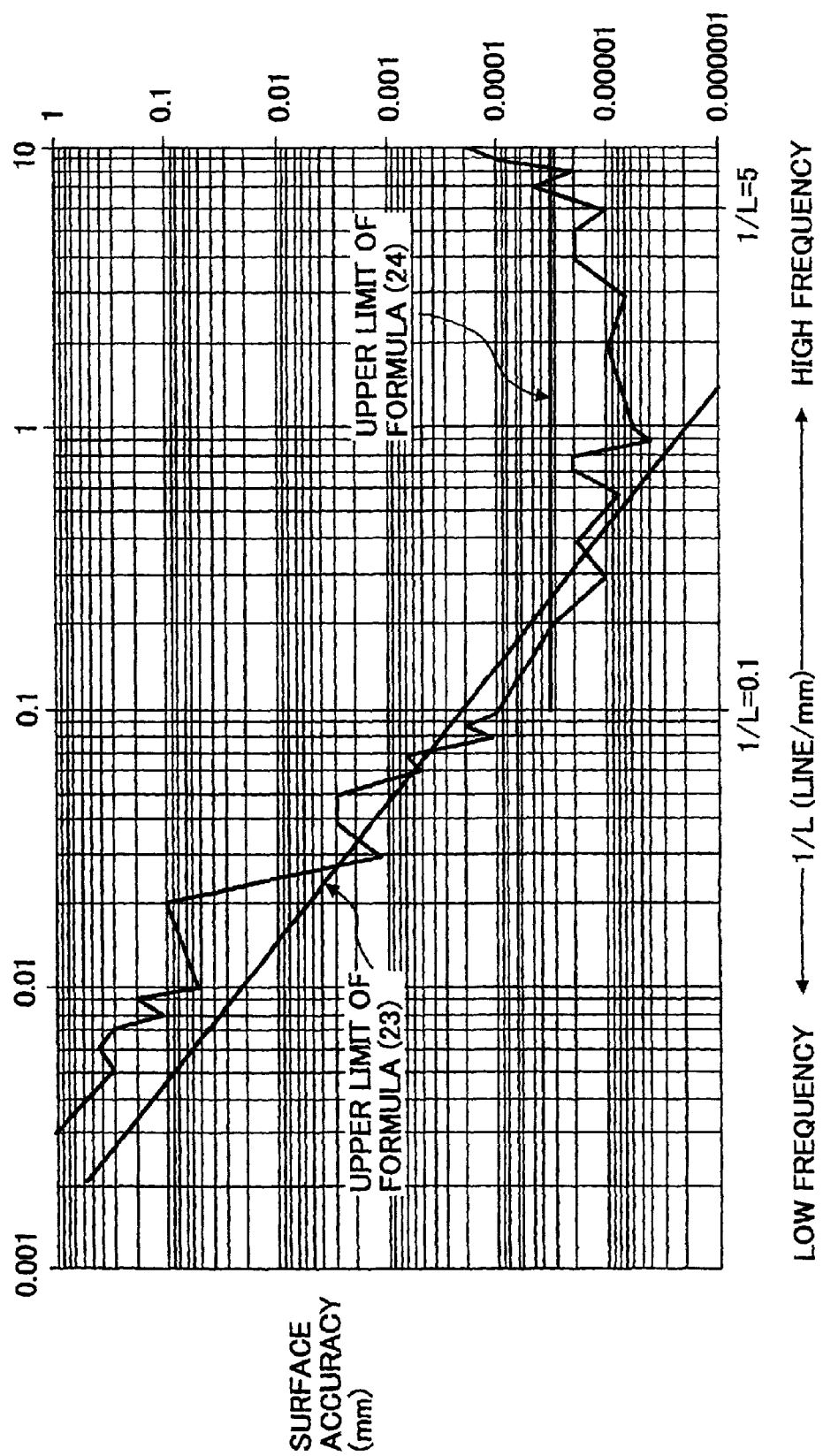

OPTICAL SCANNER, OPTICAL SCANNING METHOD, SCANNING IMAGE FORMING OPTICAL SYSTEM, OPTICAL SCANNING LENS AND IMAGE FORMING APPARATUS

BACKGROUND OF THE INVENTION

1. Field of the Invention

The present invention relates to an optical scanner, an optical scanning method, a scanning image forming optical system, an optical scanning lens and an image forming apparatus.

2. Discussion of the Background

An optical scanner is popularly known in relation to image forming apparatuses such as digital copying machines, optical printers, optical plotters, optical plate making machines, optical drawing machines and facsimile machines. A scanning image forming optical system, which is used in an optical scanner, condenses a luminous flux deflected by an optical deflector onto a surface to be scanned in the form of an optical spot. The optical spot condensed on the surface to be scanned by the scanning image forming optical system optically scans the surface to be scanned (practically, the photosensitive surface of a photosensitive medium comprising of a photoconductive member or the like) to write in an image.

For the scanning image forming optical system, the image surface curvature must satisfactorily be corrected so that the optical spot diameter does not vary much with the image height. To ensure satisfactory uniformity of optical scanning speed, the uniform speed characteristics such as fθ characteristic and linearity must as well be corrected satisfactorily.

For this purpose, it is often the usual practice to use a special surface shape typically represented by a non-spherical surface for the optical surface shape of an optical element (a lens or an image-forming mirror) composing the scanning image forming optical system.

Such an optical surface shape is generally formed by a forming die having a forming face (a face corresponding to the optical surface shape to be formed) formed thereon by a three-dimensional precision processing machine.

In this case, it is practically impossible to form the forming face of the die at accuracy which permits complete achievement of a designed surface shape. As a result, an actually formed optical surface shape contains a shape error to some extent relative to the designed surface shape.

In the optical surface containing such a shape error, when viewed in the main scanning direction, the shape error takes the form of a "swell" in the actual optical surface as compared with the design optical surface shape. That is, the actually formed optical surface shape becomes a shape deformed so as to have wave with reference to the design optical surface shape in the main scanning direction.

The swell as described above may be classified as follows in terms of the period of swell in the main scanning direction.

First is a low-frequency swell having a period longer than the effective width in the main scanning direction on the optical surface.

Second is a high-frequency swell having a period on a level equal to or lower than the luminous flux diameter in the main scanning direction of the incident luminous flux on the optical surface.

Third is a medium-frequency swell having a period between those of the low-frequency and the high-frequency swells in the main scanning direction of the optical surface.

A shape error of such an optical surface is a cause of occurrence of a change in the image surface position of the scanning image forming optical system.

This change in the image surface position in turn causes a change in the spot diameter of the optical spot formed on the surface to be scanned (the spot diameter referred to here is a spot diameter in the main scanning direction). When there is a change in the spot diameter in the main scanning direction according to the image height, there occurs a change in the size of dots drawn by the optical spot, which in turn causes density unevenness in which density of the written image varies in the main scanning direction. Such density unevenness is noticeably conspicuous particularly when an area is formed into a gray image area of a uniform density.

Density unevenness may be any of various frequencies ranging from low to high frequencies. When expressing the frequency of density unevenness by a spatial frequency (line/mm), the most conspicuous density unevenness to a viewer of an image, to judge from the visual properties of human eyes, in terms of spatial frequency, is believed to be density unevenness within a range of from 0.1 to 5 lines/mm.

While the low-frequency swell according to the above-mentioned classification exerts an effect on the uniform speed characteristic or change in the spot diameter, the effect on the uniform speed characteristic or density unevenness caused by the low-frequency swell is hardly noticeable by human eyes because of the long spatial period of change.

The high-frequency swell produces high-frequency density unevenness. The spatial frequency of high-frequency density unevenness, overlapping an area easily noticeable by human eyes, forms a factor causing image quality degradation.

The medium-frequency swell is a cause of degradation of the uniform-speed characteristics, and a swell of a relatively high frequency may be a cause of image quality degradation as a result of density unevenness.

Conceivable causes of a change in the image surface position bringing about a change in the spot diameter include:

(1) The image surface curvature in the main scanning direction at a design median of the scanning image forming optical system;

(2) The attachment position accuracy of optical component parts (a shift or tilting of optical elements);

(3) Processing errors of optical component parts (errors in the thickness or refractive index, excluding a shape error of the optical surface);

(4) Changes in environment (changes in the shape or in refractive index caused by a change in temperature or humidity); and (5) Shape errors of the optical surface.

Changes in the spot diameter caused by the factors (1) to (4) above are of a relatively low frequency, and can be improved by adjustments upon attaching optical component parts, or by designing the optical systems hardly susceptible to changes caused by a change in environment. These changes hardly become cause of density unevenness of a spatial frequency area easily noticeable by human eyes.

It is therefore effective to alleviate medium-frequency and high-frequency swells from among the shape errors of the optical surface as a counter-measure against density unevenness.

The swell of the optical surface of an optical element is referred to, for example, in Japanese Patent Application Laid-open Publication No. 9-80333. The Publication proposes use of an intensity distribution changing device which reduces magnetic permeability from the optical axis toward the periphery on the light source side as a counter-measure for eliminating dark streaks (a form of density unevenness described above) occurring on a recorded image as a result of a swell of the optical surface, but it does not disclose conditions for alleviating or eliminating dark streaks through control of the swell itself.

Laser printers, laser facsimile machines and digital copying machines are strongly demanded to require a lower cost, to achieve a more compact size, and to have higher performance. Along with these requirements, cost reduction, downsizing and promotion of performance are in progress in the area of optical scanning optical systems used in these machines. In order to satisfy these requirements toward a lower cost, a smaller size and higher performance, an effective method is to reduce the number of lenses through achievement of a non-spherical optical scanning lens, and in order to achieve a non-spherical lens, it is effective to introduce a plastic lens.

It is the common practice to integrally form a plastic lens by use of a forming die, with, however, partial occurrence of swells on the formed surface. When an image is formed by optical scanning with a plastic lens having a swell, the position of the beam waist varies on the surface to be scanned, and dark streaks may be produced in the sub-scanning direction on the portion corresponding to the swell. Particularly in an optical scanner or an image forming apparatus having increased resolution and high-density gradation, dark streaks caused by the swells on the lens surface are conspicuous.

FIGS. 1 and 2 illustrate variation of the beam waist position caused by swells on the lens surface. The amount of swell amplitude is of an order of several nm to several $\mu$m, resulting in a variation of the beam waist within a range of from 0.1 to 1 mm. In FIG. 1, the swell and the variation of the beam waist position are illustrated with exaggeration. In FIG. 1, a diverging luminous flux irradiated from a laser beam source 10 is condensed by a coupling lens 12. The sectional shape of the luminous flux is rectified through an aperture 14, and the flux is further condensed only in a sub-scanning direction (y-direction perpendicular to the paper plane in FIG. 1) by a cylindrical lens 16 so that a long line image is formed in a main scanning direction (x-direction in FIG. 1) near the deflecting reflective surface of an optical deflector 20. A mirror 18 which bends the luminous flux from the cylindrical lens 16 to direct the same to the optical deflector 20 is arranged between the cylindrical lens 16 and the optical deflector 20.

The above-mentioned luminous flux entering the deflecting reflective surface of the optical deflector 20 is deflected at a uniform angular speed on the deflecting reflective surface through rotational driving of the optical deflector 20. The thus deflected luminous flux is condensed through an optical scanning lens 30, as an optical spot on the surface to be scanned 40, and scanning is performed in the x-direction at a uniform speed on the surface to be scanned 40. The scanning range of the surface to be scanned 40 is represented by W.

A swell, if present on the optical scanning lens surface, affects the beam profile, i.e., the beam intensity distribution, and this poses a problem of occurrence of dark streaks in the output image. In FIG. 1, the swell on the surface of the lens 30 is illustrated with exaggeration with reference numeral 31, and the variation of the beam waist position on the surface to be scanned 40 caused by the swell 31 is represented with exaggeration with reference numeral 41. Presence of the swell 31 on the surface of the lens 30 means production of irregularities on the surface of the lens 30. The position of the beam waist on the scanned surface 40 varies as illustrated by a curve indicated by reference numeral 41 in a portion corresponding to these irregularities. Variation of the beam waist position causes back and forth shifting of the center position of the optical spot around the surface to be scanned 40, as illustrated in FIG. 2, thus causing beam growth in diameter on the surface to be scanned 40.

Inhibition of variation of the beam waist position and growth of the beam diameter on the surface to be scanned 40 caused thereby as described above can be achieved by suppressing a peak-to-valley (PV) height of a swell of the lens surface. For this purpose, it is necessary to process the lens while strictly controlling the lens forming die in the nanometer order, and to apply high-accuracy control during forming of the lens with the die as well as during measurement of the formed lens. There is therefore a limit to the satisfaction of the required accuracy.

FIG. 3 illustrates the relationship between the spatial frequency f of a swell and the allowable amount of amplitude. As illustrated in FIG. 3, the most strict condition (1) of accuracy required for processing of a lens having a length of about several hundred mm and a height of several tens of mm is generally believed to be a high accuracy of several nanometers. This leads to a further higher accuracy required for measurement such as an ultra-high accuracy as the sub-nanometer order. In addition, since the accuracy depends also upon swell frequency, the accuracy must be controlled for each level of frequency. FIG. 3 represents a case where the accuracy is controlled at four points, (1) to (4). Satisfaction of the requirement for such an ultra-high accuracy is however subject to a certain limit in the conventional art.

In addition to the above-mentioned accuracy problem, there is a room for further study on the method of evaluation thereof. It is the conventional method for evaluating a swell of the lens surface to express the swell by a three-dimensional coordinate of x, y and z. It was however difficult to conduct an evaluation satisfying the requirement for an ultra-high accuracy.

SUMMARY OF THE INVENTION

The present invention has been made in view of the above-discussed and other problems and addresses the above-discussed and other problems.

Accordingly, preferred embodiments of the present invention provide optical scanner, optical scanning method, scanning image forming optical system and image forming apparatus that effectively alleviate or eliminate occurrence of density unevenness of spatial frequency easily noticeable by human eyes, without using a device such as an intensity distribution changing device.

Further, another preferred embodiments of the present invention provide an optical scanning lens that permits inhibition of variation of the beam waist position caused by occurrence of a swell of the lens surface, an optical scanner free from growth of the beam diameter, and an image forming apparatus which gives a satisfactory image free from degradation, by setting curvature distribution as a control item for controlling the swell of the lens surface.

The optical scanner of the present invention is an optical scanner which performs optical scanning of a surface to be scanned by deflecting a luminous flux having a wavelength λ from a light source by means of an optical deflector, and condensing the deflected flux toward the surface to be scanned through a scanning image forming optical system, thereby forming an optical spot on the surface to be scanned.

The optical scanner of aspect 1 of the present invention is characterized in that the scanning image forming optical system has at least one lens.

When the focal length $f\sigma$ in the main scanning direction at a surface accuracy $\sigma i$ is defined as follows:

$$f\sigma = \{2.6846\lambda \times \sqrt{(k)} \times fm^2/\omega^2\} - fm \quad (3)$$

where, fm represents the focal length in the main scanning direction of the scanning image forming optical system; k represents the number of lens surfaces; ω represents the aimed spot diameter of the optical spot in the main scanning direction at an image height of 0; $\sigma i$ represents the surface accuracy of the i-th lens surface as counted from the optical deflector side; n represents the refractive index of material of the lens having the i-th lens surface; and 1/L represents the spatial frequency in the main scanning direction on the lens surface; then, the surface accuracy $\sigma i$, the focal length $f\sigma$, the refractive index n, and the spatial frequency 1/L satisfy, for each lens surface, the following condition:

$$0 < \log \sigma i < -2 \log (1/L) + \log [1/\{32 f\sigma(n-1)\}] \quad (1)$$

When W represents the optical flux diameter in the main scanning direction of the deflected luminous flux entering the i-th lens surface as counted from the optical deflector, the surface accuracy $\sigma i$, the focal length $f\sigma$, and the refractive index n satisfy the following condition:

$$0 < \log \sigma i < -2 \log (1/W) + \log [1/\{32 f\sigma(n-1)\}] \quad (2)$$

(aspect 2 of the present invention).

The above-mentioned surface accuracy σ, the focal length $f\sigma$ and the meaning of formulae (1) and (2) will be described later.

In the optical scanner according to any one of aspects 1 and 2 of the present invention, any of various laser beam sources may be used for the light source. For example, in the case of a long scanning length in which the scanning length of optical scanning is longer than 1 m, a beam source of a high output such as a gas laser is suitable for achieving a high-speed optical scanning.

In the case of optical scanning in a digital copying machine or the like used as a usual business machine, a semiconductor laser may be used as the light source. In this case, the beam flux is coupled with a subsequent optical system, deflected by the optical deflector, and enters the scanning image forming optical system (aspect 3 of the present invention).

The function of the coupling lens in this case may be a collimating function (aspect 4 of the present invention).

In the optical scanner of aspect 3 of the present invention, the scanning image forming optical system may consist of only lenses (aspect 5 of the present invention). In the optical scanner of aspect 4 of the present invention, the scanning image forming optical system may consist of only lenses (aspect 6 of the present invention). In the case of the optical scanner of aspect 5 of the present invention, the scanning image forming optical system may consist of two lenses (aspect 7 of the present invention). Similarly, in the optical scanner of aspect 6 of the present invention, the optical scanner may consist of two lenses (aspect 8 of the present invention).

In the optical scanner of aspect 3 of the present invention, when using a rotary mirror (a rotary single-face mirror, a rotary dihedral mirror, or a rotary polygon mirror), the coupled luminous flux is condensed in a sub-scanning direction by means of a line image forming optical system (a cylindrical lens or a cylindrical concave mirror) so that a line image long in the main scanning direction is formed near the deflecting reflective surface, and it is possible to achieve an anamorphic optical system in which an opto-geometric conjugate relationship is valid between the starting point of deflection by the optical deflector and the surface to be scanned relative to the sub-scanning direction (aspect 9 of the present invention).

In the optical scanner of aspect 9 of the present invention, the function of the coupling lens may be a collimating function (aspect 10 of the present invention).

Also in the optical scanner of aspect 9 of the present invention, the scanning image forming optical system may consist of only lenses (aspect 11 of the present invention). In the optical scanner of aspect 10 of the present invention as well, the scanning image forming optical system may consist of only lenses (aspect 12 of the present invention). In the optical scanner of aspect 11 of the present invention, the scanning image forming optical system may consist of two lenses (aspect 13 of the present invention). In the optical scanner of aspect 12 of the present invention, a scanning image forming optical system may consist of two lenses (aspect 14 of the present invention).

In the optical scanner of any of aspects 1 to 14 of the present invention, a rotary polygon mirror may be used as an optical deflector (aspect 15 of the present invention).

Aspect 16 of the present invention relates to an optical scanning method including the steps of causing an optical deflector to deflect a luminous flux having a wavelength λ from a light source, condensing the deflected luminous flux through a scanning image forming optical system toward a surface to be scanned, and forming an optical spot on the surface to be scanned, thereby conducting optical scanning of the surface to be scanned, in which an optical scanner of any of aspects 1 to 15 of the present invention is used.

Aspect 17 of the present invention relates to an optical scanning method including the steps of using a semiconductor laser as a light source, causing a luminous flux having a wavelength λ from a light source to enter an optical deflector via a coupling lens, deflecting the luminous flux through the optical deflector, condensing the deflected luminous flux toward a surface to be scanned through a scanning image forming optical system, and forming an optical spot on the surface to be scanned, thereby conducting optical scanning of the surface to be scanned, in which an optical scanner of any one of aspects 3 to 14 of the present invention is used.

Aspect 18 of the present invention relates to an optical scanning method including the steps of using a semiconductor laser as a light source, converting a luminous flux having a wavelength λ from a light source into a parallel luminous flux, then to enter an optical deflector via a coupling lens, deflecting the luminous flux through the optical deflector, condensing the deflected luminous flux toward a surface to be scanned through a scanning image forming optical system, and forming an optical spot on the surface to be scanned, thereby conducting optical scanning of the surface to be scanned, in which an optical scanner of any one of aspects 4, 6 and 8 of the present invention is used.

Aspect 19 of the present invention relates to an optical scanning method including the steps of using a semiconductor laser as a light source, coupling a luminous flux having a wavelength λ from a light source with a subsequent optical system through a coupling lens, condensing the coupled luminous flux in the sub-scanning direction by a line image forming optical system, forming a line image long in the main scanning direction near the deflecting reflective surface position of a rotary mirror serving as an optical deflector, and condensing the deflected luminous flux by a scanning image forming optical system toward a surface to be scanned to form an optical spot on the surface to be scanned, thereby conducting optical scanning of the surface to be scanned, in which an optical scanner of any one of aspects 9 to 14 of the present invention is used.

Aspect 20 of the present invention relates to an optical scanning method comprising the steps of using a semiconductor laser as a light source, converting a luminous flux having a wavelength λ from a light source into a parallel luminous flux, then condensing the parallel flux in a sub-scanning direction through a line image forming optical system to form a line image long in the main scanning direction near a deflecting reflective surface position of a rotary mirror serving as an optical deflector, and condensing the deflected luminous flux by a scanning image forming optical system toward a surface to be scanned to form an optical spot on the surface to be scanned, thereby conducting optical scanning of the surface to be scanned, in which an optical scanner of any one of aspects 10, 12 and 14 of the present invention is used.

In the optical scanning method of any one of aspects 16 to 20 of the present invention, the luminous flux may be deflected by means of a rotary polygon mirror serving as an optical deflector (aspect 21 of the present invention).

Aspect 22 of the present invention relates to an scanning image forming optical system used in an optical scanner performing optical scanning of a surface to be scanned by deflecting a luminous flux having a wavelength λ from a light source, and condensing the deflected luminous flux by a scanning image forming optical system toward the surface to be scanned to form an optical spot on the surface to be scanned, which is characterized in that the scanning image forming optical system has at least one lens, and when the focal length fσ in a main scanning direction at a surface accuracy σi is defined as:

$$f\sigma = \{2.6846\ \lambda \times \sqrt{(k)} \times fm^2/\omega^2\} - fm \quad (3)$$

where, fm represents the focal length in the main scanning direction; k represents the number of lens surfaces; σi represents the surface accuracy of the i-th lens surface as counted from the optical deflector side; n represents the refractive index of material of the lens having the i-th lens surface; and 1/L represents the spatial frequency in the main scanning direction on the lens surface; then, the surface accuracy σi, the focal length fσ, the refractive index n, and the spatial frequency 1/L satisfy, for each lens surface, the following condition:

$$0 < \log\ \sigma i < -2\ \log\ (1/L) + \log\ [1/\{32\ f\sigma(n-1)\}] \quad (1)$$

In the scanning image forming optical system of aspect 22 of the present invention, when W represents the optical flux diameter in the main scanning direction of the deflected luminous flux entering the i-th lens surface as counted from the optical deflector, the surface accuracy σi, the focal length fσ, and the refractive index n satisfy the following condition:

$$0 < \log\ \sigma i < -2\ \log(1/W) + \log\ [1/\{32\ f\sigma(n-1)\}] \quad (2)$$

for each lens surface, without depending upon the spatial frequency, for a spatial frequency of up to (1/W) (aspect 23 of the present invention).

In the scanning image forming optical system of any one of aspects 22 and 23 of the present invention, the luminous flux from the semiconductor laser may enter the scanning image forming optical system via the coupling lens and the optical deflector (aspect 24 of the present invention). In this case, the luminous flux may be converted into a parallel luminous flux by the coupling lens and is deflected by the optical deflector to enter the optical scanner (aspect 25 of the present invention).

The scanning image forming optical system of aspect 24 of the present invention may consist of only lenses (aspect 26 of the present invention), and the scanning image forming optical system of aspect 25 of the present invention may as well consist of only lenses (aspect 27 of the present invention). The scanning image forming optical system of aspect 26 of the present invention may consist of two lenses (aspect 28 of the present invention), and the scanning image forming optical system of aspect 27 may as well consist of two lenses (aspect 29 of the present invention).

The scanning image forming optical system of aspects 22 and 23 of the present invention may be formed into an anamorphic optical system associating the starting point of deflection by the optical deflector and the surface to be scanned into an opto-geometrical conjugate relationship relative to the sub-scanning direction (aspect 30 of the present invention).

The scanning image forming optical system according to aspect 30 of the present invention may have such a configuration that the deflected luminous flux, which is a parallel luminous flux, enters the system in the main scanning direction (aspect 31 of the present invention).

The scanning image forming optical system of aspect 30 of the present invention may consist of only lenses (aspect 32 of the present invention), and the optical scanner of aspect 31 of the present invention may as well consist of only lenses (aspect 33 of the present invention). The scanning image forming optical system of aspect 32 of the present invention may consists of two lenses (aspect 34 of the present invention), and the scanning image forming optical system of aspect 33 of the present invention may as well consist of two lenses (aspect 35 of the present invention).

In the scanning image forming optical system according to any one of aspects 22 to 35 of the present invention, at least one of the lenses may be a plastic lens (aspect 36 of the present invention).

The image forming apparatus of aspect 37 of the present invention is an image forming apparatus which applies optical scanning by an optical scanner to a photosensitive surface of a photosensitive medium to form a latent image, and obtains an image by visualizing the latent image, in which an optical scanner of any one of aspects 1 to 15 is used for performing optical scanning of the photosensitive surface of the photosensitive medium.

The image forming apparatus of aspect 37 of the present invention may have a configuration in which an electrostatic latent image is formed on a photoconductive member serving as the photosensitive medium by conducting uniform charging of the photosensitive surface of the photoconductive member and optical scanning with the optical scanner, and the latent image is visualized as a toner image (aspect 38 of the present invention). The toner image is fixed on a sheet-shaped recording medium, such as a transfer sheet or an OHP sheet (plastic sheet for overhead projector).

In the image forming apparatus of aspect 36 of the present invention, a silver halide photo-film may be used as the photosensitive medium. In this case, the latent image formed through optical scanning performed by the optical scanner can be visualized by the developing technique of an ordinary silver halide photographic process. Such an image forming apparatus can be implemented in the form of an optical plate-making apparatus or an optical drawing apparatus.

The image forming apparatus of aspect 38 of the present invention can be implemented, more specifically, in the form of a laser printer, a laser plotter, a digital copying machine or a facsimile machine.

The scanning image forming optical system, when consisting of only lenses, may consist of two lenses, as described above, may consist of a single lens, or three or more lenses. The scanning image forming optical system may also consist of a mirror (image forming mirror) having an image forming function and one or more lenses.

The optical scanner of aspect 39 of the present invention is an optical scanner which performs optical scanning of a surface to be scanned by deflecting a luminous flux having a wavelength $\lambda$ from a light source side by means of an optical deflector, condensing the deflected luminous flux through a scanning image forming optical system toward the surface to be scanned to form an optical spot on the surface to be scanned. The optical scanner is characterized in that when the optical spot to be formed on the surface to be scanned has an aimed spot diameter $\omega$ in a main scanning direction of the optical spot at an image height of 0, and change $\Delta$ in the beam waist position in the main scanning direction of the deflected luminous flux relative to the surface to be scanned is exploded into components of the spatial frequency, the change $\Delta$ satisfies the condition:

$$\{\Delta \cdot \lambda / \omega^2\} < 0.4 \quad (20)$$

within a range of the spatial frequency (1/L: line/mm) of:

$$0.1 < (1/L) < 5.$$

The optical scanner of aspect 40 of the present invention is an optical scanner which performs optical scanning of a surface to be scanned by deflecting a luminous flux having a wavelength $\lambda$ from a light source by means of an optical deflector, and condensing the deflected luminous flux through a scanning image forming optical system toward the surface to be scanned to form an optical spot on the surface to be scanned. The scanning image forming optical system includes one or more lenses, and when the optical spot to be formed on the surface to be scanned has an aimed spot diameter $\omega$ in a main scanning direction of the optical spot at an image height of 0, and a surface accuracy $\sigma$ on each lens of the scanning image forming optical system is exploded into components of the spatial frequency, within a range of the spatial frequency of:

$$0.1 < (1/L) < 5,$$

the lens surface accuracy $\sigma$, the focal length $f\sigma$ in the main scanning direction at the surface accuracy $\sigma$, and the refractive index n of the lens having the lens surface satisfy the condition:

$$0 < \log \sigma < -2 \log (1/L) + \log [1/\{32 f\sigma(n-1)\}] \quad (21)$$

within a range of luminous flux width of at least W in the main scanning direction on the lens surface, and satisfy the condition:

$$0 < \log \sigma < -2 \log (1/W) + \log [1/\{32 f\sigma(n-1)\}] \quad (22)$$

within a range of luminous flux width of under W.

The focal length $f\sigma$ in the main scanning direction at a surface accuracy $\sigma$ is defined by the above-mentioned formula (3):

$$f\sigma = \{2.6846\lambda \times \sqrt{(k)} \times fm^2 / \omega^2\} - fm.$$

Thus, in the optical scanner according to aspect 40 of the present invention, the scanning image forming optical system includes lenses satisfying the above-mentioned conditions (21) and (22).

The optical scanner of aspect 41 of the present invention is an optical scanner which performs optical scanning of a surface to be scanned by deflecting a luminous flux having a wavelength $\lambda$ from a light source by means of an optical deflector, and condensing the deflected luminous flux through a scanning image forming optical system toward the surface to be scanned to form an optical spot on the surface to be scanned. The scanning image forming optical system include one or more mirrors having an image forming function, and when the optical spot to be formed on the surface to be scanned has an aimed spot diameter $\omega$ in a main scanning direction of the optical spot at an image height of 0, and the surface accuracy $\sigma$ of each mirror of the scanning image forming optical system is exploded into components of the spatial frequency, within a range of the spatial frequency (1/L: line/mm) of:

$$0.1 < (1/L) < 5,$$

the mirror surface accuracy $\sigma$, and the focal length $f\sigma$ in the main scanning direction at the surface accuracy $\sigma$ satisfy the condition:

$$0 < \log \sigma < -2 \log (1/L) + \log [1/\{64 f\sigma\}] \quad (23)$$

within a range of luminous flux width of at least W in the main scanning direction on the mirror surface, and satisfy the condition:

$$0 < \log \sigma i < -2 \log (1/W) + \log [1/\{64 f\sigma\}] \quad (24)$$

within a range of luminous flux width of under W. The focal length $f\sigma$ in the main scanning direction at a surface accuracy $\sigma$ is defined by the above-mentioned formula (3).

That is, in the optical scanner according to aspect 41 of the present invention, the scanning image forming optical system includes an image forming mirror having a mirror surface satisfying the above-mentioned conditions (23) and (24).

It is needless to mention that a high-output light source such as a gas laser, or any of various light sources including a semiconductor laser may be used as the light source for the optical scanner of any one of aspects 39 to 41. When using a semiconductor laser as a light source, a luminous flux from the light source is coupled with the subsequent optical systems through a coupling lens and deflected by an optical deflector so as to enter the scanning image forming optical system. In this case, the function of the coupling lens may be a collimating function.

In the optical scanner of any one of aspects 39 to 41 of the present invention, the scanning image forming optical system may consist of only lenses, and in this case, the scanning image forming optical system may also consist of two lens. In the optical scanner of any one of aspects 39 and 41, the scanning image forming optical system may consist of only image forming mirrors, or a combination of an image forming mirror and a lens.

Also in the optical scanner according to any one of aspects 39 to 41 of the present invention, when using a rotary mirror having a deflecting reflective surface (a rotary single-face mirror, a rotary two-face mirror, a rotary polygon mirror) as the optical deflector, the coupled luminous flux is condensed in the sub-scanning direction by a line image forming optical system (a cylindrical lens or a cylindrical concave mirror) so as to form a line image long in the main scanning direction near the deflecting reflective surface of the rotary mirror, and the scanning image forming optical system may be an anamorphic optical system keeping the deflection starting point of deflection by the optical deflector and the surface to be scanned in an opt-geometrically conjugate relationship.

The image forming apparatus of aspect 42 of the present invention is an image forming apparatus for forming a latent image on a photosensitive surface of a photosensitive medium through optical scanning of the photosensitive surface by an optical scanner and visualizing the latent image, thereby obtaining an image. An optical scanner according to any one of aspects 39 to 41 of the present invention is used as an optical scanner for conducting optical scanning of the photosensitive surface of the photosensitive medium. In this case as well, the photosensitive medium may be a photoconductive member, and the electrostatic latent image formed through uniform charging of the photosensitive surface of the photoconductive member and optical scanning of the photosensitive surface by the optical scanner may be visualized as a toner image (aspect 43 of the present invention).

The image forming apparatus of aspect 42 of the present invention, as in that according to aspect 37, may be implemented as a photo-plate making apparatus or a photo-drawing machine. The image forming apparatus of aspect 43 of the present invention, as in the image forming apparatus of aspect 38, can be implemented as a laser printer, a laser plotter, a digital copying machine, or a facsimile machine.

A semiconductor laser, if used as the light source as in the optical scanners of aspects 3 to 14, or in the optical scanning methods of aspects 17 to 20 of the present invention, permits achievement of a more compact energy-saving optical scanner.

When the luminous flux from the semiconductor laser is converted into a parallel luminous flux through the coupling lens as in the optical scanners of aspects 4, 6, 8, 10, 12 and 14, or the optical scanning methods of aspects 18 and 20 of the present invention, the degree of freedom of the positions of arrangement of the optical elements in the optical path after the coupling lens is increased, and the attachment accuracy requirement in the optical path direction is moderated, thus facilitating attachment of the optical system.

Face tilting of the optical deflector can effectively be corrected by forming the luminous flux from the light source side into a line image long in the main scanning direction near the deflecting reflective surface of the optical deflector, and by using an anamorphic optical system as the scanning image forming optical system, as in the optical scanners of aspect 10, 12 and 14, or the optical scanning methods of aspect 20 of the present invention.

Use of a rotary polygon mirror as the optical deflector as in the optical scanner of aspect 15, or the optical scanning method of aspect 21 of the present invention leads to a larger number of deflections per turn as compared with the case of use of a rotary single-face mirror or a rotary two-face mirror, thus resulting in a high efficiency of optical scanning.

Another aspect 44 of the present invention relates to an optical scanning lens used in a scanning image forming optical system which condenses a luminous flux deflected by an optical deflector near the surface to be scanned. The optical scanning lens is characterized in that, when the maximum value of dispersion of curvature distribution of a curved surface within an area of the lens through which passes the luminous flux, the relationship:

$$\Delta C \leq 2 \times w^2 / \{(n-1) \times \lambda \times S'^2\}$$

is satisfied, where:

w: beam spot radius on the surface to be scanned;

n: refractive index of the lens;

λ: light source wavelength; and

S': distance between the rear principal point and the image surface in the scanning image forming optical system.

According to another aspect 45 of the present invention, an optical scanning lens used in a scanning image forming optical system which condenses a luminous flux deflected by an optical deflector near the surface to be scanned is characterized in that when the maximum value of dispersion of curvature distribution of a curved surface in the principal scanning direction within an area of the lens through which passes the luminous flux is ΔC, the relationship:

$$\Delta C \leq 2 \times w^2 / \{(n-1) \times \lambda \times F^2\}$$

is satisfied, where:

w: beam spot radius on the surface to be scanned;

n: refractive index of the lens;

λ: light source wavelength; and

F: focal length of the scanning image forming optical system as a whole in the main scanning direction.

According to still another aspect 46 of the present invention, an optical scanning lens used in a scanning image forming optical system which condenses a luminous flux deflected by an optical deflector near the surface to be scanned is characterized in that when the maximum value of dispersion of curvature distribution of a curved surface within an area of the lens through which passes the luminous flux is ΔC, the relationship:

$$0.2/K \leq \Delta C \times (n-1) \times \lambda \times (S'/w)^2 \leq 2$$

is satisfied, where:

K: number of optical elements from the optical deflector to the image surface;

w: beam spot radius on the surface to be scanned;

n: refractive index of the lens;

λ: light source wavelength; and

S': distance between the rear principal point and the image surface in the scanning image forming optical system.

According to still another aspect 47 of the present invention, an optical scanning lens used in a scanning image forming optical system which condenses a luminous flux deflected by an optical deflector near the surface to be scanned is characterized in that when the average curvature of a curved surface within an area of the lens through which passes the luminous flux is q(x), and the approximate curve of a tenth or lower degree of q(x) is q0(x), the relationship:

$$q\_PV \times (n-1) \times \lambda \times (F/wd)^2 \leq 1$$

is satisfied, where:

wd: beam spot diameter on the surface to be scanned in the main scanning direction;

n: refractive index of the lens;

λ: light source wavelength;

F: focal length of the scanning image forming optical system in the main scanning direction; and $$q\_PV = \max\{q(x)-q0(x)\} - \min\{q(x)-q0(x)\}$$

According to still another aspect 48 of the present invention, an optical scanning lens used in a scanning image forming optical system which condenses a luminous flux deflected by an optical deflector near the surface to be scanned is characterized in that when the average curvature of a curved surface within an area of the lens through which passes the luminous flux is q(x), and the approximate curve of a tenth or lower degree of q(x) is q0(x), the relationship:

$$0.1/K \leq q\_PV \times (n-1) \times \lambda \times (S'/wd)^2 \leq 1$$

is satisfied, where:

wd: beam spot diameter on the surface to be scanned;
n: refractive index of the lens;
λ: light source wavelength;
S': distance between the rear principal point and the image surface of the scanning image forming optical system; and $$q\_PV = \max\{q(x)-q0(x)\} - \min\{q(x)-q0(x)\}.$$

Another aspect 49 of the present invention relates to an optical scanner which deflects a luminous flux from a light source, condenses the deflected luminous flux onto a surface to be scanned as an optical spot through an optical scanning lens, and optically scans the surface to be scanned at a uniform speed by means of the optical spot, in which the optical scanner mounts the optical scanning lens of any one of aspects 44–48 of the present invention.

Another aspect 50 of the present invention relates to an image forming apparatus having an optical scanner of aspect 49 of the present invention, in which the surface to be scanned comprises a photosensitive member, and an electrostatic latent image is formed on the surface to be scanned through optical scanning of the surface to be scanned by the optical scanner.

The individual aspects of the present invention will now be complementarily described.

From among the various quantities mentioned in aspects 1, 2, 22, 23, 39, 40 and 41, the focal length fm in the main scanning direction of the scanning image forming optical system means the synthetic focal length in the main scanning direction of the scanning image forming optical system.

The number of faces of the scanning image forming optical system means the number of optical surfaces, and when mirrors are contained in the scanning image forming optical system, each image forming reflecting surface is counted as one face.

The spot diameter ω in the aimed main scanning direction of the optical spot at an image height of 0 means a design spot diameter in the main scanning direction when the optical spot formed by the scanning image forming optical system has an image height of 0. The aimed spot diameter is designed so as to achieve a spot diameter slightly smaller than the assumed spot diameter.

For example, when conducting optical scanning on the assumption of a spot diameter of 30 μm in the main scanning direction, the optical system is designed by setting an aimed spot diameter ω of 27 μm, which is smaller than the assumed spot diameter of 30 μm by about 10%.

The above-mentioned spot diameter ω means a width in the main scanning direction having an intensity of at least $1/e^2$ on the assumption that the maximum value of the optical intensity distribution at the beam waist of the optical spot in the main scanning direction at the line spread function in the main scanning direction is 1.

The term "surface accuracy" will now be described.

For an arbitrary optical surface, the design shape of the shape in the main scanning direction (the shape of a flat cross-section in parallel with the main scanning direction, including an axis serving as a reference for the optical shape) is represented by "Φ(Y)" by using the coordinate Y of the main scanning direction with the above-mentioned reference axis position as the origin. That is, Φ(Y) is an analytical expression of the design shape of the optical surface.

On the other hand, the actual optical surface (the actually formed shape of the above-mentioned arbitrary optical surface) is measured (the measuring method may be any appropriate one of the known methods including the probe method, the optical pickup method and the interference method, and should preferably have a measuring resolution in the height direction of up to 10 nm), and the measured optical surface shape in the main scanning direction is fitted by use of the measured data in accordance with the following formula (4):

$$F(Y)=(Y^2/Rm)/[1+\sqrt{(1+K)(Y/Rm)^2}]+A_1 \cdot Y + A_2 \cdot Y^2 + A_3 \cdot Y^3 + \ldots + A_9 \cdot Y^9 + A_{10} \cdot Y^{10} \quad (4)$$

That is, the right side "Rm, K, Ai (i=1, 2, 3, 4, 5, 6, 7, 8, 9, 10)" of the formula is specified by the least mean square method on the basis of the measured data.

The thus fitted "F(Y)" is subtracted from Φ(Y), and the result of subtraction is expressed as "F'(Y)":

$$F'(Y)=\Phi(Y)-F(Y) \quad (5)$$

The above-mentioned process is descriptively illustrated in FIGS. 4A and 4B. In FIG. 4A, the curve indicated by reference numeral 41 represents the design shape Φ(Y), and the curve indicated by reference numeral 43 represents F(Y) resulting from fitting of the measured shape in accordance with the above-mentioned formula. Rm represents the curvature radius of Φ(Y) in the main scanning direction.

The curve 45 shown in FIG. 4B represents F'(Y) mentioned above.

Thus obtained F'(Y) is exploded with a cosine function as follows:

$$F'(Y)=\Sigma Aj \cdot \cos[2\pi\{mj(Y/Lr)+\alpha j\}] \quad (6)$$

The explosion parameter j takes a value within a range of from 1 to a prescribed number S, and S should preferably be within a range of from 50 to 100.

An amplitude twice as large as the explosion coefficient Aj in the above-mentioned explosion formula, i.e., the amplitude of the cosine function having a coefficient Aj is defined as a surface accuracy (at a spatial frequency 1/Lr). In the explosion formula, mj represents the number of waves, αj represents the initial phase; and Lr represents evaluation width. The evaluation width Lr corresponds to a length of a part of the optical surface in the main scanning direction for which the above explosion is applied. By using the valuation width Lr as an effective width of the optical surface in the main scanning direction, it is possible to determine the surface accuracy of the aforementioned medium-frequency area. In this case, the surface accuracy for the high-frequency area can be determined by using a larger degree of S. A high-frequency surface accuracy can be easily determined by using the evaluation width Lr as a luminous flux width 2W in the main scanning direction of the incident luminous flux at the position of the optical surface. In this case, the above-mentioned parameter j may be within a range of from 1 to 50.

The highest value S of the parameter j is approximately Lr/Lm when the luminous flux diameter in the main scanning direction of the incident luminous flux entering the optical surface is represented by Lm. For example, when Lr=100 mm and Lm=1 mm, then, S≈100.

The surface accuracy can therefore be expressed by a series of values $2A_1, 2A_2, 2A_3, 2A_4, \ldots 2A_{S-1}$. The surface accuracy, i.e., the set of the thus obtained series of values can be expressed as σi (mj), where "i" indicates that this is the i-th optical surface, and "mj" corresponds to the number of waves mj, i.e., means "2Aj". Because the number of waves mj represents how many waves (cosine waves) there are within the phase $2\pi$, it corresponds to the spatial frequency on the optical surface and can therefore be converted into a spatial frequency 1/L (line/mm).

It is an ideal for optical scanning to be carried out with the aforementioned assumed spot diameter. In practice, however, resulting from the attachment position accuracy of optical component parts, the processing error of optical component parts or the changes in environment, an image surface where a deflected luminous flux forms an image shifts in a direction perpendicular to the surface to be scanned relative to the ideal image surface (substantially agreeing with the surface to be scanned). This is a change in the image surface position.

Because the deflected luminous flux forms an image on the image surface, the spot diameter is the smallest on the image surface. Upon a change in the image surface position, there occurs a separation of the image surface and the surface to be scanned (defocusing). The spot diameter of an actual optical spot formed on the surface to be scanned is therefore different from the assumed spot diameter, and varies with the change in the image surface position.

In this case, when a range of spot diameter smaller than a value, for example, larger by 10% than an assumed spot diameter, is set as an allowable range of change in spot diameter, the range within which a change in spot diameter on the surface to be scanned occurring with a change in the image surface position is within the above-mentioned allowable range is referred to as a depth margin.

For example, FIG. 5A illustrates patterns of change in the spot diameter in the main scanning direction under the effect of defocusing caused by a change in the image surface position, i.e., shift between the surface to be scanned and the image surface, relative to various image heights. In FIG. 5A, the abscissa is in units of mm. In this example, a spot diameter of 30 μm is assumed in the main scanning direction, and the design is conducted with 27 μm, smaller than the assumed spot diameter by 10%, as an aimed spot diameter. The range within which the change in the spot diameter is up to 33 μm (larger than the assumed spot diameter of 30 μm by 10%) is the depth margin in this drawing. As is clear from the definition of the term depth margin, with a larger depth margin, an optical scanner is more hardly effected by a mounting error, a processing error, or a change in environment.

When the depth margin is "2d", it is dependent upon the aimed spot diameter ω and the luminous flux wavelength λ, and can be expressed at a high accuracy by:

$$2d \approx 1.49\, \omega^2/\lambda \tag{7}$$

Among the factors (1) to (5) causing a change in the image surface position, as listed above, the margin of a change in the image surface position caused by any of the factors (1) to (4), excluding the surface accuracy, is empirically known to be about ¾ of the depth margin. This means that the margin of a change in the image surface position caused by surface accuracy is about ¼ of the depth margin.

In the present invention, therefore, the margin of a change in the image surface position caused by the surface accuracy is determined to be ¼ of the depth margin, and this margin is equally divided and assigned to individual optical surfaces (refractive faces, image forming reflecting faces) of the optical elements composing the scanning image forming optical system.

More specifically, the number of the optical surfaces is represented by k, and a change in the image surface position caused by surface accuracy on each optical surface is represented by Δi (i=1 to k). Since contribution by the entire optical surfaces is additive, the amount of change in the image surface position δ caused by surface accuracy of all the optical surfaces can be expressed by:

$$\delta = \sqrt{(\Sigma \Delta i^2)} \tag{8}$$

The margin of the amount of change in the image surface position Δ equally assigned to the individual optical surfaces can be expressed as "δ/√(k)". If δ is assumed to be ¼ of the depth margin, i.e., d/2, and because $d/2 \approx 1.49\, \omega^2/4\, \lambda = 0.3725\, \omega^2/\lambda$, the margin of a change in the image surface position caused by surface accuracy allowed per an optical surface would be:

$$\Delta = 0.3725\, \omega^2/\lambda\sqrt{(k)} \tag{9}$$

As described above, the shift from the design optical surface specified as a surface accuracy is a set of cosine functions having an amplitude Aj with various numbers of waves mj, and surface irregularities according to the individual cosine functions serve as refractive faces or image forming reflecting faces themselves. Therefore, if a swell as specified by the surface accuracy is present on the optical surface, such a swell exerts an optical effect of causing a change in focal length fm of the scanning image forming element in the main scanning direction. That is, the above-mentioned swell itself would have a focal length.

The margin of a change in the image surface position caused by the surface accuracy on an optical surface is Δ. If a change in the image surface position corresponding to Δ is considered to be brought about by the action of the focal length of the swell itself of that optical surface, the focal length fσ of the swell itself is available from:

$$f\sigma = (fm^2/\Delta) - fm \tag{10}$$

This focal length fσ is the very focal length σ in the main scanning direction resulting from the surface accuracy σi.

By incorporating the right side of formula (9) in Δ in formula (10), there is obtained:

$$F\sigma \{2.6846\, \lambda\sqrt{(k)} fm^2/\omega^2\} - fm \tag{3}$$

When the optical face in question in this case is a lens surface, and the accuracy of the lens surface at which the effect of swell of the lens surface is equal to the focal length fσ (critical surface accuracy) is expressed as a function $\sigma_0(1/L)$ of the spatial frequency 1/L in the main scanning direction on the lens surface, this can be expressed as:

$$\sigma_0(1/L) = L^2/\{(n-1) 32\, f\sigma\} \tag{11}$$

The both sides of formula (11), in common logarithm, would give:

$$\log \sigma_0(1/L) = -2\, \log\, (1/L) + \log\, [1/\{32\, f\sigma(n-1)\}] \tag{12}$$

Therefore, the surface accuracy of the lens surface σi (mj) (j=1, 2, 3, . . . , S) should satisfy, within a range of spatial frequency 1/L of medium and high frequencies, the following formula:

$$\log\, \sigma i(mj) < -2\, \log\, (1/L) + \log\, [1/\{32\, f\sigma(n-1)\}]$$

To take account of a continuous area of spatial frequencies, "mj" in the surface accuracy σi(mj) may be omitted to rewrite the formula:

$$\log \sigma i < -2 \log (1/L) + \log [1/\{32 f\sigma(n-1)\}] \quad (13)$$

If the surface accuracy is not 0, because log σi is inevitably greater than 0, there is available:

$$0 < \log \sigma i < -2 \log (1/L) + \log [1/\{32 f\sigma(n-1)\}] \quad (1)$$

Referring to FIG. 6, the abscissa represents log (1/L), and the spatial frequency becomes lower toward the left on the graph. The ordinate represents log σi. The diagonal straight line 61 represents the following equation:

$$\log \sigma_0(1/L) = -2 \log (1/L) + \log [1/\{32 f\sigma(n-1)\}]$$

The curves 62 and 63 represent two typical values of surface accuracy.

That is, these curves 62 and 63 are drawn by converting the lens surface accuracy σi(mj) on a spatial frequency scale, plotting the resultant values for j=1 to S, and connecting the plots smoothly.

The surface accuracy represented by curve 62 satisfies formula (1) for all areas of the spatial frequency 1/L. When a lens surface has such a surface accuracy, therefore, a change in the image surface position caused by such a surface accuracy of the lens surface would be within the margin of change in the image surface position Δ.

Therefore, if values of lens surface accuracy satisfy formula (1) for one or more lenses contained in the scanning image forming optical system according to aspect 22 of the present invention, such lenses would be acceptable as lenses composing the scanning image forming optical system.

The surface accuracy represented by curve 63 in FIG. 6 has, in contrast, a portion 63A not satisfying formula (1) in a part exhibiting a relatively high spatial frequency. For the lens surface having such a surface accuracy, therefore, a change in the image surface position caused by a surface accuracy is not within the margin Δ. When formula (1) is not satisfied for one or more optical surfaces of the scanning image forming optical system, a change in the image surface position caused by the surface accuracy exceeds the margin Δ, and the range of variation of the spot diameter exceeds the depth margin. This may result in a risk of noticeably causing density unevenness in question here.

When the frequency of density unevenness is represented by a spatial frequency [line/mm] as described above, density unevenness within a spatial frequency region of 0.1 to 5 lines/mm is generally believed to be conspicuous to the eyes of a viewer of the image, to judge from the visual properties of human eyes.

On the other hand, the lens surface of each of the lenses contained in the scanning image forming optical system has an effective width in the main scanning direction of about 0.1 to 0.7 relative to the effective scanning width of 1 on the surface to be scanned. The luminous flux width W in the main scanning direction of the incident luminous flux (deflected flux) entering these lenses is within a range of about 10 to 1 mm. The above-mentioned luminous flux diameter W on the lens surface, if converted to the spatial frequency, corresponds to a range of from 0.1 to 1 line/mm. In other words, a value 1.4 to 10 times as large as the spatial frequency of the luminous flux diameter W on the lens surface is considered to correspond to the spatial frequency on the recorded image surface. When considering that the spatial frequency 1/L appearing in the right-end side of formula (1) is a variable of a logarithmic function, what plays a direct role under conditions given by formula (1) is not the spatial frequency itself, but a common logarithmic value thereof. As a result, for the logarithmic value log (1/L) of the spatial frequency, it is not necessary to consider a substantial difference between the spatial frequency on the lens surface and the spatial frequency on the surface to be scanned which is about 1.4 to 10 times as large.

According to the reasoning as described above, the spatial frequency range of from 0.1 to 5 lines/mm conspicuous to human eyes in the density unevenness in a recorded image is a spatial frequency range applicable also when considering the surface accuracy on a lens surface.

Within a range of values smaller than the luminous flux diameter W on the lens surface, the effect of wave surface aberration becomes predominant on a change in the image surface position. As a consequence, the effect on the change in the image surface position of frequency components having a period shorter than the luminous flux diameter W from among the frequency components of the surface accuracy of the lens surface is considered to become substantially uniform because the change in the image surface position does not depend upon the spatial frequency.

Therefore, within a range satisfying formula (1), for an area of spatial frequency smaller than the spatial frequency 1/W corresponding to the luminous flux diameter W of the incident luminous flux entering an arbitrary lens surface in the main scanning direction, it suffices that the surface accuracy σi of the lens surface, the focal length fσ and the refractive index n satisfy the condition:

$$0 < \log \sigma i < -2 \log (1/W) + \log [1/\{32 f\sigma(n-1)\}] \quad (2)$$

without depending upon the spatial frequency 1/L.

In FIG. 6, the straight chain line indicated by reference numeral 64 represents formula (2). The point of intersection of straight lines 64 and 61 corresponds to the above-mentioned spatial frequency 1/W.

Therefore, in an arbitrary lens contained in the scanning image forming optical system according to aspect 23 of the present invention, if the surface accuracy for all the lens surfaces satisfies formula (1) for spatial frequencies lower than the spatial frequency 1/W, and further satisfies formula (2) for spatial frequencies higher than 1/W, such lenses are acceptable as lenses for a scanning image forming optical system.

The surface accuracy of a lens contained in a scanning image forming optical system has been described above.

A scanning image forming optical system can contain, not only lenses, but also an image forming mirror having an image forming function. In this case, the above-mentioned optical surface serves as an image forming reflecting surface.

The surface accuracy of such an image forming reflecting surface can be also defined in the same manner as in the surface accuracy described above, with the same process of introducing formulae (1) and (2) forming conditions for the surface accuracy of a lens.

In this case, when the function of the spatial frequency 1/L in the main scanning direction on the image forming reflecting surface is represented by $\sigma_0(1/L)$, the accuracy of the image forming reflecting surface, with which the effect of swell on the image forming reflecting surface becomes equal to the above-mentioned focal length fσ (and which is referred to as critical surface accuracy), can be expressed with a satisfactory approximation by:

$$\sigma_0(1/L) = L^2/(64 f\sigma) \quad (11A)$$

In this case, the condition to be satisfied by the surface accuracy σi (image forming reflecting surface) would be as follows in place of the above-mentioned formula (1):

$$0<\log \sigma i(\text{image forming reflecting surface})<-2 \log (1/L)+\log [1/(64 f\sigma)] \quad (1A)$$

and in place of the above-mentioned formula (2):

$$0<\log \sigma i(\text{image forming reflecting surface})<-2 \log (1/W)+\log [1/\{64 f\sigma\}] \quad (2A)$$

These formulae (1A) and (2A) are applicable also to a scanning image forming optical system comprising only image forming mirrors. In this case, the number of optical surfaces k is replaced by the number of image forming reflecting surfaces.

Let us now consider a case where optical surfaces of optical elements (lenses or image forming mirrors) composing a scanning image forming optical system are formed by use of forming dies. Optical elements are manufactured on trial by means of the prepared forming dies.

The individual optical surfaces of the optical elements thus manufactured on trial are measured to determine values of surface accuracy as described above. It is checked whether the surface accuracy of each optical surface of the optical elements satisfies formula (1) or (2) (when the optical surface is a lens surface), or satisfies formula (1A) or (2A) (when the optical surface is an image forming reflecting surface). If each surface accuracy satisfies each condition, the optical element manufactured on trial is acceptable. In this case, the forming dies themselves are also deemed to be acceptable. That is, the above-mentioned conditions are applicable also as conditions for determining acceptability of forming dies.

When a surface accuracy does not satisfy the aforementioned conditions, on the contrary, the optical element is rejectable, and the forming die used for forming the surface is judged to have an insufficient surface accuracy. In such a case, the forming face of the die can be made more appropriate by correcting the forming face of the die. When the lens surface has a surface accuracy as represented by the curve 63 in FIG. 6, the forming face can be made more appropriate by reprocessing the spatial frequency near the portion 63 not satisfying formulae (1) and (2) through smoothing.

As described above, while a low-frequency swell affects the uniform-speed characteristic or a change in the spot diameter, density unevenness caused by a low-frequency swell is almost indiscernible by human eyes because of a long spatial period of the change.

Ideally, therefore, the aforementioned conditions (1) and (2) or (1A) and (2A) should preferably be satisfied for each optical surface contained in the scanning image forming optical system. From a more practical point of view, i.e., from the point of view that it suffices to prevent appearance of density unevenness within a range of spatial frequency of from 0.1 to 5 lines/mm easily recognizable by human eyes, however, these conditions can be alleviated.

The optical scanner according to aspects 39 to 41 of the present invention were developed from such a point of view. More specifically, in the optical scanner of aspect 39 of the present invention, as described above, when the aimed spot diameter in the main scanning direction of an optical spot to be formed on the surface to be scanned at an image height of 0 of the optical spot is represented by ω, and a change Δ in the beam waist position in the main scanning direction in the deflected luminous flux relative to the surface to be scanned is exploded into spatial frequency components, the above-mentioned change Δ satisfies the following condition:

$$\{\Delta \cdot \lambda/\omega^2\}<0.4 \quad (20)$$

within a range of spatial frequency (1/L: line/mm):

$$0.1<(1/L)<5.$$

As described above, the depth margin 2d, dependent upon the aimed spot diameter ω and the luminous flux wavelength λ, is expressed at a satisfactory accuracy by:

$$2d \approx 1.49 \, \omega^2/\lambda \quad (7)$$

Therefore, if about a fourth of the depth margin is assumed to be allowable as being caused by a shape error of the optical surface of the scanning image forming optical system, this leads to: $(1.49 \, \omega^2/\lambda)/4=0.37 \, \omega^2/\lambda \approx 0.4 \, \omega^2/\lambda$. Thus, the above-mentioned condition (20) would be obtained as a condition to be satisfied by the change Δ.

In the optical scanner of aspect 40 of the present invention, on the basis of the findings that the range of spatial frequency from 0.1 to 5 lines/mm where density unevenness in a recorded image is conspicuous to human eyes is applicable also when considering the surface accuracy on the lens surface, when the surface accuracy σ on each lens surface of the scanning image forming optical system is exploded into spatial frequency components, within a range of spatial frequency (1/L: line/mm) of: 0.1<(1/L)<5, the lens surface accuracy σ, on each lens surface, the focal length fσ in the main scanning direction based on the lens surface accuracy σ, and the refractive index n of the lens having such a lens surface satisfy the condition:

$$0<\log \sigma<-2 \log (1/L)+\log [1/\{32 f\sigma(n-1)\}] \quad (21)$$

at a luminous flux width equal to or greater than W in the main scanning direction on each lens surface, and satisfy the condition:

$$0 \log \sigma<-2 \log (1/W)+\log [1/\{32 f\sigma(n-1)\}] \quad (22)$$

at a luminous flux width smaller than W in the main scanning direction on each lens surface. This inhibits occurrence of density unevenness within a range of spatial frequency (1/L: line/mm) of 0.1<(1/L)<5 within which the density unevenness is conspicuous to human eyes.

In the optical scanner of aspect 41 of the present invention, when the surface accuracy σ on each mirror surface of the scanning image forming optical system is exploded into spatial frequency components, within a range of spatial frequency (1/L: line/mm) of 0.1<(1/L)<5, the mirror surface accuracy σ of each mirror, and the focal length fσ in the main scanning direction based on σ satisfy the condition:

$$0 \log \sigma<-2 \log (1/L)+\log [1/\{64 f\sigma\}] \quad (23)$$

at a luminous flux width equal to or greater than W in the main scanning direction on each mirror surface, and at a luminous flux width of up to W, satisfy the condition:

$$0<\log \sigma i<-2 \log (1/W)+\log [1/\{64 f\sigma\}] \quad (24)$$

This inhibits occurrence of density unevenness within a range of spatial frequency (1/L: line/mm) of 0.1<(1/L)<5 within which the density unevenness is conspicuous to human eyes.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein:

FIG. 11 is a diagram illustrating the upper limit of the surface accuracy of face 1 of the lens L1 in the numerical example 1 actually manufactured;

FIG. 12A and FIG. 12B are diagrams illustrating image surface curvature and uniform speed characteristic of a concrete numerical example 2 of the optical scanner of FIG. 8;

FIG. 14 is a diagram illustrating the mirror surface accuracy of the image forming mirror M1 of the numerical example 2 actually manufactured;

DESCRIPTION OF THE PREFERRED EMBODIMENTS

Figure 1:
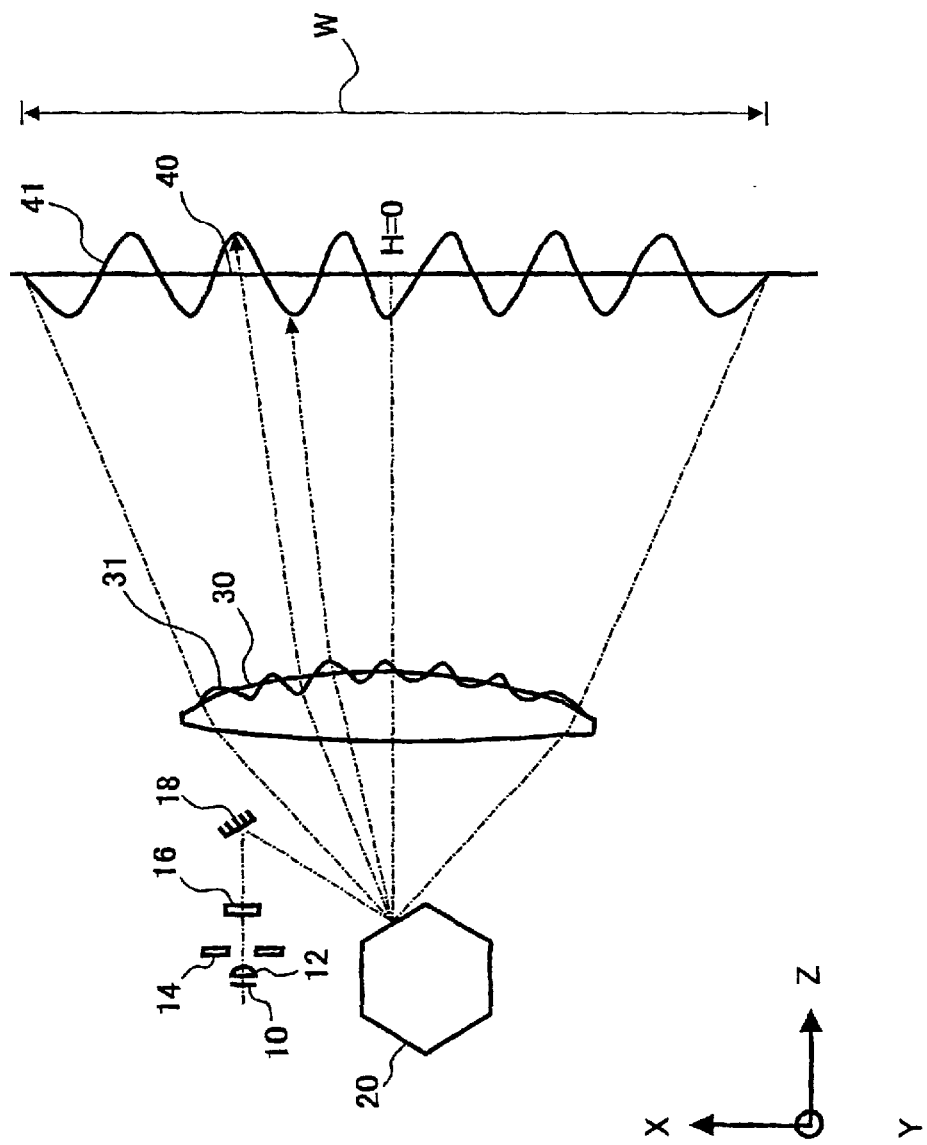
FIG. 1 is a plan view illustrating a typical background optical scanner, a swell of an optical scanning lens used in the optical scanner, and the concept of displacement of the beam waist position on the surface to be scanned.
Figure 2:
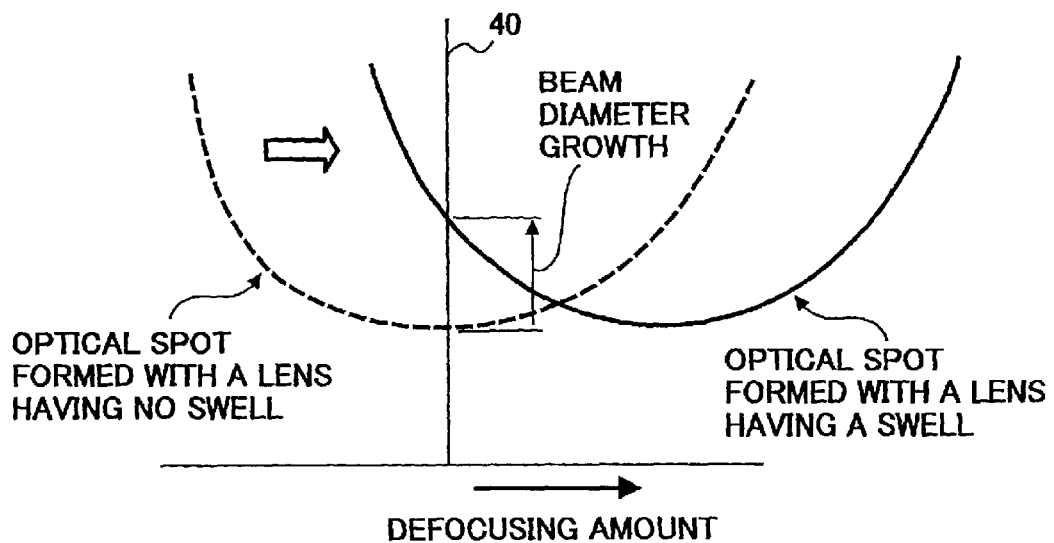
FIG. 2 is a graph illustrating growth of the beam diameter in the background optical scanner.
Figure 3:
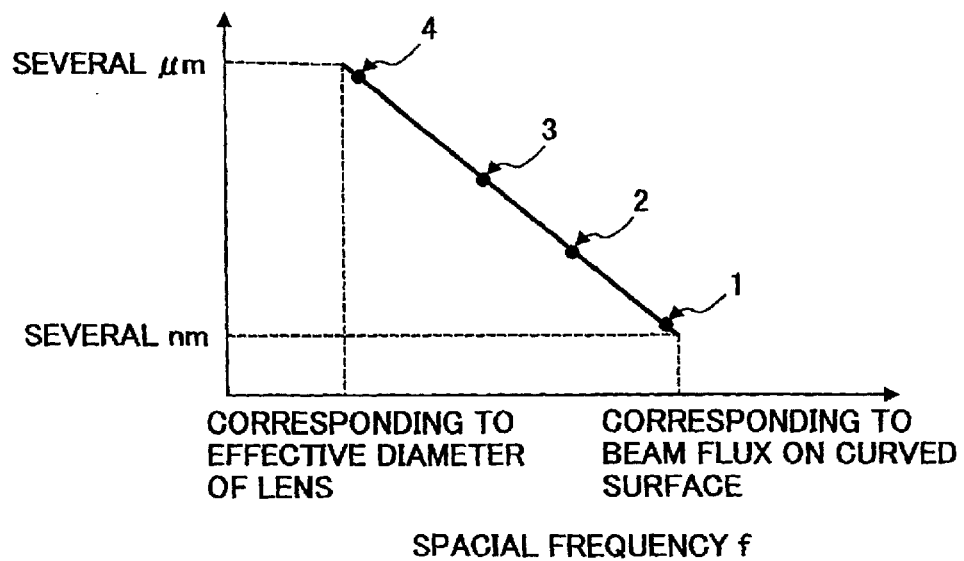
FIG. 3 is a graph illustrating a relationship between the spatial frequency of a swell on a curved surface of an optical scanning lens and an allowable amount of amplitude.
Figure 4A:
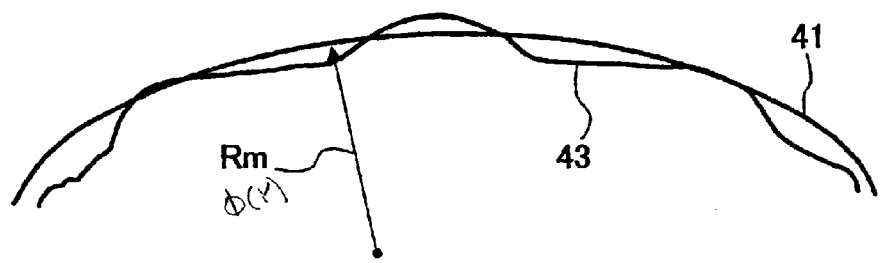
FIGS. 4A and 4B are diagrams for explaining surface accuracy.
Figure 4B:
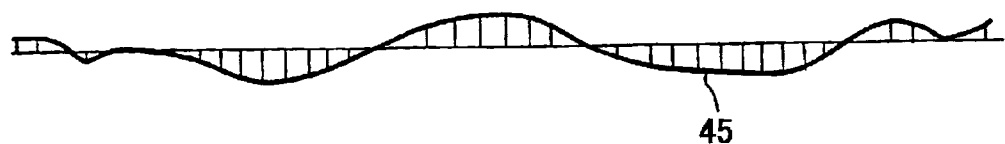

Referring now to the drawings, wherein like reference numerals designate identical or corresponding parts throughout the several views, preferred embodiments of the present invention are described.

Figure 7:
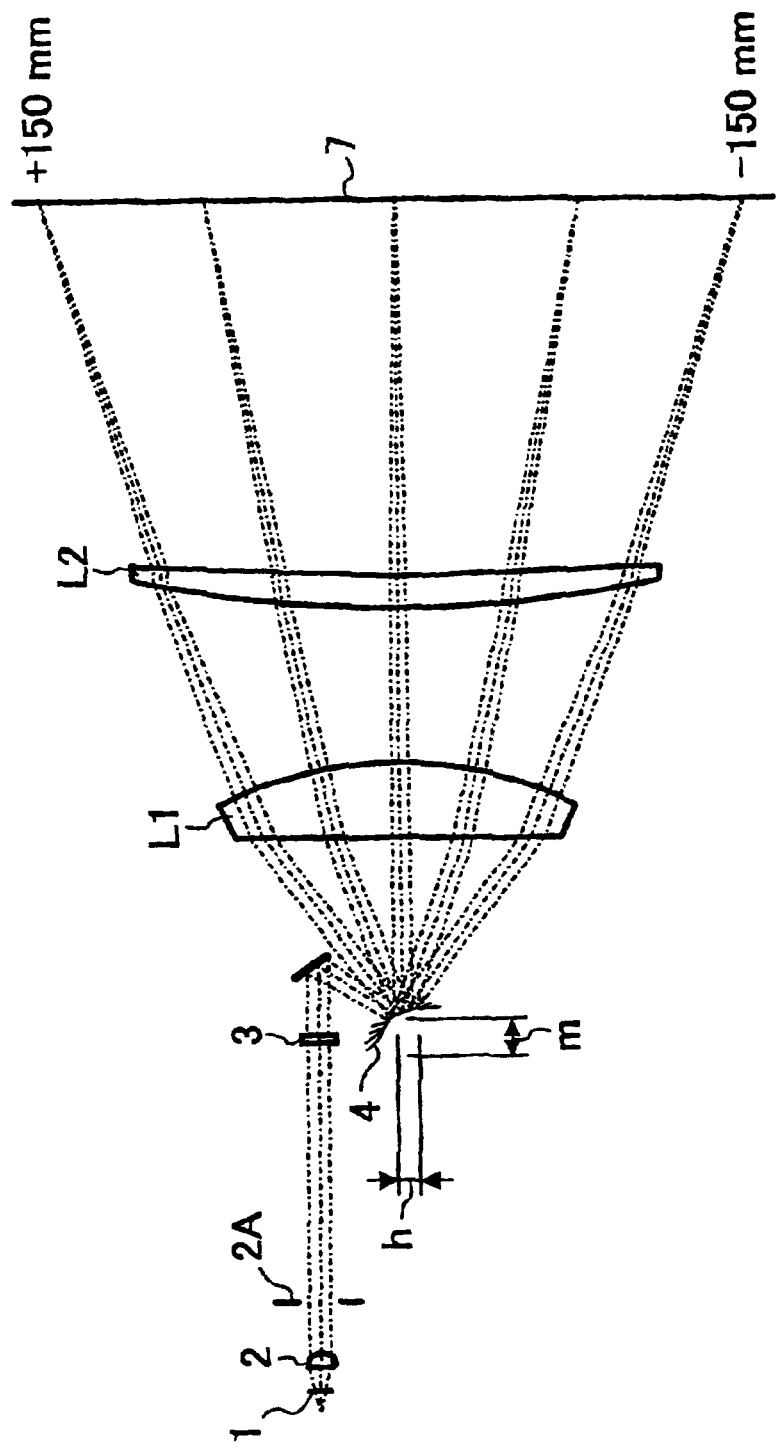
FIG. 7 is a diagram illustrating an optical scanner according to a preferred embodiment of the present invention.

FIG. 7 illustrates an optical arrangement of an optical scanner according to preferred embodiment of the present invention.

A luminous flux emitted from a light source 1 which is a semiconductor laser is connected by a coupling lens 2 into a form of luminous flux suitable for subsequent optical systems (a parallel flux, a converging flux, a diverging flux and the like), and is beam-rectified through an aperture 2A. It is converged by a cylindrical lens 3 serving as a line image forming optical system in a sub-scanning direction (a direction perpendicular to the drawing) and forms a line image long in the main scanning direction near a deflecting reflective surface of a rotary polygon mirror 4 serving as an optical deflector.

The reflected luminous flux from the deflecting reflective surface is deflected at a uniform angular speed along with uniform-speed rotation of the rotary polygon mirror 4 (FIG. 7 illustrates rotation of the deflecting reflective surface resulting from rotation of the rotary polygon mirror 4 and the deflected luminous flux at the position of each deflecting reflective surface), and passes through two lenses L1 and L2 composing a scanning image forming optical system. Under the effect of these lenses L1 and L2, the flux is condensed as an optical spot on a surface to be scanned 7 (practically, a photosensitive surface of a photoconductive member), and scans the surface to be scanned 7.

An optical path running from the light source 1 to the surface to be scanned 7 is bent by an appropriate flat mirror in accordance with an actual layout of the optical scanner.

Figure 8:
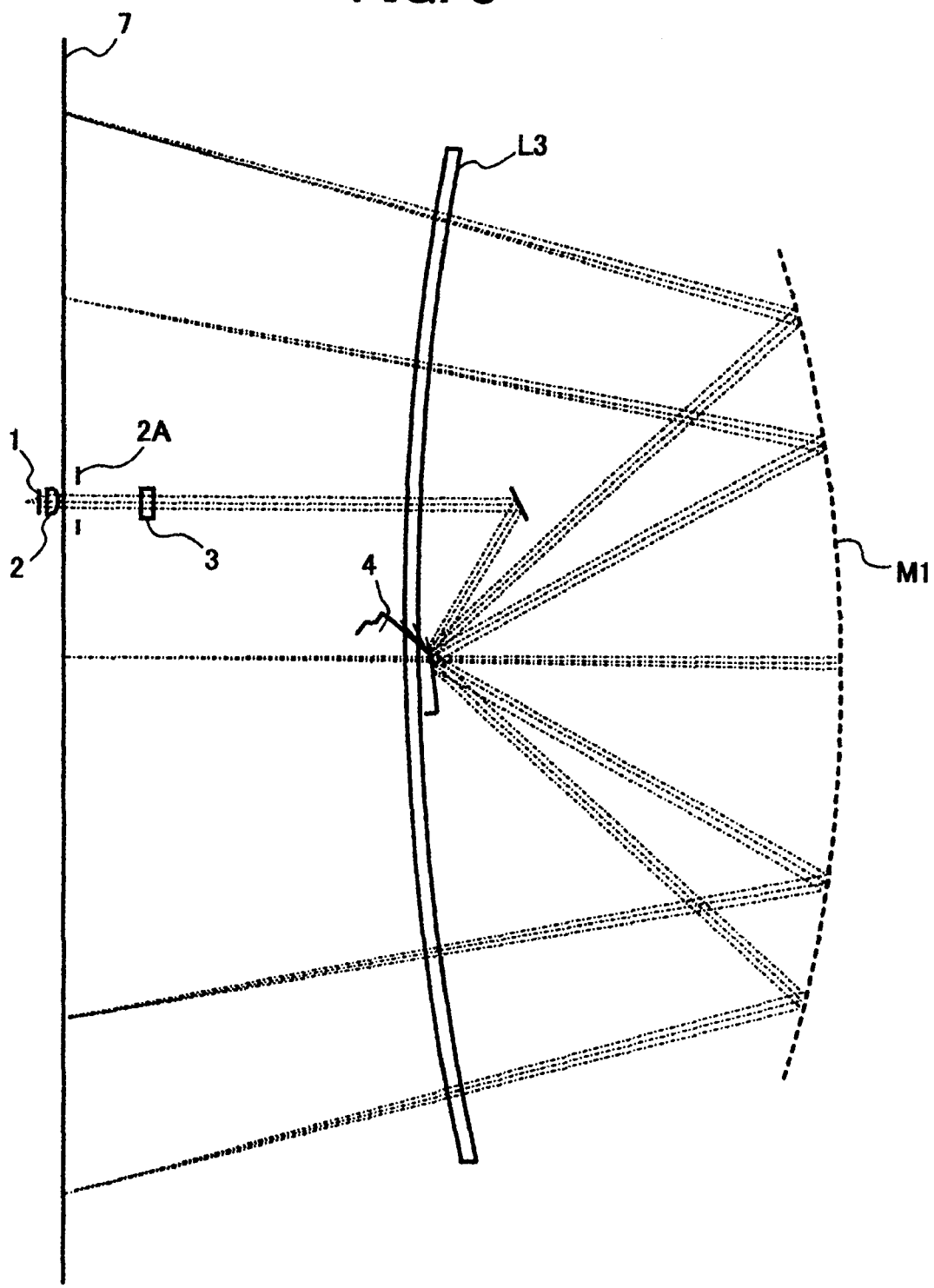
FIG. 8 is a diagram illustrating an optical scanner according to another preferred embodiment of the present invention.

FIG. 8 illustrates the optical arrangement of an optical scanner according to another preferred embodiment of the present invention in the same manner as in FIG. 7. The same reference numerals as in FIG. 7 are used for components considered free from confusion.

In FIG. 8, a luminous flux emitted from a light source 1 which is a semiconductor laser is converted by a coupling lens 2 into a form of luminous flux suitable for subsequent optical systems, and beam-rectified through an aperture 2A. It is converged by a cylindrical lens 3 serving as a line image forming optical system in a sub-scanning direction, and forms a line image long in the main scanning direction near a deflecting reflective surface of a rotary polygon mirror 4 serving as an optical deflector.

The reflected luminous flux from the deflecting reflective surface is deflected at a uniform angular speed along with uniform-speed rotation of the rotary polygon mirror 4, and is introduced into a surface to be scanned 7 through an image forming mirror M1 and a long lens L3 composing a scanning image forming optical system. Under the effect of reflecting image forming action of the image forming mirror M1 and refractive image forming action of the long mirror L3, the flux is condensed as an optical spot on the surface to be scanned 7, and scans the surface to be scanned 7. In this embodiment as well, the optical path running from the light source 1 to the surface to be scanned 7 is bent by an appropriate flat mirror in accordance with an actual layout of the optical scanner.

Concrete examples of numerical values regarding the optical arrangement illustrated in FIG. 7 will now be presented.

Representation formula for specifying a lens surface shape in the following examples of numerical values will be described. The contents of this embodiment of the present invention are not limited to the following representation formulae.

When expressing the lens surface, the coordinate in the main scanning direction near the lens surface is represented by Y, the coordinate in the sub-scanning direction is represented by Z, and the X-direction passing through these origins is assumed to be the optical axis.

The lens surface is expressed by the following general formula:

$$f(Y,Z) = fm(Y) + fs(Y,Z) \quad (14)$$

where, the first term of the right side fm(Y) represents the shape within the main scanning cross-section (an imaginary flat cross-section, passing through a reference axis corresponding to the optical axis, in parallel with the main scanning direction); the second term fs(Y,Z) represents the shape within the sub-scanning cross-section (an imaginary flat cross-section perpendicular to the main scanning direction) at coordinate Y position in the main scanning direction.

The depth X in the optical axis direction is expressed by the following polynomial formula by means of the known non-arc shape formula by expressing the shape within the above-mentioned main scanning cross-section by fm(Y), i.e., with a paraxial curvature radius Rm within the main scanning cross-section around the optical axis, the distance Y from the optical axis in the main scanning direction, the conical constant Km, and high-order coefficients Am1, Am2, Am3, Am4, Am5, Am6, . . . :

$$fm(Y) = (Y^2/Rm)/[1+\sqrt{1-(1+K)(Y/Rm)^2}] + Am1 \cdot Y + Am2 \cdot Y^2 + Am3 \cdot Y^3 + Am4 \cdot Y^4 + Am5 \cdot Y^5 + Am6 \cdot Y^6 + \quad (15)$$

When any of the odd ordinal coefficients Am1, Am3, Am5 . . . is not 0 in formula (15), the non-arc shape becomes a shape asymmetrical in the main scanning direction. In the embodiments, only the even ordinal coefficients are used, meaning that the non-arc shape has symmetricity in the main scanning direction.

The aforementioned term fs(Y,Z) is expressed as follows:

$$fs(Y,Z) = (Y^2 \cdot Cs)/[1+\sqrt{1-(1+Ks)(Y \cdot Cs)^2}] + (F0+F1 \cdot Y+F2 \cdot Y^2+F3 \cdot Y^3+F4 \cdot Y^4+\ldots) \cdot Z$$

$$+ (G0+G1 \cdot Y+G2 \cdot Y^2+G3 \cdot Y^3+G4 \cdot Y^4+\ldots) \cdot Z^2$$

$$+ (H0+H1 \cdot Y+H2 \cdot Y^2+H3 \cdot Y^3+H4 \cdot Y^4+\ldots) \cdot Z^3$$

$$+ (I0+I1 \cdot Y+I2 \cdot Y^2+I3 \cdot Y^3+I4 \cdot Y^4+\ldots) \cdot Z^4 + (J0+J1 \cdot Y+J2 \cdot Y^2+J3 \cdot Y^3+J4 \cdot Y^4+\ldots) \cdot Z^5 + \ldots \quad (16)$$

where, $$Cs = (1/Rs0) + B1 \cdot Y + B2 \cdot Y^2 + B3 \cdot Y^3 + B4 \cdot Y^4 + B5 \cdot Y^5 + \ldots \quad (17)$$

$$Ks = Ks0 + C1 \cdot Y + C2 \cdot Y^2 + C3 \cdot Y^3 + C4 \cdot Y^4 + C5 \cdot Y^5 + \ldots \quad (18)$$

"Rs0" represents the paraxial curvature radius within the sub-scanning cross-section including the optical axis.

When any of the odd multiplier coefficients B1, B3, B5 . . . of Y is other than 0, the curvature within the sub-scanning cross-section becomes asymmetrical in the main scanning direction.

When any of the odd multiplier coefficients of Y representing a non-arc amount such as coefficients C1, C3, C5, . . . , F1, F3, F5, . . . , and G1, G3, G5 . . . is other than 0, the non-arc amount in the sub-scanning direction becomes asymmetrical in the main scanning direction.

In the numerical examples, the curvature within the sub-scanning cross-section is asymmetrical on the incident face (face 1) of the lens L1 and on the emitting face (face 4) of the lens L2. The emitting face (face 4) of the lens L2 forms a non-arc shape within the sub-scanning cross-section. Both the lenses L1 and L2 are plastic lenses.

NUMERICAL EXAMPLE 1

The light source 1 is a semiconductor laser having a light emitting wavelength of 780 nm. The coupling lens 2 has a collimating function and the luminous flux is emitted from the coupling lens in the form of a parallel luminous flux.

The aperture 2A has an opening width of 9.0 mm in the main scanning direction and 1.6 mm in the sub-scanning direction.

The cylindrical lens 3 has a focal length of 58.7 mm.

The rotary polygon mirror 4 has five deflecting reflective faces and an inscribed circle radius of 20 mm. The rotational center and the deflecting starting point (the position of the point of intersection between the principal beam and the deflecting reflective surface when the principal beam of the deflected luminous flux is in parallel with the optical axes of the lenses L1 and L2) are spaced apart from each other in the optical axis direction by a distance of m=18.475 mm, and in the main scanning direction by a distance of h=8.0 mm.

In a state in which the principal beam of the deflected luminous flux becomes in parallel with the optical axes of the lenses L1 and L2, the angle between the principal beam and the principal beam of a luminous flux entering from the light source side into the deflecting reflective face (this angle is hereafter called the incident angle into the rotary polygon mirror) is 60°. The angle of view is within a range of from −38° to +38°.

Data for the paraxial curvature radius (mm) Rm, Rs0, the face interval (mm) on the optical axis x, and the refractive index n of the lens material are as follows:

| | Face No. | Rm | Rs0 | x | n |
|---|---|---|---|---|---|
| Defl.refl. face | 0 | ∞ | ∞ | 72.560 | 1 |
| Lens L1 | 1 | 1616.426 | −50.145 | 35.0 | 1.52398 |
| | 2 | −146.513 | −199.813 | 61.933 | 1 |
| Lens L2 | 3 | 400.875 | −72.026 | 14.0 | 1.52398 |
| | 4 | 824.882 | −27.588 | 160.556 | 1 |

Face 1 is a special troidal face in which a curvature radius within the sub-scanning cross-section is asymmetrical in the main scanning direction; faces 2 and 3 are special troidal faces, and face 4 is a special troidal face having a non-arc shape within the sub-scanning cross-section, in which the non-arc shape varies asymmetrically in the main scanning direction. In the special troidal face, the curvature within the sub-scanning cross-section (an imaginary cross-section perpendicular to the main scanning direction) varies in the main scanning direction.

Values of the aforementioned coefficients for specifying the lens surface shapes of the faces 1 to 4 are as follows. In the following lists, for example, "E+2" means "the square of 10", and "E−13" means "−13 power of 10".

Face 1 (incident face of the lens on the deflector side)
Rm=1616.426, K=1.9758E+2, Am4=1.280E−8, Am6=−6.3739E−13, Am8=−9.4279E−17, Am10=5.9653E−21
Rs0=−50.145, B1=−1.1619E−5, B2=2.2760E−6, B3=2.7143E−9, B4=−1.5441E−10, B5=−4.2654E−13, B6=6.4174E−15, B7=9.1795E−19, B8=−1.2300E−19, B9=1.4532E−20, B10=−1.8814e−22, B11=−1.4681E−24, B12=−2.6702E−26

Face 2 (emitting face of the lens on the deflector side)
Rm=−146.513, K=−1.8570E−1, Am4=1.7743E−8, Am6=1.3838E−13, Am8=−4.3545E−17, Am10=7.1684E−21

Rs0=−199.813, B2=−2.1247E−6, B4=1.8045E−11, B6=2.7156E−14, B8=6.9237E−19, B10=−2.6853E−22, B12=−5.7783E−26

Face 3 (incident face of lens on the surface to be scanned)

Rm=400.875, K=−1.2603E+1, Am4=−7.3492E−9, Am6=−2.1056E−13, Am8=8.1727E−18, Am10=5.4093E−22, Am12=−1.0819E−26, Am14=−2.0391E−32,

Rs0=−72.026, B2=−1.9618E−7, B4=2.2296E−11, B6=−1.0216E−15, B8=1.0811E−20, B10=6.3632E−25, B12=−3.6449E−29

Face 4 (emitting face of the lens on the surface to be scanned side)

Rm=824.882, K=−7.1067E+1, Am4=−1.3238E−8, Am6=9.6624E−14, Am8=1.8875E−17, Am10=−3.1016E−22, Am12=7.2979E−27, Am14=2.3052E−32

Rso=−27.588, B1=−8.5460E−7, B2=4.1615E−7, B3=−2.5226E−11, B4=−2.9599E−11, B5=2.1135E−16, B6=1.1604E−15, B7=4.3715E−22, B8=−1.0981E−21, B9=5.597E−24, B10=−7.7846E−25, B11=−1.6169E−29, B12=3.2622E−30,

Ks0=−3.9399E−1, C1=1.7960E−4, C2=2.4246E−6, C3=4.4377E−8, C4=4.5838E−10, C5=−2.4380E−12, C6=−3.3957E−14, C7=4.1317E−17, C8=6.8052E−19

I0=2.8688E−6, I1=4.0115E−11, I2=1.6903E−11, I3=3.5723E−14, I4=−8.7422E−15, I5=1.9643E−18, I6=8.6034E−19, I7=6.1604E−23, I8=−3.3469E−23, I9=−3.6931E−28, I10=4.5355E−28

K0=−1.5263E−9, K1=−3.1009E−11, K2=−8.9028E−12, K3=5.0172E−14, K4=3.2408E−15, K5=−7.7026E−18, K6=−4.1043E−19, K7=5.1175E−22, K8=2.3678E−23, K9=−1.5500E−26, K10=−6.3709E−28, K11=1.7480E−31, K12=6.5028E−33

Figures 9A, 9B:
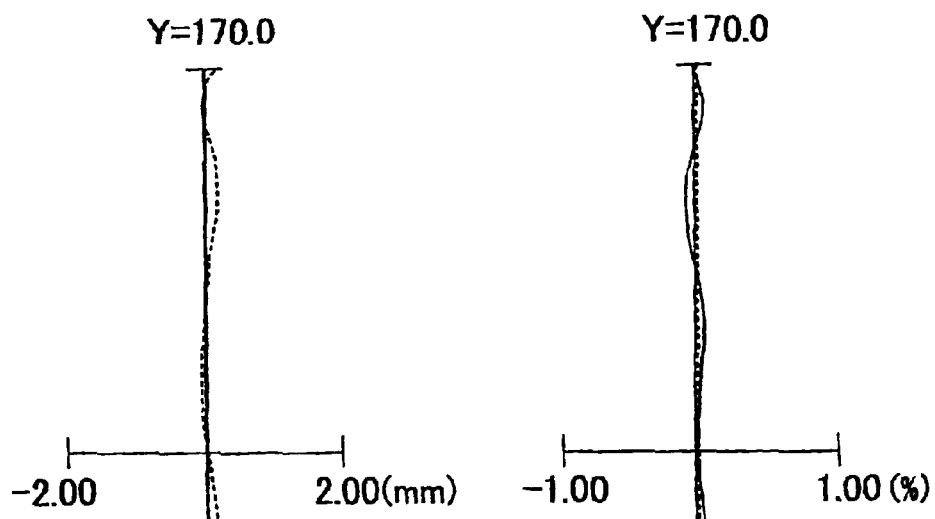
FIG. 9A and FIG. 9B are diagram illustrating image surface curvature and uniform speed characteristic of a concrete numerical example 1 of the optical scanner of FIG. 7.

FIG. 9A and FIG. 9B illustrate image surface curvature (the solid line represents the sub-scanning direction, and the broken line represents the main scanning direction) and uniform speed characteristic (the solid line represents linearity, and the broken line represents fθ characteristic) of numerical example 1. As is clear from FIG. 9A and FIG. 9B, numerical example 1 is excellent in image surface curvature as well as in uniform speed characteristic.

That is, the scanning image forming optical system of numerical example 1, if implemented as designed, permits achievement of satisfactory optical performance as described above.

Figure 5A:
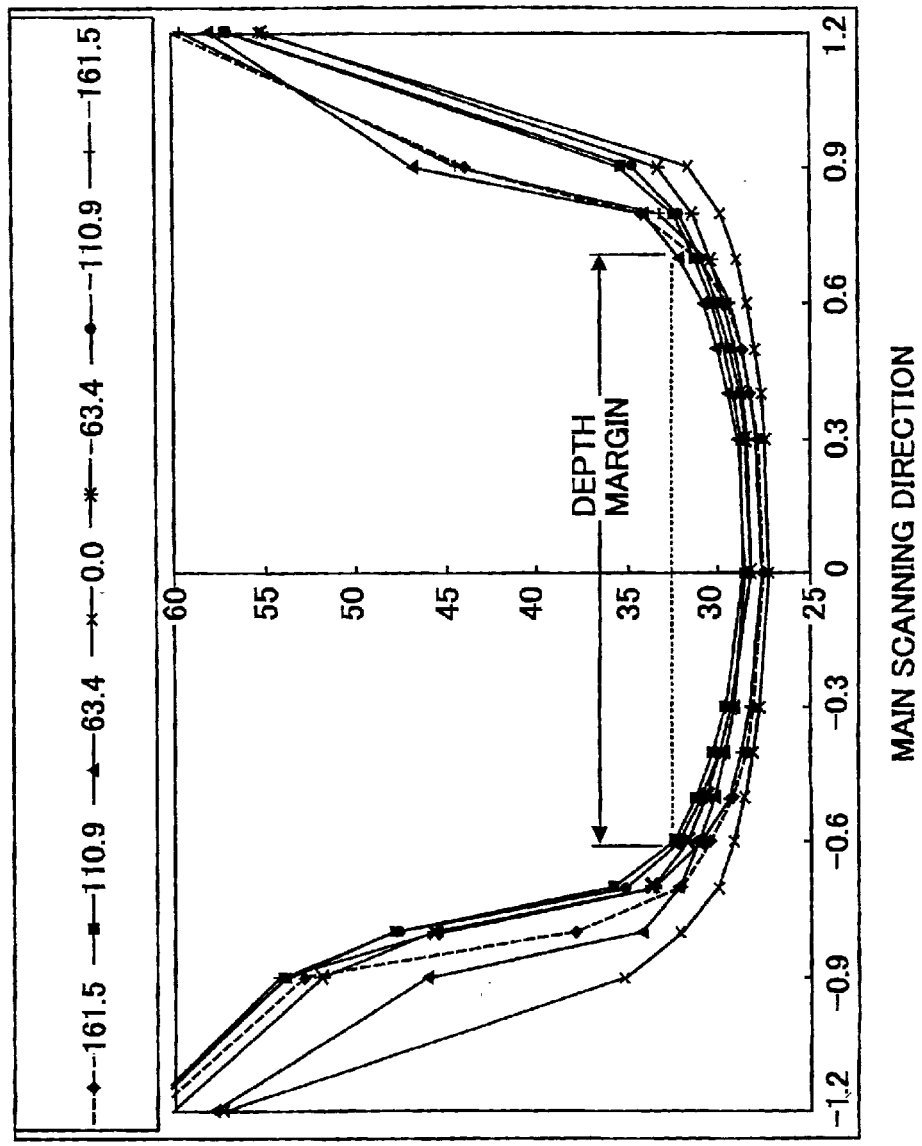
FIG. 5A and FIG. 5B are diagrams illustrating depth margin.
Figure 5B:
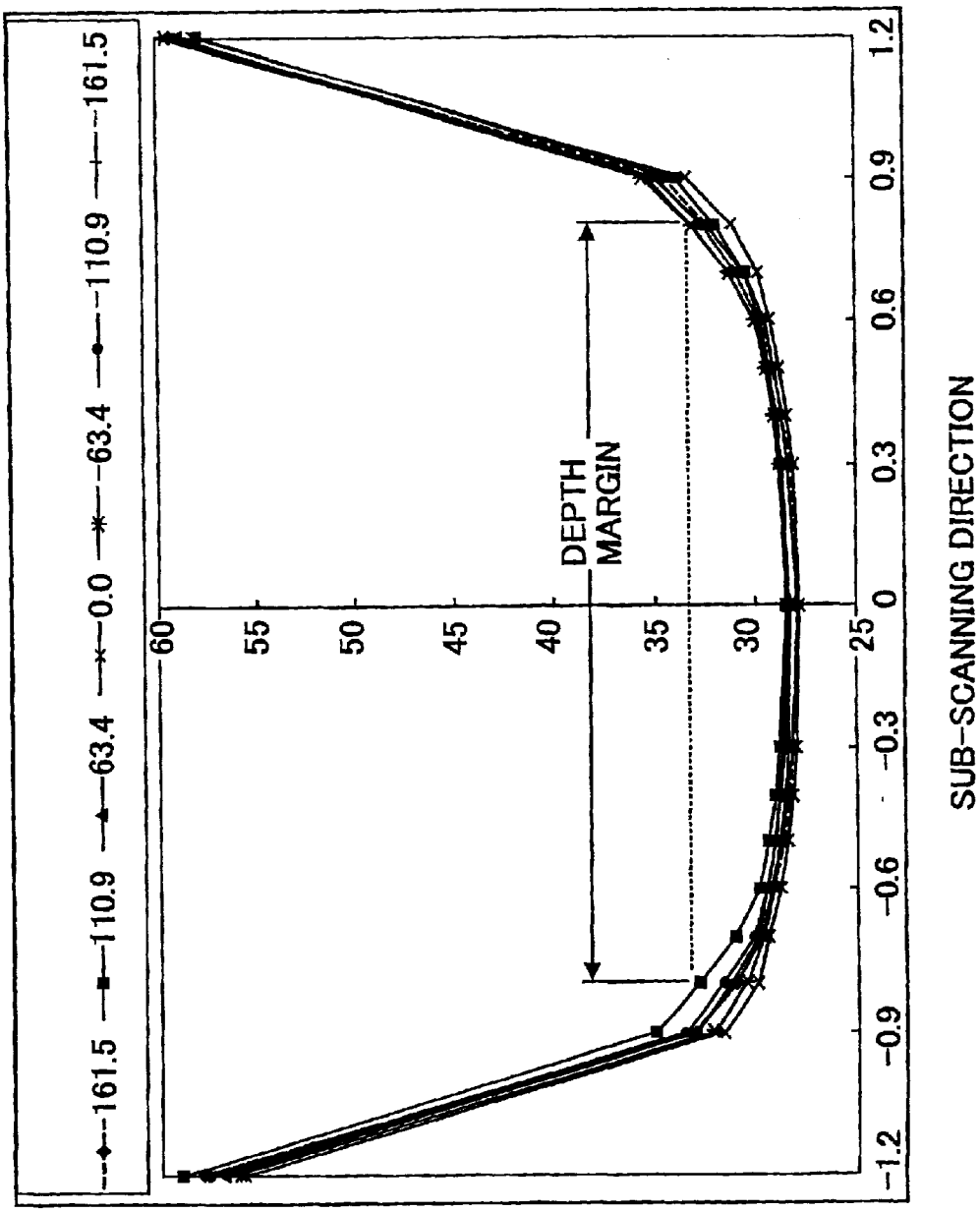
Figure 6:
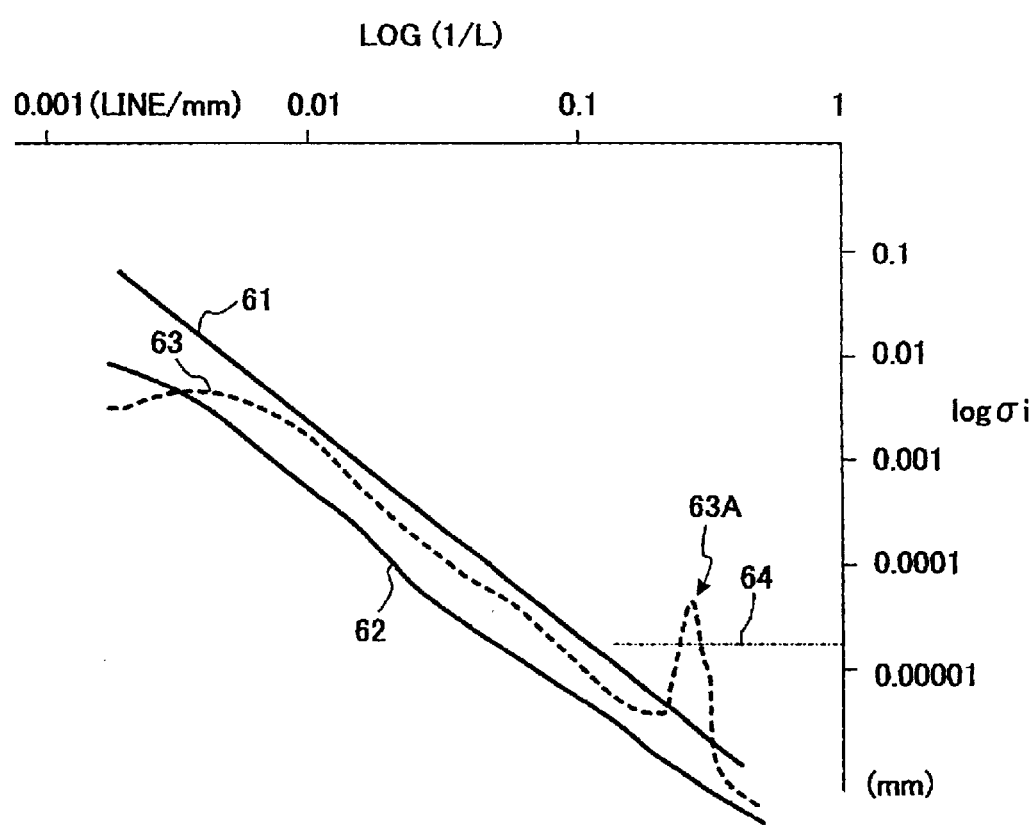
FIG. 6 is a diagram for explaining a relationship between surface accuracy and a condition formula.

In the example, the aimed spot diameter of the optical spot is 27 μm in the main and sub-scanning directions, and the depth margin in the main and sub-scanning directions is as illustrated in FIGS. 5A and 5B. The scanning image forming optical system has a focal length of fm=225.3 mm in the main scanning direction.

Calculation in accordance with the aforementioned formula (7) with ω=27 μm and λ=780 nm gives a depth margin of about 1.4 mm.

Since the number of optical surfaces is k=4, the margin of change in the image surface position Δ caused by surface accuracy is determined as follows by use of formula (9):

$$\Delta = 0.3725 \times 27 \times 27/(0.78\sqrt{4}) = 174 \, \mu m = 0.174 \, mm$$

The focal length fσ of swell itself is determined through calculation of formula (3) with fm=225.3 mm, ω=27 μm, λ=780 nm and k=4:

$$f\sigma = 291092 \, mm$$

The value of "log [1/{32 fσ(n−1)}]" is determined to be −6.68150 through calculation with fσ=291092 mm and n=1.52398.

Therefore, the surfaces of the lenses L1 and L2 must satisfy formula (1) with the following value:

$$0 < \log \sigma i < -2 \log (1/L) - 6.668150$$

for each spatial frequency.

The luminous flux diameter W in the main scanning direction of the luminous flux entering the faces of the lenses L1 and L2 is W=9 mm for faces 1 and 2 (because the coupling lens has a collimating function and the aperture 2A has an opening width of 9.0 mm in the main scanning direction), and 7 mm for faces 3 and 4.

By use of these values of luminous flux diameter, it is known that, for faces 1 and 2, the surface accuracy should be σ1<17 nm and σ2<17 nm for a spatial frequency range higher than 1/L=1/9=0.11, and for faces 3 and 4, the surface accuracy should be σ3<10 nm and σ4<10 nm for a spatial frequency range higher than 1/L=1/7=0.14.

In the scanning image forming optical system of the example, therefore, a sufficient accuracy of the lens surface is ensured by preparing a forming die so as to satisfy the above-mentioned accuracy conditions.

Figure 10:
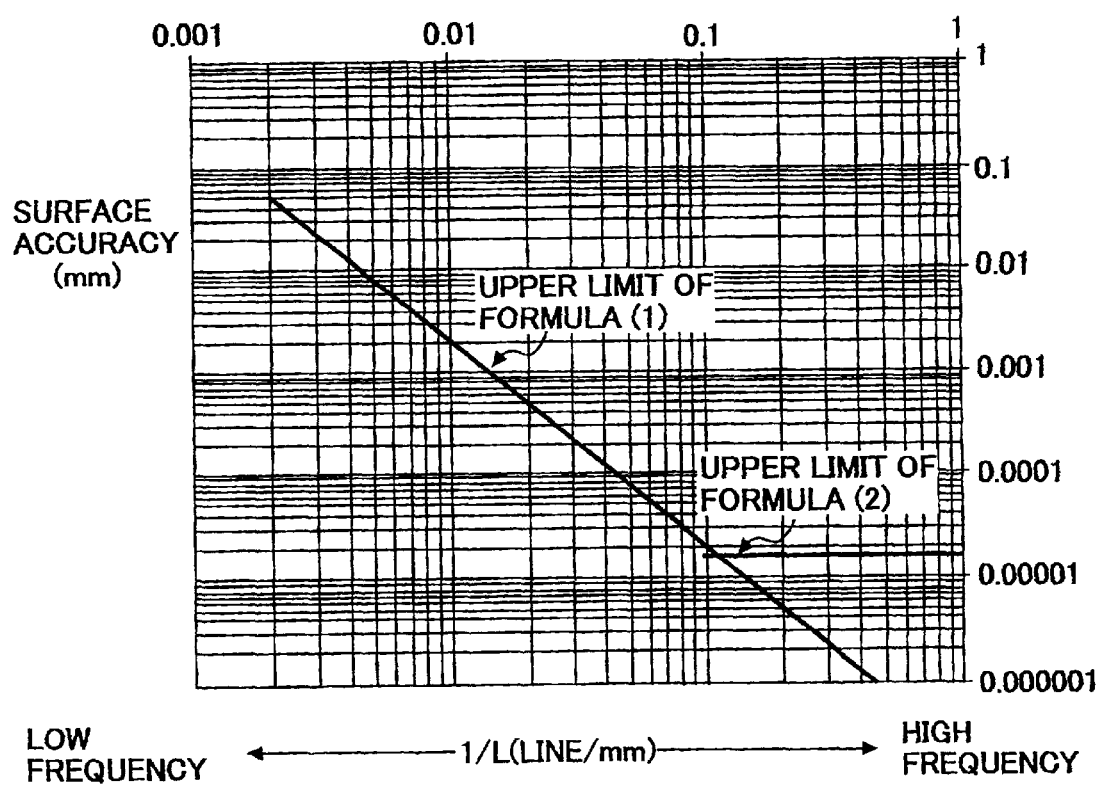
FIG. 10 is a diagram illustrating the upper limit of surface accuracy of the face 1 of the lens L1 in the numerical example 1.
Figure 13A:
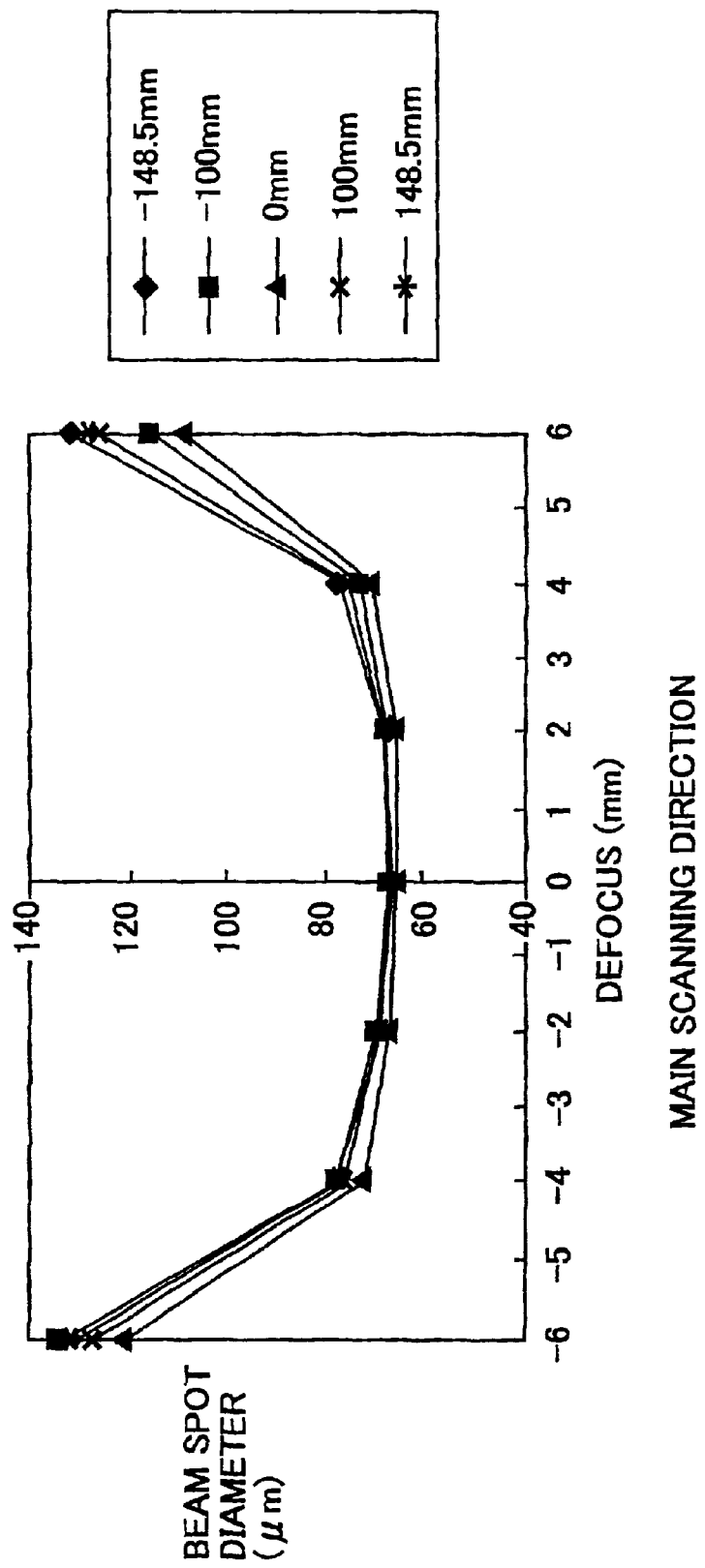
FIG. 13A and FIG. 13B are diagrams illustrating the depth margin of the above-mentioned numerical example 2.
Figure 13B:
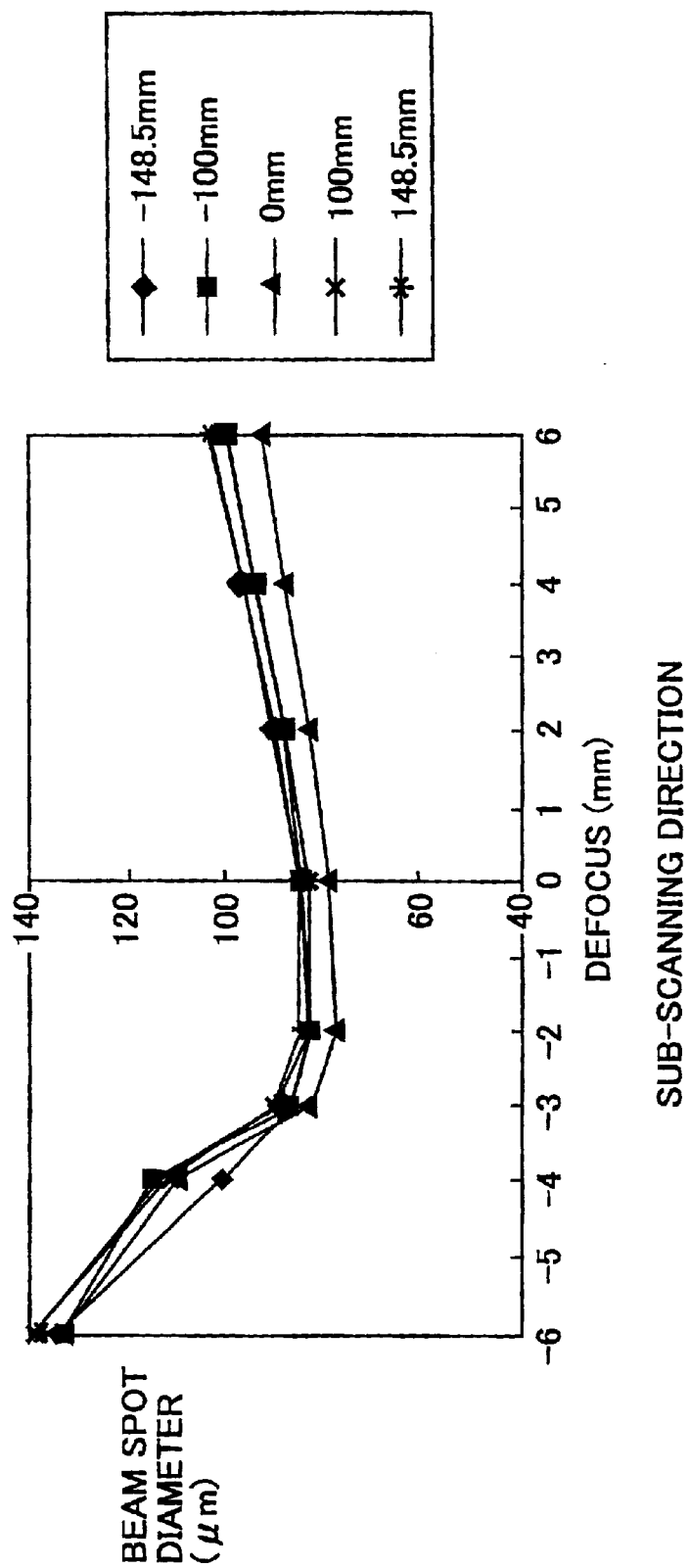

FIG. 10 illustrates straight lines representing upper limits of formulae (1) and (2) for a face (face 1) on the incident side of the lens L1 in the above-mentioned numerical example. A surface accuracy suffices to be within the region lower than these lines.

From the practical point of view such that the only requirement is that density unevenness does not appear in the spatial frequency region permitting easy recognition by human eyes, the accuracy of each lens surface suffices to satisfy the condition (21) in the frequency range lower than the spatial frequency of 1/W corresponding to the luminous flux diameter W, and the condition (22) in a frequency range higher than 1/W for the spatial frequency range of from 0.5 to 5 lines/mm on the lens surface.

A case of measuring the surface accuracy for face 1 of the lens L1 actually formed by forming is illustrated in FIG. 11. As is clear from FIG. 11, the actually formed face 1 does not satisfy the condition of formula (1) in the low spatial frequency region, but satisfies the conditions (21) and (22) in the range of a spatial frequency (1/L) of from 0.1 to 5 lines/mm. There is therefore no practical problem regarding the face 1.

NUMERICAL EXAMPLE 2

A concrete numerical example of the optical scanner illustrated in FIG. 8 will now be presented.

The light source 1 is a semiconductor laser and has an emitting wavelength of 780 nm. The luminous flux emitted from the coupling lens 2 is a weakly divergent flux.

The aperture 2A has an opening width of 9.0 mm in the main scanning direction, and 1.6 mm in the sub-scanning direction.

The cylindrical lens 3 has a focal length of 58.7 mm.

The rotary polygon mirror 4 has six deflecting reflective mirror surfaces and an inscribed circle radius of 18 mm. The rotation center and the starting point of deflection are spaced apart from each other by m=16.5 mm in the optical axis direction, and by h=7.4 mm in the main scanning direction. The incident angle into the rotary polygon mirror is 60°. The angle of view is within a range of from −43° to +43°. The luminous flux entering the deflecting reflective surface of the rotary polygon mirror 4 from the light source side is divergent, and the starting point of divergence (position where divergence is started when assuming that the incident luminous flux diverges spontaneously in the main scanning direction and enters the deflecting reflective surface) is at a position of 1328 mm from the deflecting reflective surface toward the light source side.

The distance from the deflecting reflective surface of the rotary polygon mirror 4 to the image forming mirror M1 is represented by D1; the distance from the image forming mirror M1 to the incident surface of the long lens L3 is represented by d2; and the thickness of the long lens L43 is represented by d3; and the distance from the emitting surface of the long lens L3 to the surface to be scanned is represented by d4.

The refractive index of the long lens L3 is represented by n. The image forming mirror M1 has a coaxial non-spherical surface, which is a curved surface obtained by turning a curve expressed by the following formula around the optical axis:

$$X=(1/R)Y^2/[1+\sqrt{\{1-(1+K)(Y/R)^2\}}]+A\cdot Y^4+B\cdot Y^6+C\cdot Y^8+D\cdot Y^{10}$$

where, when taking the X-coordinate in the optical axis direction, and the Y-coordinate in the direction perpendicular to the optical axis, R represents the curvature radius on the optical axis; K represents a cone constant; and A, B, C and D represent high-order non-spherical coefficients.

In the long lens L3, the emitting side has a normal troidal surface having a curvature radius $r_{2m}$ in the main scanning direction and a curvature radius $r_{2s}$ in the sub-scanning direction. The incident side surface is a face obtained by rotating a curve expressed by:

$$x=(1/r_{1m})h^2/[1+\sqrt{\{1-(1+k)(h/r_{1m})^2\}}]+a\cdot y^4+b\cdot y^6+c\cdot y^8+d\cdot y^{10}$$

where, x represents the coordinate in the optical axis direction; $r_{1m}$ represents the center curvature radius in a direction corresponding to the main scanning direction; k represents a conical constant; y represents the distance measured from the center in a direction corresponding to the main scanning direction; and a, b, c and d represent high-order non-spherical surface coefficients.

Mirror surface shape of the image forming mirror M1:
  R=−370.8, K=−1.5014
  A=5.4435E−10, B=−3.0659E−14,
  C=−4.2511E−18, D=1.5704E−22
Incident surface shape of the long mirror L3:
  $r_{1m}$=628, $r_{1s}$=60, k=1.4494,
  a=−4.2462E−9, b=−9.194E−15,
  c=9.6508E−18, d=−1.8908E−22
Emitting surface shape of the long lens L3:
  $r_{2m}$=700, $r_{2s}$=25.69
Surface interval:
  d1=114.5, d2=118.4, d3=:3, d4=93.7
Refractive index of material of the long lens L3:
  n=1.5721

FIG. 12A and FIG. 12B illustrate the image surface curvature and the uniform speed characteristic in the numerical example 2 in the same manner as in FIG. 9A and FIG. 9B, and FIG. 13A and FIG. 13B illustrate the depth margin in the numerical example 2 in the same manner as in FIG. 5A and FIG. 5B. As is clear from FIGS. 12A, 12B, 13A, and 13B, the numerical example 2 is excellent both in image surface curvature and in uniform speed characteristic as well as in depth margin. Therefore, the scanning image forming optical system of the numerical example 2 permits achievement of satisfactory optical performance as described above if it is implemented as designed.

By use of λ=780 nm, k=3, ω=65 μm, and fm=185.4 mm:

$$\Delta=(0.3725)\times(0.065)^2/((780\times10^{-6})\times\sqrt{3})=1.17$$

$$f\sigma=(2.6846)\times(780\times10^6)\times\sqrt{3}\times(185.4)^2/(0.065)-(185.4)=29321$$

Therefore, the condition to be satisfied by the mirror surface of the image forming mirror M1 from the practical point of view is a luminous flux width W=4 mm in the main scanning direction of the deflected luminous flux on the image forming mirror M1.

As a result, log σ at a spatial frequency 1/w would be:

$$\log \sigma = -2 \log (1/W)+\log \{1/\{64\times f\sigma\}\}$$

leading to a surface accuracy σ satisfying this formula of 8.5 nm. More specifically, at a low spatial frequency lower than 1/W, the surface accuracy σ should satisfy:

$$0<\log \sigma <-2 \log (1/L)+\log [1/(64\,f\sigma)] \qquad (1A)$$

and at a high spatial frequency higher than 1/W, it should satisfy:

$$0<\log \sigma <-2 \log (1/W)+\log [1/(64\,f\sigma)] \qquad (2A)$$

From the above-mentioned practical point of view, however, it would suffice for the surface accuracy to satisfy the condition:

$$0<\log \sigma <-2 \log (1/L)+\log [1/\{64\,f\sigma\}] \qquad (23)$$

within a spatial frequency range lower than 1/W, and to satisfy:

$$0<\log \sigma <-2 \log (1/W)+\log [1/\{64\,f\sigma\}] \qquad (24)$$

within a spatial frequency range higher than 1/W on the mirror surface, within the spatial frequency range of from 0.1 to 5 lines/mm.

FIG. 14 illustrates the surface accuracy of a concrete image forming mirror actually prepared.

For the mirror surface of this image forming mirror, the surface accuracy σ satisfies the condition (23) with a luminous flux width range equal to or greater than W in the main scanning direction on the mirror surface, and satisfies the condition (24) with a flux width within a range smaller than W, within a range of spatial frequency of 0.1<(1/L)<5. From the practical point of view, therefore, this image forming mirror is acceptable.

Finally, an image forming apparatus according to a preferred embodiment of the present invention will now be described with reference to FIG. 15.

This image forming apparatus is a laser printer.

The laser printer 100 has a photoconductive member formed into a cylindrical shape as a photosensitive medium 111. Around the photosensitive medium 111, there is arranged a charging device 112 (a contact type charging roller is illustrated, but a corona charger may of course be used), a developing unit 113, a transferring device 114 (a contact type transfer roller is illustrated, but a type using corona discharge may be used), and a cleaning unit 115.

An optical scanner 117 based on a laser beam flux LB is provided to conduct exposure through optical writing between the charging roller 112 and the developing unit 113.

Figure 15:
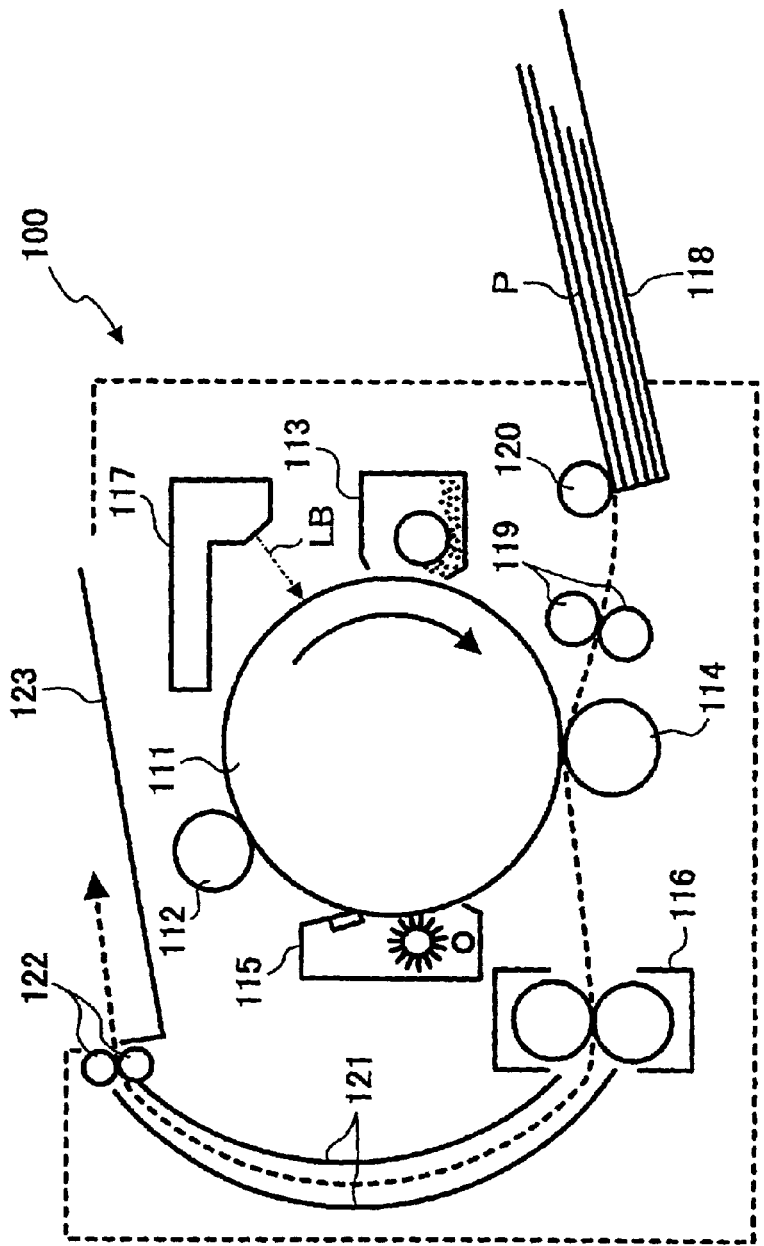
FIG. 15 illustrates an image forming apparatus according to a preferred embodiment of the present invention.

In FIG. 15, reference numeral 116 represents a fixing unit; reference numeral 118 represents a cassette; reference numeral 119 represents a resist roller pair; reference numeral 120 represents a paper feed roller; reference numeral 121 represents a conveying path; reference numeral 122 represent a paper discharge roller pair; reference numeral 123 represent a tray; and symbol P represents transfer paper serving as a recording medium.

When forming an image, the photosensitive medium 111 serving as a photoconductive member is rotated clockwise at a uniform speed. The surface thereof is uniformly charged by the charging device 112, and an electrostatic latent image is formed, while being exposed by optical writing of the laser beam flux LE of the optical scanner 117. The thus formed electrostatic latent image is a so-called negative latent image of which an image portion has been exposed.

This electrostatic latent image is reversely developed by the developing unit 113 and a toner image is formed on the photosensitive medium 111.

The cassette 118 housing the transfer paper P is detachably attached to the main body of the image forming apparatus 100, and in the attached state as illustrated in FIG. 15, the uppermost sheet of the housed transfer paper P is fed by the paper feed roller 120. The fed transfer paper P is bitten at the leading end thereof by the resist roller pair 119. The resist roller pair 119 sends the transfer paper P to the transfer section at a timing meeting movement of the toner image on the photosensitive medium 111 to the transfer position. The sent transfer paper P is laced on top of the toner image in the transfer section, and the toner image is electrostatically transferred by the action of the transfer device 114. The transfer paper P on which the toner image has been transferred is sent to the fixing unit 116 where the toner image is fixed onto the transfer paper P. The transfer paper P then passes through the conveying path 121, and is discharged by the paper discharge roller pair 122 onto the tray 123. The surface of the photosensitive medium 111 after transfer of the toner image is cleaned by the cleaning unit 115 to remove residual toner and paper dust. The aforementioned OHP sheet may be used in place of the transfer sheet. Further, transfer of the toner image can be accomplished via an intermediate transfer medium such as an intermediate transfer belt.

Satisfactory image forming can be carried out by using, as an optical scanner 117, an optical scanner using the scanning image forming optical system as illustrated in FIG. 7 or 8, of which the numerical examples have been described above.

The optical scanner, the embodiments and the numerical examples of which have been described above with reference to FIGS. 5A, 5B, 7, 9A, 9B and 10, is an optical scanner which performs optical scanning of a surface to be scanned by deflecting a luminous flux having a wavelength λ (780 nm) from the side of a light source 1 by an optical deflector 4, and condensing the deflected flux toward the surface to be scanned 7 through scanning image forming optical systems L1 and L2, thereby forming an optical spot on the surface to be scanned 7; wherein the scanning image forming optical system has at least one lens; and when the focal length fσ in the main scanning direction at a surface accuracy σi is defined as:

$$f\sigma = \{2.6846\ \lambda \times \sqrt{(k)} \times fm^2/\omega^2\} - fm$$

where, fm represents the focal length (=225.3 mm) in the main scanning direction of the scanning image forming optical system; k represents the number of lenses (=4); ω represents the spot diameter (27 μm) in the main scanning direction, which is aimed as the optical spot at an image height of 0; σI represents the surface accuracy of the i-th lens surface as counted from the optical deflector 4 side; n represents the refractive index (=1.52398) of the lens material having the i-th lens surface; and 1/L represents the spatial frequency in the main scanning direction on the lens surface; then, the surface accuracy σi, the focal length fσ, the refractive index n, and the spatial frequency 1/L satisfy, for each lens surface, the following condition:

$$0 < \log \sigma i < -2\ \log\ (1/L) + \log\ [1/\{32\ f\sigma(n-1)\}] \tag{1}$$

(aspect 1 of the present invention). It is thus possible to limit a change in the image surface position caused by the scanning image forming optical system within an allowable range. When W represents the optical flux diameter in the main scanning direction of the deflected luminous flux entering the i-th lens surface as counted from the optical deflector, the surface accuracy σi, the focal length fσ, and the refractive index n satisfy the following condition:

$$0 < \log \sigma i < -2\ \log\ (1/W) + \log\ [1/\{32\ f\sigma(n-1)\}] \tag{2}$$

for each lens surface without depending upon the spatial frequency for a spatial frequency of up to (1/W) (aspect 2 of the present invention). It is thus possible to limit a change in the image surface position at a high spatial frequency within an allowable range.

The light source 1 is a semiconductor laser, and the beam flux from the light source 1 is coupled by a coupling lens with the subsequent optical systems, deflected by the optical deflector 4, and enters the scanning image forming optical systems L1 and L2 (aspect 3), and the function of the coupling lens 2 is a collimating function (aspect 4). The scanning image forming optical system comprises only two lenses L1 and L2 (aspects 5 to 8).

The optical deflector 4 is a rotary mirror having a deflecting reflective surface; the coupled luminous flux is condensed by a line image forming optical system 3 in the sub-scanning direction and is formed into a line image long in the main scanning direction near the deflecting reflective surface; and the scanning image forming optical systems L1 and L2 are anamorphic optical systems associating the starting point of deflection by the optical deflector 4 and the surface to be scanned 7 into an opto-geometrical conjugate relationship with respect to the sub-scanning direction (aspect 9); the function of the coupling lens 2 is a collimating function (aspect 10); and the scanning image forming optical system comprises only two lenses L1 and L2 (aspects 11 to 14). The optical deflector 4 is a rotary polygon mirror (aspect 15).

According to any one of the aforementioned optical scanners, there is implemented an optical scanning method comprising the steps of causing an optical deflector 4 to deflect a luminous flux having a wavelength λ from the side of a light source 1, condensing the deflected luminous flux through scanning image forming optical systems L1 and L2 toward a surface to be scanned 7, thereby conducting optical scanning of the surface to be scanned 7 (aspect 16); and there is also implemented an optical scanning method comprising the steps of using a semiconductor laser as a light source 1, causing a luminous flux having a wavelength λ from the light source side to enter an optical deflector 4 via a coupling lens 2, deflecting the luminous flux through the optical deflector 4, condensing the deflected luminous flux toward a surface to be scanned 7 through scanning image forming optical systems L1 and L2, and forming an optical spot on the surface to be scanned 7, thereby conducting optical scanning of the surface to be scanned 7 (aspect 17).

Furthermore, there is implemented an optical scanning method comprising the steps of using a semiconductor laser as a light source 1, converting a luminous flux having a wavelength λ from the side of the light source 1 into a parallel luminous flux, then to enter an optical deflector 4 via a coupling lens 2, deflecting the luminous flux through the optical deflector 4, condensing the deflected luminous flux toward a surface to be scanned 7 through scanning image forming optical systems L1 and L2, and forming an optical spot on the surface to be scanned 7, thereby conducting optical scanning of the surface to be scanned 7 (aspect 18).

There is also implemented an optical scanning method comprising the steps of using a semiconductor laser as a light source 1, coupling a luminous flux having a wavelength λ from the side of the light source 1 with subsequent optical systems through a coupling lens 2, condensing the coupled luminous flux in the sub-scanning direction by a line image forming optical system 3, forming a line image long in the main scanning direction near the deflecting reflective surface position of a rotary mirror serving as an optical deflector 4, and condensing the deflected luminous flux by scanning image forming optical systems L1 and L2 toward a surface to be scanned 7 to form an optical spot on the surface to be scanned 7, thereby conducting optical scanning of the surface to be scanned 7 (aspect 19).

There is implemented an optical scanning method comprising the steps of using a semiconductor laser as a light source 1, converting a luminous flux having a wavelength λ from the side of the light source 1 into a parallel luminous flux, then condensing the parallel flux in a sub-scanning direction through a line image forming optical system 3 to form a line image long in the main scanning direction near a deflecting reflective surface position of a rotary mirror serving as an optical deflector 4, and condensing the deflected luminous flux by scanning image forming optical systems L1 and L2 toward a surface to be scanned 7 to form an optical spot on the surface to be scanned 7, (thereby conducting optical scanning of the surface to be scanned 7 (aspect 20). Deflection of the luminous flux is accomplished by using a rotary polygon mirror serving as an optical deflector 4 (aspect 21).

A scanning image forming optical system described in the numerical examples is used in an optical scanner in which optical scanning is performed by deflecting a luminous flux having a wavelength λ from the side of a light source 1, and condensing the deflected luminous flux by scanning image forming optical systems L1 and L2 toward the surface to be scanned 7 to form an optical spot on the surface to be scanned 7; wherein the optical scanner has a spot diameter ω (=27 μm) aimed to be formed by the scanning image forming optical system at an optical spot height of 0; the scanning image forming optical system has at least one lens; and when the focal length fσ in a main scanning direction at a surface accuracy σi is defined as:

$$f\sigma = \{2.6846\ \lambda \times \sqrt{(k)} \times fm^2/\omega^2\} \cdot fm$$

where, fm (=226.9 mm) represents the focal length in the main scanning direction; k represents the number of lenses; σi represents the surface accuracy of the i-th lens surface as counted from the optical deflector side; n (=1.52398) represents the refractive index of the lens material having the i-th lens surface; and 1/L represents the spatial frequency in the main scanning direction on the lens surface; λ represents the wavelength; k represents the number of faces; fm represents the focal length; ω represents the spot diameter; then, when the focal length is fσ (291092 mm) in the main scanning direction at a surface accuracy σi, the surface accuracy σi, the focal length fσ, the refractive index n, and the spatial frequency 1/L satisfy, for each lens surface, the following condition:

$$0 < \log \sigma i < -2 \log (1/L) + \log [1/\{32\ f\sigma(n-1)\}] \quad (1)$$

Each lens surface is formed to satisfy the above condition (aspect 22). When W represents the optical flux diameter in the main scanning direction of the deflected luminous flux entering the i-th lens surface as counted from the optical deflector (9 mm for i=1, 2, and 7 mm for i=3, 4), the surface accuracy σi, the focal length fσ, and the refractive index n satisfy the following condition:

$$0 < \log \sigma i < -2 \log (1/W) + \log [1/\{32\ f\sigma(n-1)\}] \quad (2)$$

for each lens surface, without depending upon the spatial frequency for a spatial frequency of up to (1/W) (aspect 23).

The luminous flux from the semiconductor laser enters the scanning image forming optical system via the coupling lens 2 and the optical deflector 4 (aspect 24); the function of the coupling lens 2 is a collimating function (aspect 25). The scanning image forming optical system comprises only two lenses L1 and L2 (aspects 26 to 29), and is an anamorphic optical system associating the starting point of deflection by the optical deflector 4 and the surface to be scanned 7 into an opto-geometrical conjugate relationship with respect to the sub-scanning direction (aspect 30). The deflected luminous flux which is a parallel luminous flux enters the scanning image forming optical system in the main scanning direction (aspect 31), and comprises only two lenses (aspects 32 to 34). The both lenses L1 and L2 are plastic lenses (aspect 36).

The image forming apparatus 100 according to an embodiment of the present invention as illustrated in FIG. 15 applies optical scanning by an optical scanner 117 to a photosensitive surface of a photosensitive medium 111 to form a latent image, and obtains an image by visualizing the latent image; wherein the optical scanner 117 of any one of aspects 1 to 15 performing optical scanning of the photosensitive surface of the photosensitive medium is used (aspect 37). The photosensitive medium 111 is a photoconductive member, and the electrostatic latent image formed through uniform charging of the photosensitive surface and optical scanning by the optical scanner is visualized into a toner image (aspect 38).

When using an optical deflector free from face tilting, it is possible to omit the line image forming optical system 3 and use the lenses L1 and L2 as coaxial lenses.

The optical scanner described above performs optical scanning of a surface to be scanned by deflecting a luminous flux having a wavelength λ from a light source side by means of an optical deflector, and condensing the deflected luminous flux through a scanning image forming optical system toward the surface to be scanned to form an optical spot on the surface to be scanned; wherein the scanning image forming optical system is configured such that when the optical spot to be formed on the surface to be scanned has an aimed spot diameter ω in a main scanning direction at an image height of 0, and a change Δ in the beam waist position in the main scanning direction of the deflected luminous flux relative to the surface to be scanned is exploded into components of the spatial frequency, within a range of the spatial frequency (1/L: line/mm) of: 0.1<(1/L)<5, the above-mentioned change Δ satisfies the condition:

$$(\Delta \cdot \lambda/\omega^2) < 0.4 \quad (20)$$

(aspect 39). In the optical scanner illustrated in FIG. 7, the scanning image forming optical system comprises one or more lenses, and when the optical spot to be formed on the surface to be scanned has an aimed spot diameter ω at an image height of 0, and the surface accuracy σ on each lens surface of the scanning image forming optical system is exploded into components of spatial frequency, within a range of spatial frequency (1/L: line/mm) of 0.1<(1/L)<5, the lens surface accuracy σ, the focal length fσ in the main scanning direction at the surface accuracy σ, and the refractive index n of the lens having the lens surface satisfy, for at least one lens surface, the condition:

$$0 < \log \sigma < -2 \log (1/L) + \log [1/\{32\ f\sigma(n-1)\}] \quad (21)$$

within a range of luminous flux width equal to or greater than W in the main scanning direction on the lens surface, and satisfy the condition:

$$0<\log \sigma<-2 \log (1/W)+\log [1/\{32 f\sigma(n-1)\}] \quad (22)$$

within a range of luminous flux width smaller than W (aspect 40). By using the aforementioned configuration, it is possible to effectively alleviate or prevent density unevenness from the practical point of view, within the depth margin allowed to the scanning image forming optical system. The incident side surface of an actually manufactured lens L1 satisfies the conditions (21) and (22) within a range of spatial frequency of from 0.1 to 5 lines/mm as shown in FIG. 11 (aspect 41).

In the optical scanner illustrated in FIG. 8, the scanning image forming optical system comprises one or more mirrors having an image forming function; and when the optical spot to be formed on the surface to be scanned has an aimed spot diameter ω in a main scanning direction of the optical spot at an image height of 0, and the surface accuracy σ of each mirror of the scanning image forming optical system is exploded into components of the spatial frequency, then, within a range of the spatial frequency (1/L: line/mm) of 0.1<(1/L)<5, for at least one mirror surface, the mirror surface accuracy σ and the focal length fσ in the main scanning direction at the surface accuracy σ satisfy the condition:

$$0<\log \sigma<-2 \log (1/L)+\log [1/\{64 f\sigma\}] \quad (23)$$

within a range of luminous flux width equal to or greater than W in the main scanning direction on the mirror surface, and satisfy the condition:

$$0<\log \sigma i<-2 \log (1/W)+\log [1/\{64 f\sigma\}] \quad (24)$$

within a range of luminous flux width smaller than W (aspect 41). By using the aforementioned configuration, it is possible to effectively alleviate or prevent density unevenness from the practical point of view, within the depth margin allowed to the scanning image forming optical system. The mirror surface of an actually manufactured image forming mirror M1 satisfies the conditions (23) and (24) within a range of spatial frequency of from 0.1 to 5 lines/mm as shown in FIG. 14.

The image forming apparatus 100 illustrated in FIG. 15 applies optical scanning by an optical scanner 117 to a photosensitive surface of a photosensitive medium 111 to form a latent image, and obtains an image by visualizing the latent image; wherein the optical scanner 117 of any one of aspects 39 to 41, performing optical scanning of the photosensitive surface of the photosensitive medium, is used (aspect 43). The photosensitive medium 111 is a photoconductive member, and the electrostatic latent image formed through uniform charging of the photosensitive surface and optical scanning with the optical scanner is visualized into a toner image (aspect 44).

According to the present invention, as described above, it is possible to achieve novel optical scanner, optical scanning method, scanning image forming optical system, and image forming apparatus.

In the scanning image forming optical system of the present invention, a surface accuracy is set for each optical surface so as to inhibit a change in the image surface position to under ¼ of the depth margin. It is therefore possible to effectively alleviate or prevent density unevenness in a recorded image resulting from a change in the spot diameter caused by a change in the image surface position.

The optical scanner and the optical scanning method of the present invention permits achievement of satisfactory optical scanning free from density unevenness in a recorded image by using the above-mentioned scanning image forming optical system. The image forming apparatus of the present invention makes it possible to form a sound image free from density unevenness by using the optical scanner of the present invention.

In the image forming apparatus using the optical scanner of aspects 39 to 41 of the present invention, a satisfactory image can be formed by effectively alleviating or preventing density unevenness easily conspicuous by human eyes from among those in a recorded image caused by a change in the spot diameter due to a change in the image surface position.

Now, other aspects of the present invention are described herein below.

As is understood from the above description, a slight amount of amplitude of swell occurring within an area of an optical scanning lens through which passes a luminous flux causes a variation of the beam waist position near the scanned surface. The cause is that, under the effect of the swell, the curvature of a curved surface of the lens varies, and this causes a local variation of the focal length of the lens.

In a model of the optical scanning lens having a convex shape illustrated in FIG. 1, the curvature becomes slower in a portion where a swell serves as a concave lens, leading to a longer focal length. In a portion where the swell serves as a convex lens, in contrast, the curvature becomes steeper, resulting in a shorter focal length. In the conventional art, in which the curvature was indirectly controlled as plane coordinates, it was required to finish the lens surface at an ultra-high accuracy.

However, because the curvature distribution of the lens surface exerts a direct effect on optical performance, variation of the beam waist position should be inhibited by controlling the lens surface from a point of view of curvature distribution, and this would lead to an easier administration in processing as well as in measurement of the lens surface. Specifically, growth of the beam diameter caused by variation of, and moreover degradation of the output image, can be inhibited by controlling the amount of variation of curvature distribution of the optical scanning lens within an area through which passes the luminous flux of the optical scanning lens to a value within an allowable range.

In general, when z=z(x, y) expresses a continuously curved surface shape, the curvature Cx(x, y) and the curvature radius Rx(x, y) in the x-direction at point (x, y) are expressed by the following formula:

$$Cx(x, y) = \frac{1}{Rx(x, y)} = \frac{\partial^2 z/\partial x^2}{\{1+(\partial z/\partial x)^2\}^{3/2}}$$

Similarly, the curvature Cy (x, y) and the curvature radius (x, y) in the y-direction would be expressed by the following formulae:

$$Cy(x, y) = \frac{1}{Ry(x, y)} = \frac{\partial^2 z/\partial y^2}{\{1+(\partial z/\partial y)^2\}^{3/2}}$$

For simplification, the following description will be based on that the relationship between the shape z(x) and the curvature C(x) is expressed by:

$$C(x) = \frac{1}{R(x)} = \frac{z''(x)}{\{1+(z'(x))^2\}^{3/2}}$$

and it is obvious that the above is valid also in the y-direction.

The term the curvature distribution ΔC(x) as used in the following description shall mean, on the assumption that the curvature C(x) of an actual object represents an ideal curved state, the deviation from the ideal curved state. If the actual object is finished into an ideal state, ΔC(x)=0 is valid irrespective of whether the shape is spherical or non-spherical. The relationship ΔC(x)<> 0 means that a swell is produced in the object.

As illustrated in FIGS. 16 and 17A–17E, the focal length of the optical element, i.e., the optical scanning lens 30 between the optical deflector and the image surface, is f; the swell of the surface within an area of the optical scanning lens 30 through which passes the luminous flux is considered to have a curvature radius ΔC(x); and the maximum value of ΔC(x) is assumed to be ΔC.

If the swell is considered to add a flat convex lens to the lens 30, the focal length fa of the lens 30 resulting from the swell would be:

$$1/fa = (n-1)(1/\Delta r)$$
$$= (n-1)\Delta C$$

where, n: refractive index.

The change Δf in the focal length of the lens 30 caused by the swell approximately satisfies:

$$\Delta f \approx f^2/fa = f^2(n-1)\Delta C \qquad (25)$$

The beam radius w(z) at a position distant from the beam waist radius w0 by z is expressed by:

$$w^2(z) = w0^2\{1+(\lambda z/\pi w0^2)^2\}$$

where, λ: light source wavelength, and if:

$$w(z) = (1+\alpha)w0,$$
$$\text{then, } z = (\sqrt{(\alpha^2+2\alpha)}\times\pi)w0^2/\lambda$$

The allowable change in the beam radius can be deemed to be up to 20%. Therefore, $$\alpha = 0.2$$
$$z \leq 2w0^2/\lambda \qquad (26)$$

With respect to the main scanning direction, because the luminous flux incident on the optical deflector is substantially a parallel flux, a change in the focal length can be considered to be almost equal to a change in the beam waist position.

That is, it may be considered that z=Δf. When w is assumed to be the beam spot radius on the surface to be scanned, or more specifically, the radius thereof when the maximum intensity $1/e^2$ is set as the threshold level, the beam waist position is near the surface to be scanned from the point of design idea. It is therefore possible to consider that w=w0. When the focal length in the main scanning direction is F(=f), from formulae (25) and (26):

$$\Delta C \leq 2\times w^2/\{(n-1)\times\lambda\times F^2\}$$

where, w: beam spot radius on the surface to be scanned;
n: refractive index of the lens;
λ: light source wavelength; and
F: focal length of the scanning image forming optical system as a whole in the main scanning direction. Any value of ΔC satisfying this condition can lead to a satisfactory output image by means of an optical scanner and an image forming apparatus using this optical scanning lens.

For the optical system not in parallel with the sub-scanning direction or with the deflecting direction of the optical deflector, it is necessary to take into account the image forming magnifications, because the deflecting plane of the optical deflector and the image surface are in substantially conjugate relationship.

Figure 16:
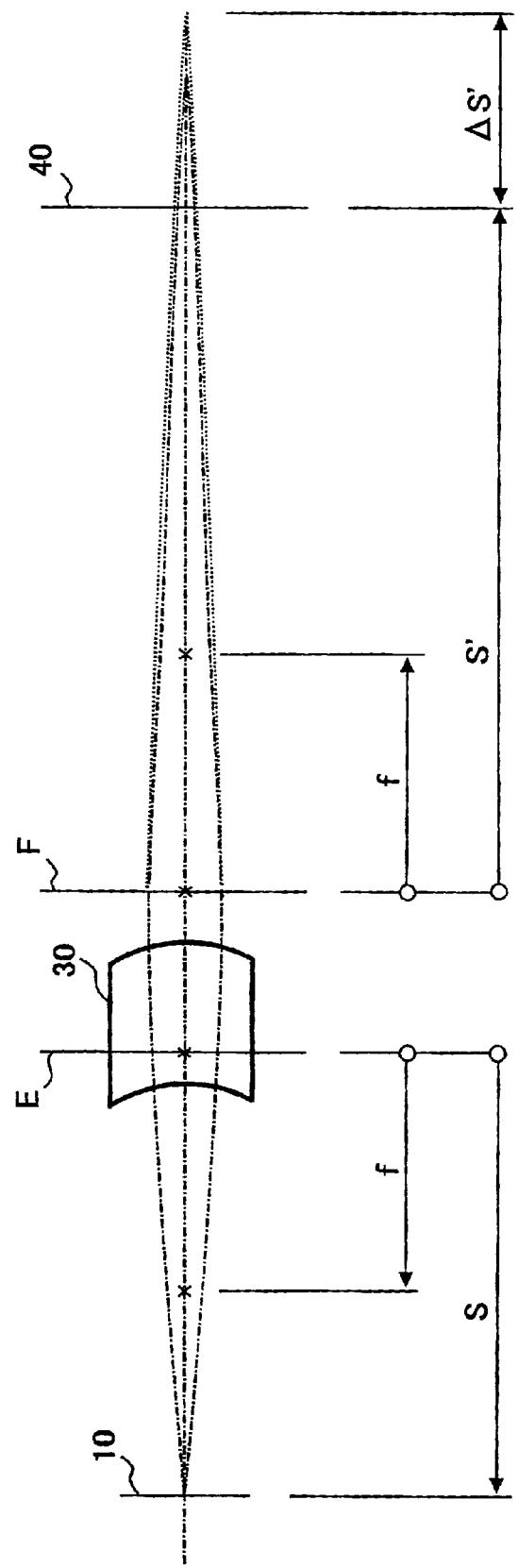
FIG. 16 is a side view illustrating an optical scanner according to another preferred embodiment of the present invention as viewed in a direction corresponding to the sub-scanning direction.
Figure 17A:
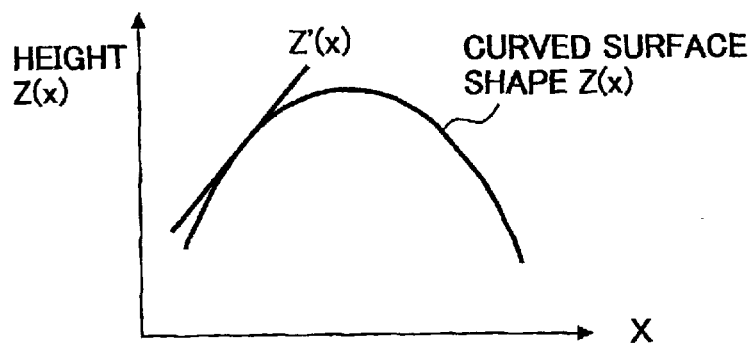
FIGS. 17A–17E are graphs illustrating a curved surface shape, curvature, average curvature, and a relation between a maximum value of the amount of dispersion of curvature distribution and an amplitude of a swell of the curved surface of an optical scanning lens used in the optical scanner illustrated in FIG. 16.
Figure 17B:
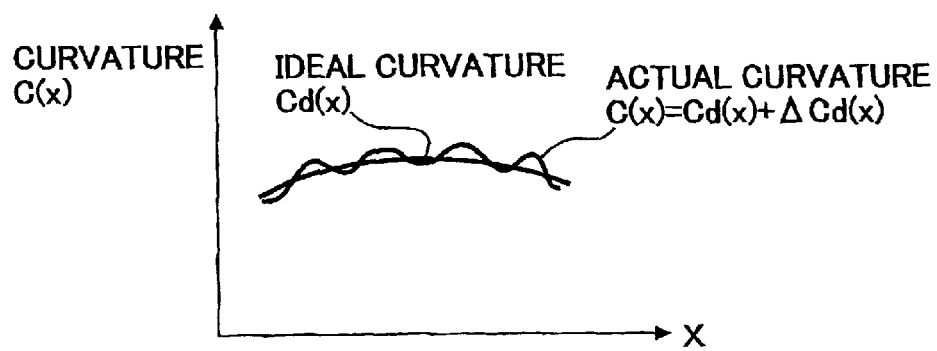
Figure 17C:
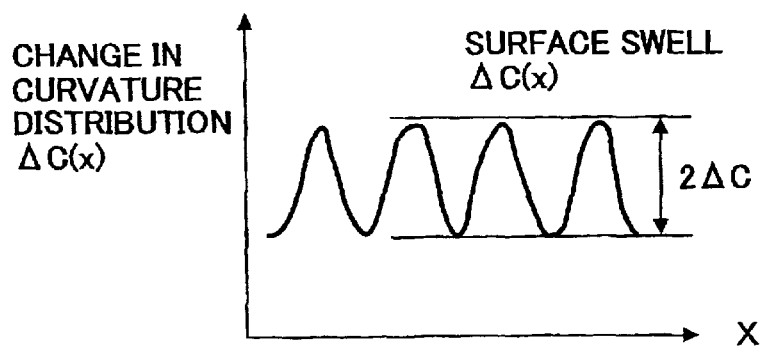
Figure 17D:
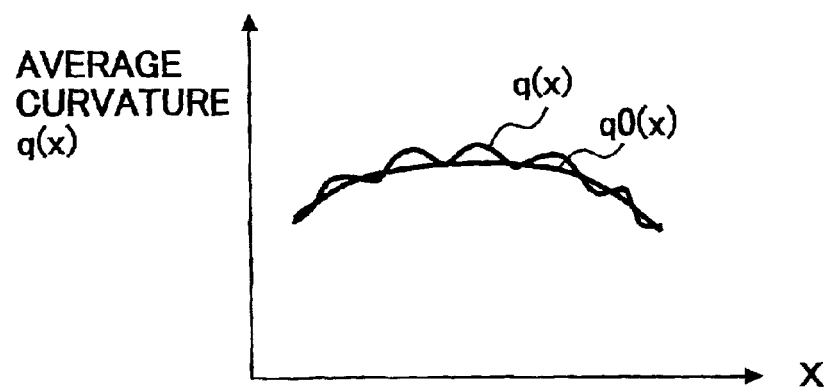
Figure 17E:
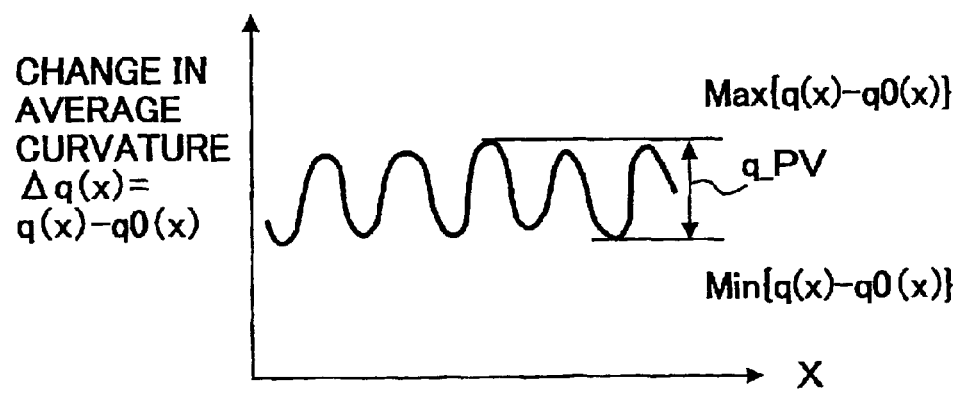

As illustrated in FIG. 16, z=ΔS' (change in image forming position) may be considered to be valid. By using the paraxial image forming formula (1/S'=1/S+1/f), this may be expressed as follows:

$$\Delta C \leq 2\times w^2/\{(n-1)\times\lambda\times S'^2\}$$

where, S': distance between the rear principal point of the scanning image forming optical system and the image surface. Any value of ΔC satisfying this condition can give a satisfactory output image by means of an optical scanner and an image forming apparatus using this optical scanning lens.

In practice, it should preferably be within the following range:

$$0.2/K \leq \Delta C \times (n-1)\times\lambda\times(S'/w)^2 \leq 2$$

A value lower than the lower limit 0.2/K may almost be considered as an error from the view point of optical performance. A measuring error cannot be disregarded, and in addition, the increased time for forming and for cooling may cause a cost increase.

In this formula, K represents the number of optical element surfaces. It is evident that an increase in the number of optical element surfaces results in growth of beam diameter upon occurrence of interaction. Quality per optical element should therefore be high. For example, in the case of a single lens, K=2, and in the case of two lenses, K=4.

Particularly, because the luminous flux incident onto the optical deflector is substantially a parallel flux with respect to the main scanning direction, the following formula is valid:

$$0.2/K \leq \Delta C \times (n-1)\times\lambda\times(f/w)^2 \leq 2$$

Any value of ΔC satisfying this condition can give a satisfactory output image by means of an optical scanner and an image forming apparatus using this optical scanning lens, and can provide a practically preferable lens.

Several concrete examples of the optical scanning lens of the present invention will now be described.

EXAMPLE 1

For an optical system having λ=650 nm, two lenses (K=4), a beam diameter: 27 μm (w=13.5 μm), f=225.3 mm and n=1.52398, with respect to ΔC in the main scanning direction, $$\Delta C \leq 2.1084\text{E}-05$$

is a necessary condition for inhibiting a change in the beam spot position, and $$\Delta C \geq 5.2709\text{E}-07$$

is the sufficient condition.

EXAMPLE 2

For an optical system having λ=780 nm, two lenses (K=4), a beam diameter: 65 μm (w=32.5 μm), f=185.4 mm, and n=1.52398, with respect to ΔC in the main scanning direction, $$\Delta C \leq 1.8535E{-}04$$

is a necessary condition for inhibiting a change in the beam spot position, and $$\Delta C \leq 4.6338E{-}06$$

is the sufficient condition.

EXAMPLE 3

For an optical system having λ=780 nm, a single lens (K=2), a beam diameter: 90 μm (w=45 μm), S'=121.9, and n=1.52398:

$$\Delta C \leq 6.6687E{-}04$$

is a necessary condition for inhibiting a change in the beam spot position, and $$\Delta C \geq 3.3343E{-}05$$

is the sufficient condition.

Spatial presence of a high-frequency surface roughness causes a considerable change in curvature and an increased ΔC, but this does not exert a serious effect on the change in focal length. It is therefore recommendable to eliminate abnormal values by applying smoothing or averaging within a range of at least 0.05 mm.

To judge from abnormal values of curvature resulting from the lens surface roughness as described above, it would be more realistic to pay attention to the average curvature.

When calculating the average curvature q(x), a common method of calculating it from the result of the curvature C(x) as expressed by:

$$q(x) = \frac{1}{b} \int_{x-b/2}^{x+b/2} C(x)dx$$

may be adopted. When considering the measuring method, however, the following method for determining q(x) directly from the linear differential value z'(x) of the curved surface would be more effective:

$$q(x) = \frac{1}{b}\left[\frac{z'(x+b/2)}{\sqrt{1+(z'(x+b/2))^2}} - \frac{z'(x-b/2)}{\sqrt{1+(z'(x-b/2))^2}}\right]$$

$$\Delta q(x) = q(x) - q0(x)$$

$$q\_PV = \max(\Delta q(x)) - \min(\Delta q(x))$$

where, q0(x): polynomial approximate curve of up to 10th degree of q(x);

q0(x) is for subtracting the design shape such as a non-spherical surface. In the case of a spherical surface, in which the curvature is constant in design, it is not necessary to apply a processing of the approximate curve.

Δq(x): amount of change in average curvature;

max (Δq(x)): maximum value of Δq(x); and min (Δq(x)): minimum value of Δq(x).

The value of the width b for calculating an average should preferably be equal to, or up to, the beam luminous flux diameter on the optical element surface. As a result, q_PV would correspond to the amount of change in curvature for the beam luminous flux. Therefore, by incorporating ΔC=q_PV/2 and w=wd/2 in formula (3):

$$q\_PV \times (n-1) \times \lambda \times (S'/wd)^2 \leq 1$$

where, wd: beam spot diameter on the surface to be scanned, would be the condition for the lens and the evaluating method therefor for obtaining a satisfactory output image.

Similarly, because, with respect to the main scanning direction, the luminous flux from the optical deflector is substantially a parallel flux, the focal length can be regarded as being almost equal to a change in the beam waist position.

$$PV \times (n-1) \times \lambda \times (f/wd)^2 \leq 1$$

In practice, it should preferably be within the following range:

$$0.1/K \leq q\_PV \times (n-1) \times \lambda \times (S'/wd)^2 \leq 1$$

FIGS. 17A–17E illustrate the relationship between the curved surface shape z(x), the curvature C(x) and the average curvature q(x), on the one hand, and ΔC and q_PV, on the other hand.

Figure 18:
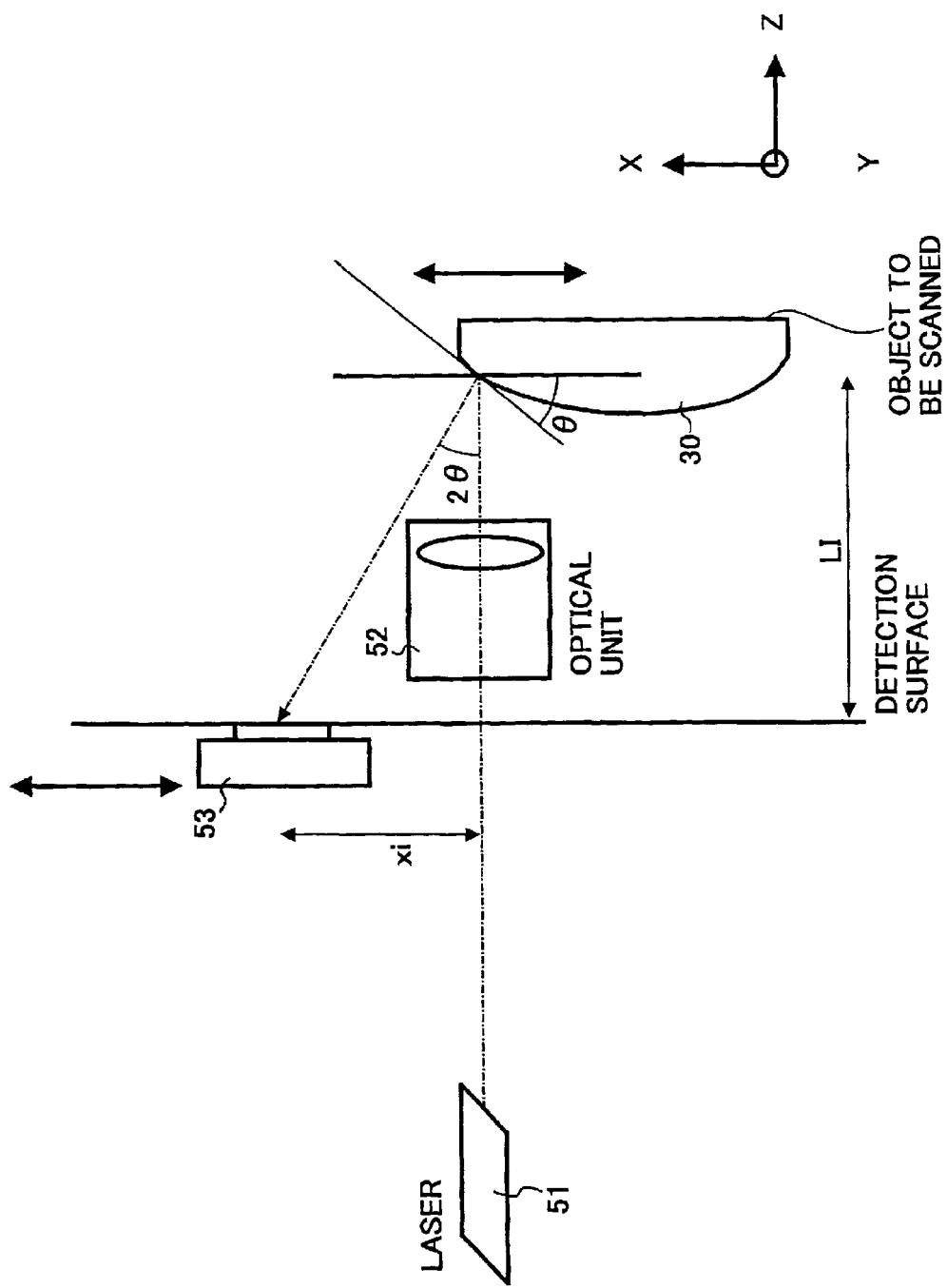
FIG. 18 is a conceptual drawing illustrating a typical measuring instrument for measuring the amount of dispersion of curvature distribution on a curved surface of an optical scanning lens of the present invention.

FIG. 18 is a principle view of a curvature distribution measuring method. A laser beam emitted from a laser beam source 51 passes through an optical unit 52, and is irradiated to an optical scanning lens 30 which is an object to be scanned, the reflected beam being detected by a receiving element 53. A position sensor, a CCD, or a divided photodiode is used as the receiving element 53. The beam center position xi is calculated by determining the center of gravity through analysis of beam intensity produced on the receiving element 53.

For simplification, the shape of the scanned object surface in the (x, y) plane is represented by z(x), and the inclination angle distribution is represented by θ(x).

If the distance between the beam irradiating position on the scanned object and the detection surface on the receiving element 53 is L1, and the distance between the incident beam and the reflected beam passing through the detection surface on the receiving element 53 is xi, then:

$$\tan(2\theta(x)) = xi/L1$$

$$2\theta(x) = \arctan(xi/L1)$$

$$\theta(x) = 0.5 * \arctan(xi/L1)$$

The inclination angle θ(x) can thus be measured. The linear differential value z'(x) of z(x) can be calculated from the inclination angle θ(x) in accordance with the following formula:

$$z'(x) = \tan(\theta(x))$$

The optical scanning lens 30 is moved in the x-direction to measure the curvature distribution on the surface of the optical scanning lens 30 which is the object to be scanned. This movement causes a change in the reflection angle by the surface of the lens 30, and hence a change in the beam receiving position on the receiving element 53. The receiving element 53 is therefore directed in the x-direction by causing the same to follow the movement of the reflected beam position so that the beam reflected from the lens 30 can be received at a prescribed position of the receiving element 53. This permits measurement of the inclination angle distribution of the lens 30 surface in the x-direction.

When L1 changes along with movement of the object to be scanned, the value of L1 may be corrected with a previously known design value, or the surface to be scanned may be relatively moved in the z-axis direction so that L1 becomes constant.

Similarly, it is possible to measure the inclination angle distribution of the curved surface within the XY plane by causing scanning also in the y-direction.

The inclination angle distribution $\theta x(x,y)$ and $\theta y(x,y)$ independent of each other relative to the biaxial directions within the plane of the scanned object, by causing the receiving element as well to scan in the x and y directions and measuring positions of the reflected beam (xi, yi). This is effective particularly when curvatures of the object surface are different between the two axes as in the AC (anamorphic) plane.

When the inclination angle of the lens surface is near 0°, the beam source 51 and the receiving element 53 overlap each other. It is recommendable in this case to separate the optical paths by means of a half mirror or the like.

Figure 19:
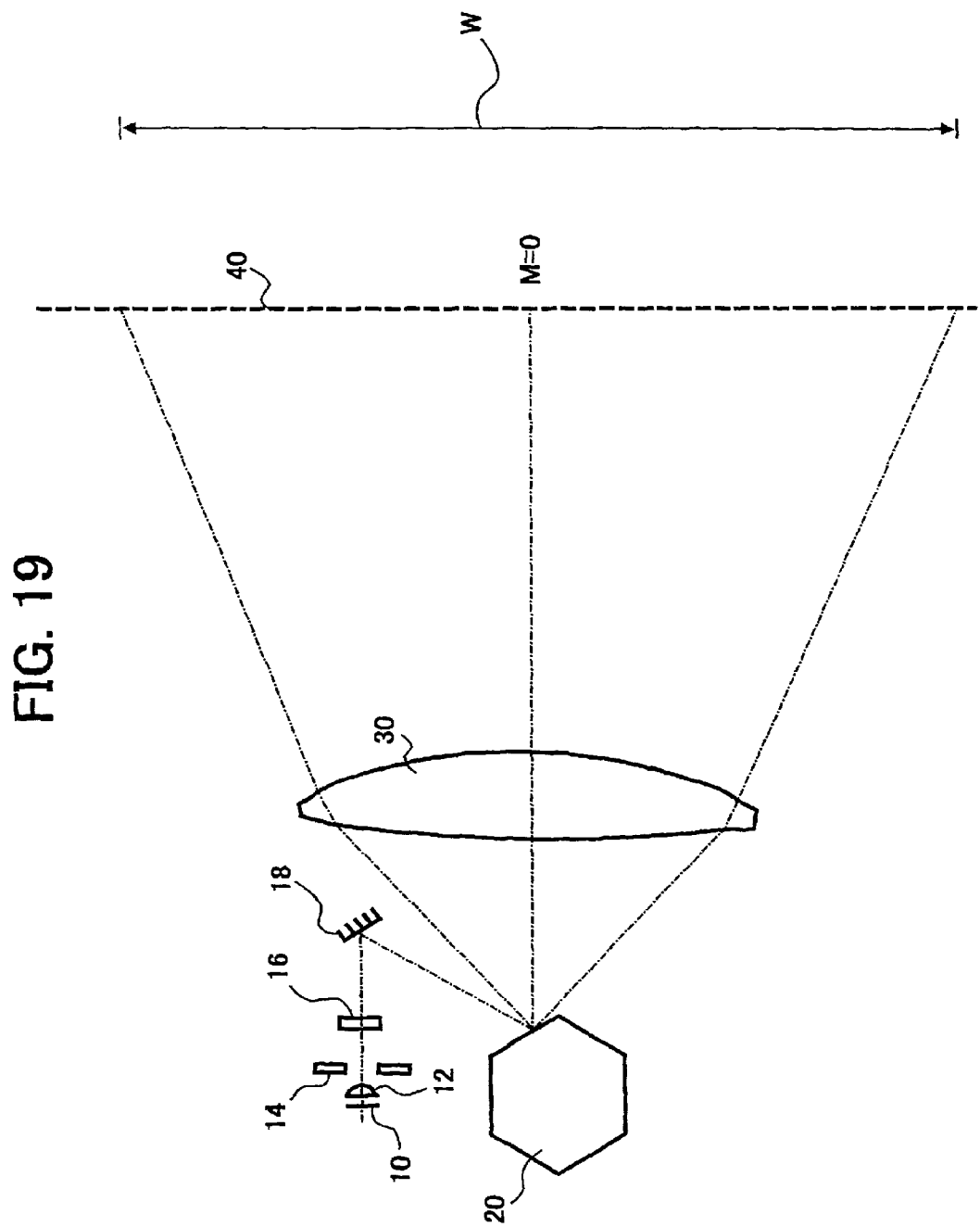
FIG. 19 is a side view illustrating an optical scanner according to another preferred embodiment of the present invention, as viewed in a direction corresponding to the main scanning direction.

FIG. 19 schematically illustrates an optical scanner according to an embodiment of the present invention, which permits application of the optical scanning lens of the present invention. Because the optical scanner of this embodiment has a similar exterior view as that of the background optical scanner described with reference to FIG. 1, common reference numerals are assigned to the same component parts. In FIG. 19, a divergent luminous flux emitted from a semiconductor laser 10 serving as a light source is converted into a flux form (such as a parallel flux) suitable for the subsequent optical systems by the coupling lens 12, is beam-rectified by passing through the opening of the aperture 14, and is reflected by the mirror 18 while converging in the sub-scanning direction by the cylindrical lens 16. The luminous flux is thus formed into a line image long in the main scanning direction near the deflecting reflective plane of the rotary polygon mirror 20 serving as an optical deflector.

The luminous flux reflected by the deflecting reflective surface of the rotary polygon mirror 20 enters the optical scanning lens 30 composing a scanning image forming optical system while being deflected at a uniform angular speed along with uniform rotation of the rotary polygon mirror 20, is condensed near the surface to be scanned 40 (practically, the photosensitive surface of a photoconductive member or the like) by the effect of the optical scanning lens 30, and forms an optical spot on the surface to be scanned 40. The surface to be scanned 40 is scanned by the optical spot in the main scanning direction. The substance of the surface to be scanned 40 is a drum-shaped, belt-shaped or other appropriately-shaped photoconductive member. Optical writing is performed onto the photosensitive surface of the photoconductive member to form an electrostatic latent image through repetition of optical scanning in the main scanning direction while the photosensitive surface is moved in the sub-scanning direction (direction perpendicular to the paper surface in FIG. 19). The main scanning with this optical spot is carried out at a uniform speed under the effect of uniform speed characteristic of the scanning image forming optical system comprising the optical scanning lens 30.

In the optical scanner illustrated in FIG. 19, the optical scanning lens 30 itself composes the scanning image forming optical system. When the scanning image forming optical system comprises a plurality of optical elements, i.e., a plurality of lenses or combinations of lenses and concave mirrors, one or more optical scanning lenses may be included among them.

The optical scanning lens 30 is made by forming a plastic material or by glass.

In place of the optical scanning lens 30, a reflecting mirror having similar optical functions may be used.

By applying the optical scanner using an optical scanning lens of the aforementioned embodiments to an image forming apparatus such as a copying machine, a facsimile machine or a printer, it is possible to obtain a high-quality image in which image quality degradation is inhibited. More specifically, by setting the surface scanned by the optical scanner as a surface of a photoconductive member, and scanning the surface of the uniformly charged photoconductive member with the optical spot as described above, an electrostatic latent image is formed on the surface of the photoconductive member which is the surface to be scanned. Known electrophotographic processes such as developing, transferring, fixing, and cleaning of the surface of the photoconductive member are applied to the electrostatic latent image. Through the above-mentioned transferring and fixing steps, an image can be formed on a transfer sheet. Because the principle of such an image forming apparatus is publicly known, it is not shown in the drawings.

According to aspects 44, 45 and 46 of the present invention, it is possible to manufacture a lens in which a surface swell produced during the processing step or the forming step is inhibited within an allowable range. It is thus possible to build an optical system satisfying required optical performance.

The aspect 45 of the present invention is applicable to both cases where an incident beam onto an optical deflector is a parallel or non-parallel beam. The present invention is more effectively applicable to the case with a parallel incident beam, because when the incident beam onto the optical deflector is a parallel beam, the beam is substantially a parallel beam with respect to the main scanning direction of an optical scanning optical system, and the change in the focal length is equal to the change in beam spot position.

According to aspects 47 and 48 of the present invention, it is possible to manufacture a lens in which a change in the beam waist position caused by a surface swell is inhibited by using an average curvature as an evaluation item taking account of the measuring method. It is therefore possible to build an optical system satisfying required optical performance.

According to aspect 49 of the present invention, it is possible to build a highly reliable optical scanner free from quality degradation of an output image caused by growth of the beam diameter by composing the optical scanner by using any one of the optical scanning lenses according to any one of aspects 44–48 of the present invention.

According to aspect 50 of the present invention, an image forming apparatus is composed by using an optical scanner hardly susceptible to quality degradation of an output image. It is therefore possible to obtain a high-quality image in which image quality degradation is inhibited.

Numerous additional modifications and variations of the present invention are possible in light of the above teachings. It is therefore to be understood that the within the scope of the appended claims, the present invention may be practiced otherwise than as specifically described herein. The present application claims priority and contains subject matter related to Japanese Patent Applications No. 2000-288629 and No. 2001-060641 filed in the Japanese Patent Office on Sep. 22, 2000 and Mar. 5, 2001, respectively, and the entire contents of which are hereby incorporated by reference.

What is claimed is:

1. An optical scanning system comprising:

a light source;

and an optical scanner which performs optical scanning of a surface to be scanned by deflecting a luminous flux having a wavelength λ from said light source by means of an optical deflector, and condensing the deflected flux toward the surface to be scanned through a scanning image forming optical system, thereby forming an optical spot on said surface to be scanned, wherein said scanning image forming optical system has at least one lens; and wherein, in the said scanning image forming optical system, when a focal length fσ in a main scanning direction at a surface accuracy σi is defined as:

$$f\sigma = \{2.6846\lambda \times \sqrt{(k)} \times fm^2/\omega^2\} - fm$$

where, fm represents a focal length in the main scanning direction of said scanning image forming optical system; k represents the number of lens surfaces; ω represents an aimed spot diameter of the optical spot in the main scanning direction at an image height of 0; σi represents a surface accuracy of an i-th lens surface as counted from an optical deflector side; n represents a refractive index of material of a lens having the i-th lens surface; and 1/L represents a spatial frequency in the main scanning direction on said lens surface; then, said surface accuracy σi, said focal length fσ, said refractive index n, and said spatial frequency 1/L satisfy, for each lens surface, a following condition:

$$0 < \log \sigma i < -2 \log(1/L) + \log[1/\{32 f\sigma(n-1)\}]. \quad (1)$$

2. An optical scanning system according to claim 1, wherein, when W represents an optical flux diameter in the main scanning direction of the deflected luminous flux entering the i-th lens surface as counted from the optical deflector, the surface accuracy σi, the focal length fσ, and the refractive index n satisfy a following condition:

$$0 < \log \sigma i < -2 \log(1/W) + \log[1/\{32 f\sigma(n-1)\}] \quad (2)$$

for each lens surface, for a spatial frequency equal to or smaller than (1/W), without depending upon the spatial frequency in the main scanning direction on the lens surface (1/L).

3. An optical scanning system according to claim 1, wherein said light source is a semiconductor laser, and the luminous flux from the light source is coupled with a subsequent optical system by a coupling lens, deflected by the optical deflector, and enters the scanning image forming optical system.

4. An optical scanning system according to claim 3, wherein a function of the coupling lens is a collimating function.

5. An optical scanning system according to claim 4, wherein the scanning image forming optical system consists of only lenses including said one lens.

6. An optical scanning system according to claim 5, wherein the scanning image forming optical system consists of two lenses including said one lens.

7. An optical scanning system according to claim 3, wherein the scanning image forming optical system consists of only lenses including said one lens.

8. An optical scanning system according to claim 7, wherein the scanning image forming optical system consists of two lenses including said one lens.

9. An optical scanning system according to claim 3, wherein said optical deflector is a rotary mirror having a deflecting reflective surface;

wherein the coupled luminous flux is condensed by a line image forming optical system in a sub-scanning direction and is formed into a line image long in the main scanning direction near said deflecting reflective surface; and wherein said scanning image forming optical system is an anamorphic optical system associating a starting point of deflection by the optical deflector and the surface to be scanned into an opto-geometrical conjugate relationship relative to the sub-scanning direction.

10. An optical scanning system according to claim 9, wherein the function of the coupling lens is a collimating function.

11. An optical scanning system according to claim 10, wherein the scanning image forming optical system consists of only lenses including said one lens.

12. An optical scanning system according to claim 11, wherein the scanning image forming optical system consists of two lenses including said one lens.

13. An optical scanning system according to claim 9, wherein the scanning image forming optical system consists of only lenses including said one lens.

14. An optical scanning system according to claim 13, wherein the scanning image forming optical system consists of two lenses including said one lens.

15. An optical scanning system according to claim 1, wherein said optical deflector is a rotary polygon mirror.

16. An optical scanning method, comprising the steps of:

providing a scanning image forming optical system having at least one lens, in which, when a focal length fσ in a main scanning direction at a surface accuracy σi is defined as:

$$f\sigma = \{2.6846\lambda \times \sqrt{(k)} \times fm^2/\omega^2\} - fm$$

where, fm represents a focal length in the main scanning direction of said scanning image forming optical system; k represents the number of lens surfaces; ω represents an aimed spot diameter of the optical spot in the main scanning direction at an image height of 0; σi represents a surface accuracy of an i-th lens surface as counted from an optical deflector side; n represents a refractive index of material of a lens having the i-th lens surface; and 1/L represents a spatial frequency in the main scanning direction on said lens surface; then, said surface accuracy σi, said focal length fσ, said refractive index n, and said spatial frequency 1/L satisfy, for each lens surface, a following condition:

$$0 < \log \sigma i < -2 \log(1/L) + \log[1/\{32 f\sigma(n-1)\}], \text{ and} \quad (1)$$

causing an optical deflector to deflect a luminous flux having a wavelength λ from a light source, condensing the deflected luminous flux through the scanning image forming optical system toward a surface to be scanned, and forming an optical spot on said surface to be scanned, thereby conducting optical scanning of said surface to be scanned.

17. An optical scanning method according to claim 16, wherein, in the providing step, when W represents an optical flux diameter in the main scanning direction of the deflected luminous flux entering the i-th lens surface as counted from the optical deflector, the surface accuracy σi, the focal length fσ, and the refractive index n satisfy a following condition:

$$0<\log \sigma i<-2 \log(1/W)+\log [1/\{32\, f\sigma(n-1)\}] \quad (2)$$

for each lens surface, for a spatial frequency equal to or smaller than (1/W), without depending upon the spatial frequency in the main scanning direction on the lens surface (1/L).

18. An optical scanning method according to claim 16, wherein in the optical scanning conducting step, said light source is a semiconductor laser, and the luminous flux is coupled with a subsequent optical system by a coupling lens, deflected by the optical deflector, and enters the scanning image forming optical system.

19. An optical scanning method according to claim 18, wherein in the optical scanning conducting step, a function of the coupling lens is a collimating function.

20. An optical scanning method according to claim 19, wherein in the providing step the scanning image forming optical system consists of only lenses including said one lens.

21. An optical scanning method according to claim 20, wherein in the providing step the scanning image forming optical system consists of two lenses including said one lens.

22. An optical scanning method according to claim 18, wherein in the providing step the scanning image forming optical system consists of only lenses including said one lens.

23. An optical scanning method according to claim 22, wherein in the providing step the scanning image forming optical system consists of two lenses including said one lens.

24. An optical scanning method according to claim 18, wherein in the optical scanning conducting step said optical deflector is a rotary mirror having a deflecting reflective surface, the coupled luminous flux is condensed by a line image forming optical system in a sub-scanning direction and is formed into a line image long in the main scanning direction near said deflecting reflective surface; and said scanning image forming optical system is an anamorphic optical system associating a starting point of deflection by the optical deflector and the surface to be scanned into an opto-geometrical conjugate relationship relative to the sub-scanning direction.

25. An optical scanning method according to claim 24, wherein in the optical scanning conducting step the function of the coupling lens is a collimating function.

26. An optical scanning method according to claim 25, wherein in the providing step the scanning image forming optical system consists of only lenses including said one lens.

27. An optical scanning method according to claim 26, wherein in the providing step the scanning image forming optical system consists of two lenses including said one lens.

28. An optical scanning method according to claim 24, wherein in the providing step the scanning image forming optical system consists of only lenses including said one lens.

29. An optical scanning method according to claim 28, wherein in the providing step the scanning image forming optical system consists of two lenses including said one lens.

30. An optical scanning method according to claim 16, wherein in the optical scanning conducting step said optical deflector is a rotary polygon mirror.

31. An optical scanning method according to claim 16, wherein in the optical scanning conducting step the luminous flux is deflected by a rotary polygon mirror serving as the optical deflector.

32. An optical scanning method comprising the steps of:
providing a semiconductor laser as a light source;
providing a scanning image forming optical system having at least one lens, in which, when a focal length fσ in a main scanning direction at a surface accuracy σi is defined as:

$$f\sigma = \{2.6846\lambda \times \sqrt{(k)} \times fm^2/\omega^2\} - fm$$

where, fm represents a focal length in the main scanning direction of said scanning image forming optical system; k represents the number of lens surfaces; ω represents an aimed spot diameter of the optical spot in the main scanning direction at an image height of 0; σi represents a surface accuracy of an i-th lens surface as counted from an optical deflector side; n represents a refractive index of material of a lens having the i-th lens surface; and 1/L represents a spatial frequency in the main scanning direction on said lens surface; then, said surface accuracy σi, said focal length fσ, said refractive index n, and said spatial frequency 1/L satisfy, for each lens surface, a following condition:

$$0<\log \sigma i<-2 \log(1/L)+\log [1/\{32\, f\sigma(n-1)\}]; \text{ and} \quad (1)$$

causing a luminous flux having a wavelength λ from the light source side to enter an optical deflector via a coupling lens, deflecting the luminous flux through said optical deflector, condensing the deflected luminous flux toward a surface to be scanned through the scanning image forming optical system, and forming an optical spot on the surface to be scanned, thereby conducting optical scanning of the surface to be scanned.

33. An optical scanning method according to claim 32, wherein in the optical scanning conducting step the luminous flux is coupled with a subsequent optical system by the coupling lens, deflected by the optical deflector, and enters the scanning image forming optical system.

34. An optical scanning method according to claim 33, wherein in the optical scanning conducting step, a function of the coupling lens is a collimating function.

35. An optical scanning method according to claim 34, wherein in the providing step the scanning image forming optical system consists of only lenses including said one lens.

36. An optical scanning method according to claim 35, wherein in the providing step the scanning image forming optical system consists of two lenses including said one lens.

37. An optical scanning method according to claim 33, wherein in the providing step the scanning image forming optical system consists of only lenses including said one lens.

38. An optical scanning according to claim 37,
wherein in the providing step the scanning image forming optical system consists of two lenses including said one lens.

39. An optical scanning method according to claim 32,
wherein in the optical scanning conducting step said optical deflector is a rotary mirror having a deflecting reflective surface, the coupled luminous flux is condensed by a line image forming optical system in a sub-scanning direction and is formed into a line image long in the main scanning direction near said deflecting reflective surface; and said scanning image forming optical system is an anamorphic optical system associating a starting point of deflection by the optical deflector and the surface to be scanned into an opto-geometrical conjugate relationship relative to the sub-scanning direction.

40. An optical scanning method according to claim 39,
wherein in the optical scanning conducting step the function of the coupling lens is a collimating function.

41. An optical scanning method according to claim 40,
wherein in the providing step the scanning image forming optical system consists of only lenses including said one lens.

42. An optical scanning method according to claim 41,
wherein in the providing step the scanning image forming optical system consists of two lenses including said one lens.

43. An optical scanning method according to claim 39,
wherein in the providing step the scanning image forming optical system consists of only lenses including said one lens.

44. An optical scanning method according to claim 43,
wherein in the providing step the scanning image forming optical system consists of two lenses including said one lens.

45. An optical scanning method according to claim 32,
wherein in the optical scanning conducting step the luminous flux is deflected by a rotary polygon mirror serving as the optical deflector.

46. An optical scanning method comprising the steps of:
providing a semiconductor laser as a light source;
providing a scanning image forming optical system having at least one lens, in which, when a focal length $f\sigma$ in a main scanning direction at a surface accuracy $\sigma i$ is defined as:

$$f\sigma = \{2.6846 \lambda \times \sqrt{(k)} \times fm^2/\omega^2\} - fm$$

where, fm represents a focal length in the main scanning direction of said scanning image forming optical system; k represents the number of lens surfaces; $\omega$ represents an aimed spot diameter of the optical spot in the main scanning direction at an image height of 0; $\sigma i$ represents a surface accuracy of an i-th lens surface as counted from an optical deflector side; n represents a refractive index of material of a lens having the i-th lens surface; and 1/L represents a spatial frequency in the main scanning direction on said lens surface; then, said surface accuracy $\sigma i$, said focal length $f\sigma$, said refractive index n, and said spatial frequency 1/L satisfy, for each lens surface, a following condition:

$$0 < \log \sigma i < -2 \log(1/L) + \log[1/\{32 f\sigma(n-1)\}]; \text{ and} \quad (1)$$

converting a luminous flux having a wavelength $\lambda$ from the light source into a parallel luminous flux, then entering an optical deflector via a coupling lens, a function of the coupling lens being a collimating function, deflecting the luminous flux through said optical deflector, condensing the deflected luminous flux toward a surface to be scanned through a scanning image forming optical system, and forming an optical spot on the surface to be scanned, thereby conducting optical scanning of the surface to be scanned.

47. An optical scanning method according to claim 46,
wherein the scanning image forming lens consists of only lenses including said one lens.

48. An optical scanning method according to claim 47,
wherein the scanning image forming lens consists of two lenses including said one lens.

49. An optical scanning method according to claim 46,
wherein in the optical scanning conducting step the luminous flux is deflected by a rotary polygon mirror serving as the optical deflector.

50. An optical scanning method, comprising the steps of:
providing a semiconductor laser as a light source,
providing a scanning image forming optical system having at least one lens, in which, when a focal length $f\sigma$ in a main scanning direction at a surface accuracy $\sigma i$ is defined as:

$$f\sigma = \{2.6846 \lambda \times \sqrt{(k)} \times fm^2/\omega^2\} - fm$$

where, fm represents a focal length in the main scanning direction; k represents the number of lens surfaces; $\omega$ represents an aimed spot diameter of the optical spot in the main scanning direction at an image height of 0; $\sigma i$ represents a surface accuracy of an i-th lens surface as counted from an optical deflector side; n represents a refractive index of material of a lens having the i-th lens surface; and 1/L represents a spatial frequency in the main scanning direction on said lens surface; then, said surface accuracy $\sigma i$, said focal length $f\sigma$, said refractive index n, and said spatial frequency 1/L satisfy, for each lens surface, a following condition:

$$0 < \log \sigma i < -2 \log(1/L) + \log[1/\{32 f\sigma(n-1)\}], \text{ said} \quad (1)$$

scanning image forming optical system being an anamorphic optical system associating a starting point of deflection by an optical deflector and a surface to be scanned into an opto-geometrical conjugate relationship relative to a sub-scanning direction;
coupling a luminous flux having a wavelength $\lambda$ from the light source with a subsequent optical system through a coupling lens, condensing the coupled luminous flux in the sub-scanning direction by a line image forming optical system, forming a line image long in the main scanning direction near the deflecting reflective surface position of a rotary mirror serving as the optical deflector, and condensing the deflected luminous flux by the scanning image forming optical system toward the surface to be scanned to form an optical spot on said surface to be scanned, thereby conducting optical scanning of said surface to be scanned.

51. An optical scanning method according to claim 50,
wherein in the providing step the scanning image forming optical system consists of only lenses including said one lens.

52. An optical scanning method according to claim 51,
wherein in the providing step the scanning image forming optical system consists of two lenses including said one lens.

53. An optical scanning method according to claim 50, wherein in the optical scanning conducting step, a function of the coupling lens is a collimating function.

54. An optical scanning method according to claim 53, wherein in the providing step the scanning image forming optical system consists of only lenses including said one lens.

55. An optical scanning method according to claim 54, wherein in the providing step the scanning image forming optical system consists of two lenses including said one lens.

56. An optical scanning method according to claim 50, wherein in the optical scanning conducting step the luminous flux is deflected by a rotary polygon mirror serving as the optical deflector.

57. An optical scanning method, comprising the steps of:
providing a semiconductor laser as a light source,
providing a scanning image forming optical system having at least one lens, in which, when a focal length fσ in a main scanning direction at a surface accuracy σi is defined as:

$$f\sigma = \{2.6846\lambda \times \sqrt{(k)} \times fm^2/\omega^2\} - fm$$

where, fm represents a focal length in the main scanning direction of said scanning image forming optical system; k represents the number of lens surfaces; ω represents an aimed spot diameter of the optical spot in the main scanning direction at an image height of 0; σi represents a surface accuracy of an i-th lens surface as counted from an optical deflector side; n represents a refractive index of material of a lens having the i-th lens surface; and 1/L represents a spatial frequency in the main scanning direction on said lens surface; then, said surface accuracy σi, said focal length fσ, said refractive index n, and said spatial frequency 1/L satisfy, for each lens surface, a following condition:

$$0 < \log \sigma i < -2 \log(1/L) + \log [1/\{32\, f\sigma(n-1)\}], \quad \text{said} \quad (1)$$

canning image forming optical system being an anamorphic optical system associating a starting point of deflection by an optical deflector and the surface to be scanned into an opto-geometrical conjugate relationship relative to a sub-scanning direction;
converting a luminous flux having a wavelength λ from the light source into a parallel luminous flux, then condensing the parallel flux in the sub-scanning direction through a line image forming optical system to form a line image long in the main scanning direction near a deflecting reflective surface position of a rotary mirror serving as the optical deflector, and condensing the deflected luminous flux by the scanning image forming optical system toward the surface to be scanned to form an optical spot on said surface to be scanned, thereby conducting optical scanning of said surface to be scanned.

58. An optical scanning method according to claim 57, wherein in the providing step said scanning image forming lens consists of only lenses including said one lens.

59. An optical scanning method according to claim 58, wherein in the providing step said scanning image forming lens consists of two lenses including said one lens.

60. An optical scanning method according to claim 57, wherein in the optical scanning conducting step the luminous flux is deflected by a rotary polygon mirror serving as the optical deflector.

61. A scanning image forming optical system used in an optical scanner performing optical scanning of a surface to be scanned by deflecting a luminous flux having a wavelength λ from a light source, and condensing the deflected luminous flux by the scanning image forming optical system toward the surface to be scanned to form an optical spot on the surface to be scanned,
wherein said optical scanner has an aimed spot diameter ω for an optical spot formed by the scanning image forming optical system at an optical spot height of 0;
wherein said scanning image forming optical system has at least one lens; and
wherein when a focal length fσ in a main scanning direction at a surface accuracy σi is defined as:

$$f\sigma = \{2.6846\lambda \times \sqrt{(k)} \times fm^2/\omega^2\} - fm$$

where, fm represents the focal length in the main scanning direction; k represents the number of lens surfaces; σi represents a surface accuracy of an i-th lens surface as counted from an optical deflector side; n represents a refractive index of material of a lens having the i-th lens surface; and 1/L represents a spatial frequency in the main scanning direction on said lens surface; then, said surface accuracy σi, said focal length fσ, said refractive index n, and said spatial frequency 1/L satisfy, for each lens surface, a following condition:

$$0 < \log \sigma i < -2 \log(1/L) + \log [1/\{32\, f\sigma(n-1)\}]. \quad (1)$$

62. A scanning image forming optical system according to claim 61,
wherein when W represents an optical flux diameter in the main scanning direction of the deflected luminous flux entering the i-th lens surface as counted from the optical deflector, the surface accuracy σi, the focal length fσ, and the refractive index n satisfy a following condition:

$$0 < \log \sigma i < -2 \log(1/W) + \log \{1/\{32\, f\sigma(n-1)\}] \quad (2)$$

for each lens surface for a spatial frequency equal to or smaller than (1/W), without depending upon the spatial frequency.

63. A scanning image forming optical system according to claim 61,
wherein said light source is a semiconductor laser, and the luminous flux from the semiconductor laser enters said scanning image forming optical system via a coupling lens and an optical deflector.

64. A scanning image forming optical system according to claim 63,
wherein the luminous flux is converted into a parallel luminous flux by the coupling lens and is deflected by the optical deflector to enter the optical scanner.

65. A scanning image forming optical system according to claim 64,
wherein the scanning image forming optical system consists of only lenses including said one lens.

66. A scanning image forming optical system according to claim 65, the scanning image forming optical system consists of two lenses including said one lens.

67. A scanning image forming optical system according to claim 63,
wherein the scanning image forming optical system consists of only lenses including said one lens.

68. A scanning image forming optical system according to claim 67, the scanning image forming optical system consists of two lenses including said one lens.

69. A scanning image forming optical system according to claim 61, comprising:
wherein the scanning image forming optical system is an anamorphic optical system associating a starting point of deflection by the optical deflector and the surface to be scanned into an opto-geometrical conjugate relationship relative to the sub-scanning direction.

70. A scanning image forming optical system according to claim 69,
wherein the deflected luminous flux which is a parallel luminous flux in the main scanning direction enters the scanning image forming optical system.

71. A scanning image forming optical system according to claim 70,
wherein the scanning image forming optical system consists of only lenses including said one lens.

72. A scanning image forming optical system according to claim 71,
wherein the scanning image forming optical system consists of two lenses including said one lens.

73. A scanning image forming optical system according to claim 69,
wherein the scanning image forming optical system consists of only lenses including said one lens.

74. A scanning image forming optical system according to claim 73,
wherein the scanning image forming optical system consists of two lenses including said one lens.

75. A scanning image forming optical system according to claim 61,
wherein said one lens is a plastic lens.

76. An image forming apparatus, comprising:
a photosensitive medium for forming a latent image thereupon through optical scanning of a photosensitive surface thereof;
a visualizing device configured to visualize the latent image on the photosensitive medium; and
an optical scanner configured to perform optical scanning of the photosensitive surface of the photosensitive medium to form the latent image by deflecting a luminous flux having a wavelength $\lambda$ from a light source by means of an optical deflector, and condensing the deflected flux toward the photosensitive surface of the photosensitive medium through a scanning image forming optical system, thereby forming an optical spot on said surface to be scanned, wherein said scanning image forming optical system has at least one lens, and wherein, in the said scanning image forming optical system, when a focal length $f\sigma$ in a main scanning direction at a surface accuracy $\sigma i$ is defined as:

$$f\sigma = \{2.6846\lambda \times \sqrt{(k)} \times fm^2/\omega^2\} - fm$$

where, fm represents a focal length in the main scanning direction of said scanning image forming optical system; k represents the number of lens surfaces; $\omega$ represents an aimed spot diameter of the optical spot in the main scanning direction at an image height of 0; $\sigma i$ represents a surface accuracy of an i-th lens surface as counted from an optical deflector side; n represents a refractive index of material of a lens having the i-th lens surface; and 1/L represents a spatial frequency in the main scanning direction on said lens surface; then, said surface accuracy $\sigma i$, said focal length $f\sigma$, said refractive index n, and said spatial frequency 1/L satisfy, for each lens surface, a following condition:

$$0 < \log \sigma i < -2 \log(1/L) + \log [1/\{32 f\sigma(n-1)\}]. \tag{1}$$

77. An image forming apparatus according to claim 76,
wherein, in the optical scanner, when W represents an optical flux diameter in the main scanning direction of the deflected luminous flux entering the i-th lens surface as counted from the optical deflector, the surface accuracy $\sigma i$, the focal length $f\sigma$, and the refractive index n satisfy a following condition:

$$0 < \log \sigma i < -2 \log(1/W) + \log [1/\{32 f\sigma(n-1)\}] \tag{2}$$

for each lens surface for a spatial frequency equal to or smaller than (1/W), without depending upon the spatial frequency.

78. An image forming apparatus according to claim 76,
wherein said light source is a semiconductor laser, and the luminous flux from the light source is coupled with a subsequent optical system by a coupling lens, deflected by the optical deflector, and enters the scanning image forming optical system.

79. An image forming apparatus according to claim 78,
wherein a function of the coupling lens is a collimating function.

80. An image forming apparatus according to claim 79,
wherein the scanning image forming optical system consists of only lenses including said one lens.

81. An image forming apparatus according to claim 80,
wherein the scanning image forming optical system consists of two lenses including said one lens.

82. An image forming apparatus according to claim 78,
wherein the scanning image forming optical system consists of only lenses including said one lens.

83. An image forming apparatus according to claim 82,
wherein the scanning image forming optical system consists of two lenses including said one lens.

84. An image forming apparatus according to claim 78,
wherein said optical deflector is a rotary mirror having a deflecting reflective surface;
wherein the coupled luminous flux is condensed by a line image forming optical system in a sub-scanning direction and is formed into a line image long in the main scanning direction near said deflecting reflective surface; and
wherein said scanning image forming optical system is an anamorphic optical system associating a starting point of deflection by the optical deflector and the surface to be scanned into an opto-geometrical conjugate relationship relative to the sub-scanning direction.

85. An image forming apparatus according to claim 84,
wherein the function of the coupling lens is a collimating function.

86. An image forming apparatus according to claim 85,
wherein the scanning image forming optical system consists of only lenses including said one lens.

87. An image forming apparatus according to claim 86,
wherein the scanning image forming optical system consists of two lenses including said one lens.

88. An image forming apparatus according to claim 84,
wherein the scanning image forming optical system consists of only lenses including said one lens.

89. An image forming apparatus according to claim 88, wherein the scanning image forming optical system consists of two lenses including said one lens.

90. An image forming apparatus according to claim 76, wherein said optical deflector is a rotary polygon mirror.

91. An image forming apparatus according to claim 76, wherein said photosensitive medium is a photoconductive member, and the electrostatic latent image formed through uniform charging and optical scanning by the optical scanner of the photosensitive surface of the photosensitive medium is visualized into a toner image.

92. An optical scanner which performs optical scanning of a surface to be scanned by deflecting a luminous flux having a wavelength $\lambda$ from a light source by means of an optical deflector, condensing the deflected luminous flux through a scanning image forming optical system toward the surface to be scanned to form an optical spot on said surface to be scanned, wherein when the optical spot to be formed on the surface to be scanned has an aimed spot diameter $\omega$ in a main scanning direction of the optical spot at an image height of 0, and a change $\Delta$ in a beam waist position in the main scanning direction of the deflected luminous flux relative to the surface to be scanned is exploded into components of a spatial frequency, said change $\Delta$ satisfies a condition:

$$\{\Delta \cdot \lambda / \omega^2\} < 0.4 \tag{20}$$

within a range of spatial frequency (1/L: line/mm) of:

$$0.1 < (1/L) < 5.$$

93. An optical scanner which performs optical scanning of a surface to be scanned by deflecting a luminous flux having a wavelength $\lambda$ from a light source by means of an optical deflector, condensing the deflected luminous flux through a scanning image forming optical system toward the surface to be scanned to form an optical spot on said surface to be scanned, wherein said scanning image forming optical system comprises one or more lenses; and wherein when the optical spot to be formed on the surface to be scanned has an aimed spot diameter $\omega$ in a main scanning direction of the optical spot at an image height of 0, and a surface accuracy $\sigma$ on each lens of said scanning image forming optical system is exploded into components of a spatial frequency, within a range of the spatial frequency (1/L: line/mm) of:

$$0.1 < (1/L) < 5,$$

a lens surface accuracy $\sigma$, a focal length $f\sigma$ in the main scanning direction at said surface accuracy $\sigma$, and a refractive index n of a lens having said lens surface satisfy a condition:

$$0 < \log \sigma < -2 \log(1/L) + \log [1/\{32\, f\sigma(n-1)\}] \tag{21}$$

within a range of luminous flux width equal to or greater than W in the main scanning direction on said lens surface, and satisfy a condition:

$$0 < \log \sigma < -2 \log(1/W) + \log [1/\{32\, f\sigma(n-1)\}] \tag{22}$$

within a range of luminous flux width equal to or smaller than W.

94. An optical scanner which performs optical scanning of a surface to be scanned by deflecting a luminous flux having a wavelength $\lambda$ from a light source by means of an optical deflector, condensing the deflected luminous flux through a scanning image forming optical system toward the surface to be scanned to form an optical spot on said surface to be scanned, wherein said scanning image forming optical system comprises one or more mirrors having an image forming function; and wherein when the optical spot to be formed on the surface to be scanned has a spot diameter $\omega$ in an aimed main scanning direction of the optical spot at an image height of 0, and the surface accuracy $\sigma$ of each mirror of said scanning image forming optical system is exploded into components of a spatial frequency within a range of the spatial frequency (1/L: line/mm) of:

$$0.1 < (1/L) < 5,$$

a mirror surface accuracy $\sigma$, and a focal length $f\sigma$ in the main scanning direction at said surface accuracy $\sigma$ satisfy a condition:

$$0 < \log \sigma < -2 \log(1/L) + \log [1/\{64\, f\sigma\}] \tag{23}$$

within a range of luminous flux width equal to or greater than W in the main scanning direction on said mirror surface, and satisfy a condition:

$$0 < \log \sigma i < -2 \log(1/W) + \log [1/\{64\, f\sigma\}] \tag{24}$$

within a range of luminous flux equal to or smaller than W.

95. An image forming apparatus, comprising:

a photosensitive medium for forming a latent image thereupon through optical scanning of a photosensitive surface thereof;

a visualizing device configured to visualize the latent image on the photosensitive medium; and an optical scanner configured to perform optical scanning of the photosensitive surface of the photosensitive medium to form the latent image by deflecting a luminous flux having a wavelength $\lambda$ from a light source by means of an optical deflector, condensing the deflected luminous flux through a scanning image forming optical system toward the surface to be scanned to form an optical spot on said surface to be scanned, wherein when the optical spot to be formed on the surface to be scanned has an aimed spot diameter $\omega$ in a main scanning direction of the optical spot at an image height of 0, and a change $\Delta$ in a beam waist position in the main scanning direction of the deflected luminous flux relative to the surface to be scanned is exploded into components of a spatial frequency, said change $\Delta$ satisfies a condition:

$$\{\Delta \cdot \lambda / \omega^2\} < 0.4 \tag{20}$$

within a range of spatial frequency (1/L: line/mm) of:

$$0.1 < (1/L) < 5.$$

96. An image forming apparatus according to claim 95, wherein, said photosensitive medium is a photoconductive member, and an electrostatic latent image formed through uniform charging and optical scanning by the optical scanner of the photosensitive surface of the photoconductive member is visualized into a toner image.

97. An image forming apparatus, comprising:
a photosensitive medium for forming a latent image thereupon through optical scanning of a photosensitive surface thereof;
a visualizing device configured to visualize the latent image on the photosensitive medium; and
an optical scanner configured to perform optical scanning of the photosensitive surface of the photosensitive medium to form the latent image by deflecting a luminous flux having a wavelength λ from a light source by means of an optical deflector, condensing the deflected luminous flux through a scanning image forming optical system toward the surface to be scanned to form an optical spot on said surface to be scanned,
wherein said scanning image forming optical system comprises one or more lenses; and
wherein when the optical spot to be formed on the surface to be scanned has an aimed spot diameter ω in a main scanning direction of the optical spot at an image height of 0, and a surface accuracy σ on each lens of said scanning image forming optical system is exploded into components of a spatial frequency, within a range of the spatial frequency (1/L: line/mm) of:

$$0.2 < (1/L) < 5,$$

a lens surface accuracy σ, a focal length fσ in the main scanning direction at said surface accuracy σ, and a refractive index n of a lens having said lens surface satisfy a condition:

$$0 < \log \sigma < -2 \log(1/L) + \log[1/\{32 f\sigma(n-1)\}] \tag{21}$$

within a range of luminous flux width equal to or greater than W in the main scanning direction on said lens surface, and satisfy a condition:

$$0 < \log \sigma < -2 \log(1/W) + \log[1/\{32 f\sigma(n-1)\}] \tag{22}$$

within a range of luminous flux width equal to or smaller than W.

98. An image forming apparatus according to claim 97, wherein, said photosensitive medium is a photoconductive member, and an electrostatic latent image formed through uniform charging and optical scanning by the optical scanner of the photosensitive surface of the photoconductive member is visualized into a toner image.

99. An image forming apparatus, comprising:
a photosensitive medium for forming a latent image thereupon through optical scanning of a photosensitive surface thereof;
a visualizing device configured to visualize the latent image on the photosensitive medium; and
an optical scanner configured to perform optical scanning of the photosensitive surface of the photosensitive medium to form the latent image by deflecting a luminous flux having a wavelength λ from a light source by means of an optical deflector, condensing the deflected luminous flux through a scanning image forming optical system toward the surface to be scanned to form an optical spot on said surface to be scanned,
wherein said scanning image forming optical system comprises one or more mirrors having an image forming function; and
wherein when the optical spot to be formed on the surface to be scanned has a spot diameter ω in an aimed main scanning direction of the optical spot at an image height of 0, and the surface accuracy σ of each mirror of said scanning image forming optical system is exploded into components of a spatial frequency within a range of the spatial frequency (1/L: line/mm) of:

$$0.1 < (1/L) < 5,$$

a mirror surface accuracy σ, and a focal length fσ in the main scanning direction at said surface accuracy σ satisfy a condition:

$$0 < \log \sigma < -2 \log(1/L) + \log[1/\{64 f\sigma\}] \tag{23}$$

within a range of luminous flux width equal to or greater than W in the main scanning direction on said mirror surface, and satisfy a condition:

$$0 < \log \sigma i < -2 \log(1/W) + \log[1/\{64 f\sigma\}] \tag{24}$$

within a range of luminous flux equal to or smaller than W.

100. An image forming apparatus according to claim 99, wherein, said photosensitive medium is a photoconductive member, and an electrostatic latent image formed through uniform charging and optical scanning by the optical scanner of the photosensitive surface of the photoconductive member is visualized into a toner image.

101. An optical scanning lens used in a scanning image forming optical system which condenses a luminous flux deflected by an optical deflector near a surface to be scanned,
wherein, when a maximum value of dispersion of curvature distribution of a curved surface within an area of the lens through which passes the luminous flux is ΔC, a relationship:

$$\Delta C \leq 2 \times w^2 / \{(n-1) \times \lambda \times S'^2\}$$

is satisfied, where:
w: beam spot radius on the surface to be scanned;
n: refractive index of the lens;
λ: light source wavelength; and
S': distance between a rear principal point and an image surface in the scanning image forming optical system.

102. An optical scanning lens used in a scanning image forming optical system which condenses a luminous flux deflected by an optical deflector near a surface to be scanned,
wherein, when a maximum value of dispersion of curvature distribution of a curved surface in a main scanning direction within an area of the lens through which passes the luminous flux is ΔC, a relationship:

$$\Delta C \leq 2 \times w^2 / \{(n-1) \times \lambda \times F^2\}$$

is satisfied, where:
w: beam spot radius on the surface to be scanned;
n: refractive index of the lens;
λ: light source wavelength; and F: focal length of the scanning image forming optical system as a whole in the main scanning direction.

103. An optical scanning lens used in a scanning image forming optical system which condenses a luminous flux deflected by an optical deflector near a surface to be scanned, wherein, when a maximum value of dispersion of curvature distribution of a curved surface within an area of the lens through which passes the luminous flux is $\Delta C$, a relationship:

$$0.2/K \leq \Delta C \times (n-1) \times \lambda \times (S'/w)^2 \leq 2$$

is satisfied, where:
K: number of optical elements from the optical deflector to an image surface of the scanning image forming optical system;
w: beam spot radius on the surface to be scanned;
n: refractive index of the lens;
$\lambda$: light source wavelength; and
S': distance between the rear principal point and the image surface in the scanning image forming optical system.

104. An optical scanning lens used in a scanning image forming optical system which condenses a luminous flux deflected by an optical deflector near a surface to be scanned, wherein, when an average curvature of a curved surface within an area through which passes the luminous flux is q(x), and an approximate curve of a tenth or lower degree of q(x) is q0(x), a relationship:

$$q\_PV \times (n-1) \times \lambda \times (F/wd)^2 \leq 1$$

is satisfied, where:
wd: beam spot diameter on the surface to be scanned in the main scanning direction;
n: refractive index of the lens;
$\lambda$: light source wavelength;
F: focal length of the scanning image forming optical system in the main scanning direction; and
q\_PV=max{q(x)−q0(x)}−min{q(x)−q0(x)}.

105. An optical scanning lens used in a scanning image forming optical system which condenses a luminous flux deflected by an optical deflector near a surface to be scanned, wherein, when an average curvature of a curved surface within an area of the lens through which passes the luminous flux is q(x), and an approximate curve of a tenth or lower degree of q(x) is q0(x), a relationship:

$$0.1/K \leq q\_PV \times (n-1) \times \lambda \times (S'/wd)^2 \leq 1$$

is satisfied, where:
wd: beam spot diameter on the surface to be scanned;
n: refractive index of the lens;
$\lambda$: light source wavelength;
S': distance between the rear principal point and the image surface of the scanning image forming optical system; and
q\_PV=max{q(x)−q0(x)}−min{q(x)−q0(x)}.

106. An optical scanner comprising:
a light source;
an optical deflector having a deflecting reflective surface and configured to deflect a luminous flux from the light source; and
a scanning image forming optical system including an optical scanning lens, wherein the optical scanner deflects the luminous flux from the light source at an equiangular speed with the optical deflector, condenses the deflected luminous flux onto a surface to be scanned as an optical spot through the optical scanning lens, and scans the surface to be scanned at a uniform speed by means of said optical spot, and wherein, in said optical scanning lens, when a maximum value of dispersion of curvature distribution of a curved surface within an area of the lens through which passes the luminous flux is $\Delta C$, a relationship:

$$\Delta C \leq 2 \times w^2 / \{(n-1) \times \lambda \times S'^2\}$$

is satisfied, where:
w: beam spot radius on the surface to be scanned;
n: refractive index of the lens;
$\lambda$: light source wavelength; and
S': distance between a rear principal point and an image surface in the scanning image forming optical system.

107. An optical scanner comprising:
a light source;
an optical deflector having a deflecting reflective surface and configured to deflect a luminous flux from the light source; and
a scanning image forming optical system including an optical scanning lens, wherein the optical scanner deflects the luminous flux from the light source at an equiangular speed with the optical deflector, condenses the deflected luminous flux onto a surface to be scanned as an optical spot through the optical scanning lens, and scans the surface to be scanned at a uniform speed by means of said optical spot, and wherein, in said optical scanning lens, when a maximum value of dispersion of curvature distribution of a curved surface in a main scanning direction within an area of the lens through which passes the luminous flux is $\Delta C$, a relationship:

$$\Delta C \leq 2 \times w^2 / \{(n-1) \times \lambda \times F^2\}$$

is satisfied, where:
w: beam spot radius on the surface to be scanned;
n: refractive index of the lens;
$\lambda$: light source wavelength; and
F: focal length of the scanning image forming optical system as a whole in the main scanning direction.

108. An optical scanner comprising:
a light source;
an optical deflector having a deflecting reflective surface and configured to deflect a luminous flux from the light source; and
a scanning image forming optical system including an optical scanning lens, wherein the optical scanner deflects the luminous flux from the light source at an equiangular speed with the optical deflector, condenses the deflected luminous flux onto a surface to be scanned as an optical spot through the optical scanning lens, and scans the surface to be scanned at a uniform speed by means of said optical spot, and wherein, in said optical scanning lens, when a maximum value of dispersion of curvature distribution of a curved surface within an area of the lens through which passes the luminous flux is ΔC, a relationship:

$$0.2/K \leq \Delta C \times (n-1) \times \lambda \times (S'/w)^2 \leq 2$$

is satisfied, where:
K: number of optical elements from the optical deflector to an image surface of the scanning image forming optical system;
w: beam spot radius on the surface to be scanned;
n: refractive index of the lens;
λ: light source wavelength; and
S': distance between the rear principal point and the image surface in the scanning image forming optical system.

109. An optical scanner comprising:
a light source;
an optical deflector having a deflecting reflective surface and configured to deflect a luminous flux from the light source; and
a scanning image forming optical system including an optical scanning lens,
wherein the optical scanner deflects the luminous flux from the light source at an equiangular speed with the optical deflector, condenses the deflected luminous flux onto a surface to be scanned as an optical spot through the optical scanning lens, and scans the surface to be scanned at a uniform speed by means of said optical spot, and
wherein, in said optical scanning lens, when an average curvature of a curved surface within an area through which passes the luminous flux is q(x), and an approximate curve of a tenth or lower degree of q(x) is q0(x), a relationship:

$$q\_PV \times (n-1) \times \lambda \times (F/wd)^2 \leq 1$$

is satisfied, where:
wd: beam spot diameter on the surface to be scanned in the main scanning direction;
n: refractive index of the lens;
λ: light source wavelength;
F: focal length of the scanning image forming optical system in the main scanning direction; and
q_PV=max{q(x)−q0(x)}−min{q(x)−q0(x)}.

110. An optical scanner comprising:
a light source;
an optical deflector having a deflecting reflective surface and configured to deflect a luminous flux from the light source; and
a scanning image forming optical system including an optical scanning lens,
wherein the optical scanner deflects the luminous flux from the light source at an equiangular speed with the optical deflector, condenses the deflected luminous flux onto a surface to be scanned as an optical spot through the optical scanning lens, and scans the surface to be scanned at a uniform speed by means of said optical spot, and
wherein, in said optical scanning lens, when an average curvature of a curved surface within an area of the lens through which passes the luminous flux is q(x), and an approximate curve of a tenth or lower degree of q(x) is q0(x), a relationship:

$$0.1/K \leq q\_PV \times (n-1) \times \lambda \times (S'/wd)^2 \leq 1$$

is satisfied, where:
wd: beam spot diameter on the surface to be scanned;
n: refractive index of the lens;
λ: light source wavelength;
S': distance between the rear principal point and the image surface of the scanning image forming optical system; and
q_PV=max{q(x)−q0(x)}−min{q(x)−q0(x)}.

111. An image forming apparatus comprising:
a photosensitive member; and
an optical scanner including,
  a light source;
  an optical deflector having a deflecting reflective surface and configured to deflect a luminous flux from the light source; and
  a scanning image forming optical system including an optical scanning lens,
wherein the optical scanner deflects the luminous flux from the light source at an equiangular speed with the optical deflector, condenses the deflected luminous flux onto a surface to be scanned as an optical spot through the optical scanning lens, and scans the surface to be scanned at a uniform speed by means of said optical spot,
wherein, in said optical scanning lens, when a maximum value of dispersion of curvature distribution of a curved surface within an area of the lens through which passes the luminous flux is ΔC, a relationship:

$$\Delta C \leq 2 \times w^2 / \{(n-1) \times \lambda \times S'^2\}$$

is satisfied, where:
w: beam spot radius on the surface to be scanned;
n: refractive index of the lens;
λ: light source wavelength; and
S': distance between a rear principal point and an image surface in the scanning image forming optical system, and
wherein the surface to be scanned comprises the photosensitive member, and an electrostatic latent image is formed on the surface to be scanned through optical scanning of the surface to be scanned by said optical scanner.

112. An image forming apparatus comprising:
a photosensitive member; and
an optical scanner including,
  a light source;
  an optical deflector having a deflecting reflective surface and configured to deflect a luminous flux from the light source; and
  a scanning image forming optical system including an optical scanning lens,
wherein the optical scanner deflects the luminous flux from the light source at an equiangular speed with the optical deflector, condenses the deflected luminous flux onto a surface to be scanned as an optical spot through the optical scanning lens, and scans a surface to be scanned at a uniform speed by means of said optical spot, and
wherein, in said optical scanning lens, when a maximum value of dispersion of curvature distribution of a curved surface in a main scanning direction within an area of the lens through which passes the luminous flux is ΔC, a relationship:

$$\Delta C \leq 2 \times w^2 / \{(n-1) \times \lambda \times F^2\}$$

is satisfied, where:
w: beam spot radius on the surface to be scanned;
n: refractive index of the lens;
λ: light source wavelength; and
F: focal length of the scanning image forming optical system as a whole in the main scanning direction, and wherein the surface to be scanned comprises the photosensitive member, and an electrostatic latent image is formed on the surface to be scanned through optical scanning of the surface to be scanned by said optical scanner.

113. An image forming apparatus comprising:
a photosensitive member; and
an optical scanner including,
  a light source;
  an optical deflector having a deflecting reflective surface and configured to deflect a luminous flux from the light source; and
  a scanning image forming optical system including an optical scanning lens,
wherein the optical scanner deflects the luminous flux from the light source at an equiangular speed with the optical deflector, condenses the deflected luminous flux onto a surface to be scanned as an optical spot through the optical scanning lens, and scans a surface to be scanned at a uniform speed by means of said optical spot, and
wherein, in said optical scanning lens, when a maximum value of dispersion of curvature distribution of a curved surface within an area of the lens through which passes the luminous flux is ΔC, a relationship:

$$0.2/K \leq \Delta C \times (n-1) \times \lambda \times (S'/w)^2 \leq 2$$

is satisfied, where:
K: number of optical elements from the optical deflector to an image surface of the scanning image forming optical system;
w: beam spot radius on the surface to be scanned;
n: refractive index of the lens;
λ: light source wavelength; and
S': distance between the rear principal point and the image surface in the scanning image forming optical system, and wherein the surface to be scanned comprises the photosensitive member, and an electrostatic latent image is formed on the surface to be scanned through optical scanning of the surface to be scanned by said optical scanner.

114. An image forming apparatus comprising:
a photosensitive member; and
an optical scanner including,
  a light source;
  an optical deflector having a deflecting reflective surface and configured to deflect a luminous flux from the light source; and
  a scanning image forming optical system including an optical scanning lens,
wherein the optical scanner deflects the luminous flux from the light source at an equiangular speed with the optical deflector, condenses the deflected luminous flux onto a surface to be scanned as an optical spot through the optical scanning lens, and scans a surface to be scanned at a uniform speed by means of said optical spot, and wherein, in said optical scanning lens, when an average curvature of a curved surface within an area through which passes the luminous flux is q(x), and an approximate curve of a tenth or lower degree of q(x) is q0(x), a relationship:

$$q\_PV \times (n-1) \times \lambda \times (F/wd)^2 \leq 1$$

is satisfied, where:
wd: beam spot diameter on the surface to be scanned in the main scanning direction;
n: refractive index of the lens;
λ: light source wavelength;
F: focal length of the scanning image forming optical system in the main scanning direction; and
q\_PV=max{q(x)−q0(x)}−min{q(x)−q0(x)},
and, wherein the surface to be scanned comprises the photosensitive member, and an electrostatic latent image is formed on the surface to be scanned through optical scanning of the surface to be scanned by said optical scanner.

115. An image forming apparatus comprising:
a photosensitive member; and
an optical scanner including,
  a light source;
  an optical deflector having a deflecting reflective surface and configured to deflect a luminous flux from the light source; and
  a scanning image forming optical system including an optical scanning lens,
wherein the optical scanner deflects the luminous flux from the light source at an equiangular speed with the optical deflector, condenses the deflected luminous flux onto a surface to be scanned as an optical spot through the optical scanning lens, and scans a surface to be scanned at a uniform speed by means of said optical spot, and
wherein, in said optical scanning lens, when an average curvature of a curved surface within an area of the lens through which passes the luminous flux is q(x), and an approximate curve of a tenth or lower degree of q(x) is q0(x), a relationship:

$$0.1/K \leq q\_PV \times (n-1) \times \lambda \times (S'/wd)^2 \leq 1$$

is satisfied, where:
wd: beam spot diameter on the surface to be scanned;
n: refractive index of the lens;
λ: light source wavelength;
S': distance between the rear principal point and the image surface of the scanning image forming optical system; and
q\_PV=max{q(x)−q0(x)}−min{q(x)−q0(x)},
and wherein the surface to be scanned comprises the photosensitive member, and an electrostatic latent image is formed on the surface to be scanned through optical scanning of the surface to be scanned by said optical scanner.

116. An optical scanning method, comprising the steps of:
providing a scanning image forming optical system including an optical scanning lens, in which when a maximum value of dispersion of curvature distribution of a curved surface within an area of the lens through which passes the luminous flux is ΔC, a relationship:

$$\Delta C \leq 2 \times w^2 / \{(n-1) \times \lambda \times S'^2\}$$

is satisfied, where:
w: beam spot radius on the surface to be scanned;
n: refractive index of the lens;
λ: light source wavelength; and
S': distance between a rear principal point and an image surface in the scanning image forming optical system; and causing an optical deflector to deflect a luminous flux from a light source at an equiangular speed, condensing the deflected luminous flux onto a surface to be scanned as an optical spot through the optical scanning lens, and scanning the surface to be scanned at a uniform speed by means of said optical spot.

117. An optical scanning method, comprising the steps of:
providing a scanning image forming optical system including an optical scanning lens, in which when a maximum value of dispersion of curvature distribution of a curved surface in a main scanning direction within an area of the lens through which passes the luminous flux is ΔC, a relationship:

$$\Delta C \leq 2 \times w^2 / \{(n-1) \times \lambda \times F^2\}$$

is satisfied, where:
w: beam spot radius on the surface to be scanned;
n: refractive index of the lens;
λ: light source wavelength; and
F: focal length of the scanning image forming optical system as a whole in the main scanning direction; and causing an optical deflector to deflect a luminous flux from a light source at an equiangular speed, condensing the deflected luminous flux onto a surface to be scanned as an optical spot through the optical scanning lens, and scanning the surface to be scanned at a uniform speed by means of said optical spot.

118. An optical scanning method, comprising the steps of:
providing a scanning image forming optical system including an optical scanning lens, in which when a maximum value of dispersion of curvature distribution of a curved surface within an area of the lens through which passes the luminous flux is ΔC, a relationship:

$$0.2/K \leq \Delta C \times (n-1) \times \lambda \times (S'/w)^2 \leq 2$$

is satisfied, where:
K: number of optical elements from the optical deflector to an image surface of the scanning image forming optical system;
w: beam spot radius on the surface to be scanned;
n: refractive index of the lens;
λ: light source wavelength; and
S': distance between the rear principal point and the image surface in the scanning image forming optical system; and causing an optical deflector to deflect a luminous flux from a light source at an equiangular speed, condensing the deflected luminous flux onto a surface to be scanned as an optical spot through the optical scanning lens, and scanning the surface to be scanned at a uniform speed by means of said optical spot.

119. An optical scanning method, comprising the steps of:
providing a scanning image forming optical system including an optical scanning lens, in which when an average curvature of a curved surface within an area through which passes the luminous flux is q(x), and an approximate curve of a tenth or lower degree of q(x) is q0(x), a relationship:

$$q\_PV \times (n-1) \times \lambda \times (F/wd)^2 \leq 1$$

is satisfied, where:
wd: beam spot diameter on the surface to be scanned in the main scanning direction;
n: refractive index of the lens;
λ: light source wavelength;
F: focal length of the scanning image forming optical system in the main scanning direction; and
q\_PV=max{q(x)−q0(x)}−min{q(x)−q0(x)}; and causing an optical deflector to deflect a luminous flux from a light source at an equiangular speed, condensing the deflected luminous flux onto a surface to be scanned as an optical spot through the optical scanning lens, and scanning the surface to be scanned at a uniform speed by means of said optical spot.

120. An optical scanning method, comprising the steps of:
providing a scanning image forming optical system including an optical scanning lens, in which when an average curvature of a curved surface within an area of the lens through which passes the luminous flux is q(x), and an approximate curve of a tenth or lower degree of q(x) is q0(x), a relationship:

$$0.1/K \leq q\_PV \times (n-1) \times \lambda \times (S'/wd)^2 \leq 1$$

is satisfied, where:
wd: beam spot diameter on the surface to be scanned;
n: refractive index of the lens;
λ: light source wavelength;
S': distance between the rear principal point and the image surface of the scanning image forming optical system; and
q\_PV=max{q(x)−q0(x)}−min{q(x)−q0(x)}; and causing an optical deflector to deflect a luminous flux from a light source at an equiangular speed, condensing the deflected luminous flux onto a surface to be scanned as an optical spot through the optical scanning lens, and scanning the surface to be scanned at a uniform speed by means of said optical spot.

* * * * *